(12) United States Patent
Yamashita et al.

(10) Patent No.: US 7,125,944 B2
(45) Date of Patent: Oct. 24, 2006

(54) CEMENT ADMIXTURE AND CEMENT COMPOSITION

(75) Inventors: Akihiko Yamashita, Ibaraki (JP); Hiromichi Tanaka, Toyonaka (JP); Tsuyoshi Hirata, Kobe (JP); Toru Uno, Yokohama (JP); Yoshiyuki Onda, Tokyo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/332,080

(22) PCT Filed: May 28, 2002

(86) PCT No.: PCT/JP02/05144

§ 371 (c)(1), (2), (4) Date: Apr. 4, 2003

(87) PCT Pub. No.: WO02/096823

PCT Pub. Date: Dec. 5, 2002

(65) Prior Publication Data

US 2003/0199616 A1      Oct. 23, 2003

(30) Foreign Application Priority Data

May 28, 2001  (JP)  ............... 2001-158765
Dec. 5, 2001  (JP)  ............... 2001-371096

(51) Int. Cl.
*C04B 24/26* (2006.01)

(52) U.S. Cl. .............................. 526/318.42; 524/5
(58) Field of Classification Search ........... 524/4–5, 524/376–377, 300; 526/318.42
See application file for complete search history.

(56) References Cited

U.S. PATENT DOCUMENTS

| | | | |
|---|---|---|---|
| 5,162,402 A | 11/1992 | Ogawa et al. | |
| 5,362,323 A | 11/1994 | Koyata et al. | |
| 6,762,220 B1 * | 7/2004 | Yaguchi et al. | ......... 524/5 |

FOREIGN PATENT DOCUMENTS

| | | |
|---|---|---|
| DE | 100-48-139 A1 | 4/2001 |
| EP | 725044 A1 | 8/1996 |
| EP | 1103570 A2 | 5/2001 |
| JP | 59-18338 B2 | 4/1984 |
| JP | 4-175254 A | 6/1992 |
| JP | 5-345647 A | 12/1993 |
| JP | 7-267704 A | 10/1995 |
| JP | 7-267705 A | 10/1995 |
| JP | 10-194808 A | 7/1998 |
| JP | 11-335150 A | 12/1999 |
| JP | 2000-34151 A | 2/2000 |
| JP | 2000-191355 A | 7/2000 |
| JP | 2000-233957 A | 8/2000 |
| JP | 2000233957 * | 8/2000 |
| JP | 2001-19514 A | 1/2001 |
| JP | 2001-89205 A | 4/2001 |
| JP | 2001-106559 A | 4/2001 |
| JP | 2001-220194 A | 8/2001 |
| JP | 2001-220417 A | 8/2001 |
| JP | 2001-302306 A | 10/2001 |
| JP | 2001-316151 A | 11/2001 |
| JP | 2001-322854 A | 11/2001 |
| WO | WO 00/48961 * | 8/2000 |
| WO | WO 00/48961 A1 | 8/2000 |
| WO | WO 01/21542 A1 | 3/2001 |

* cited by examiner

*Primary Examiner*—Peter Szekely
(74) *Attorney, Agent, or Firm*—Sughrue Mion, PLLC

(57) ABSTRACT

It is an object of the present invention to provide a cement admixture capable of exhibiting high cement dispersing ability at low addition levels, in particular capable of displaying excellent initial dispersing ability and dispersion retaining ability even in a high water reducing ratio range, and a cement composition in which this admixture is used.

A cement admixture comprising
two polymers, namely a polymer (A) and a polymer (B), as essential constituents in a ratio of polymer (A) to polymer (B) between 1 to 99/99 to 1% by mass,
wherein the polymer (A) is a polymer comprising, as essential constituent units, a constituent unit (I) derived from an unsaturated (poly)alkylene glycol ether monomer (a) and a constituent unit (II) derived from an unsaturated monocarboxylic acid monomer (b) and
wherein the constituent units (I) and (II) each accounts for not less than 1% by mass relative to all constituent units but the constituent unit (I) accounts for not more than 50 mole percent relative to all constituent units and,
wherein the polymer (B) is an oxyalkylene group- or polyoxyalkylene group- and carboxyl group-containing polymer.

22 Claims, No Drawings

CEMENT ADMIXTURE AND CEMENT COMPOSITION

BACKGROUND OF THE INVENTION

The present invention relates to a cement admixture and a cement composition comprising the same.

PRIOR ART

A cement paste prepared by adding water to cement, a mortar prepared by admixing sand, which is a fine aggregate, therewith, and a concrete prepared by further admixing gravel, which is a coarse aggregate, therewith are used in large amounts in various structural materials and the like. However, with the lapse of time, mortar and concrete harden because of the progress of the hydration reaction between cement and water and, therefore, their workability generally decreases with the time after addition of water. For securing the dispersing ability of such cement, various cement admixtures have been developed.

Thus, for example, Japanese Kokoku Publication Sho-59-18338 discloses a cement dispersant produced by copolymerization of a polyalkylene glycol mono(meth)acrylate ester monomer and a (meth)acrylic acid monomer. The cement dispersant disclosed in the cited patent specification has polyalkylene glycol chains, which are nonionic hydrophilic groups, and anionic carboxyl groups in each molecule and the hydrophilicity and steric hindrance of the former inhibit the adsorption of the latter to cement particles and, allegedly, its setting retarding effect is weak and its dispersing performance is good.

Japanese Kokai Publication Hei-04-175254 discloses a cement dispersant comprising two kinds of polymer, wherein the first component is a polyether compound derived from a copolymer of maleic anhydride and a polyalkylene glycol allyl alkyl ether by further monoesterification with alkylpolyalkylene glycol and the second component is a salt of a polycarboxylic acid, which is a polymer of (meth)acrylic acid or the like. Allegedly, the second component polycarboxylic acid salt incorporated in the cement dispersant disclosed in the above-cited patent specification is first preferentially adsorbed on cement particles and disperses the cement particles in water and, then, the polyether compound contained as the first component and slow in rate of adsorption on cement particles is adsorbed on cement, whereby the dispersing ability of cement can be secured for a long period of time.

Japanese Kokai Publication Hei-05-345647 also discloses cement dispersant comprising two kinds of polymer, wherein the first component is a copolymer (a) of maleic anhydride and alkenyl ether with not less than 100 moles of an oxyalkylene group added and the second component is polycarboxylic acid type cement dispersant (b). It is described in the cited patent specification that the component (b) serves to increase the dispersing ability of cement at an early stage and the component (a), in which the number of moles of the oxyalkylene group added is not less than 100, causes a hydrated layer to be formed around each polyoxyalkylene group extending from the copolymer adsorbed on cement particles and, owing to the resulting steric hindrance, the dispersing ability of cement particles is retained for a prolonged period of time and that an increase in polyether chain length in component (a) results in a tendency to increase the slump with time.

Japanese Kokai Publication Hei-07-267705 discloses a cement dispersant comprising three kinds of polymer, in which the first component is a copolymer (a) of a polyalkylene glycol mono(meth)acrylate compound and a (meth)acrylic acid compound, the second component is a copolymer (b) of a polyalkylene glycol mono(meth)allyl ether compound and maleic anhydride and the third component is a copolymer (c) of a polyalkylene glycol mono(meth)allyl ether compound and a maleic acid-esterified polyalkylene glycol compound. The cited patent specification describes that the component (a), when used alone, increases the initial flowability of cement but is poor in slump-retaining ability and increases the viscosity of the cement composition, that the component (b), when used alone, requires time to increase the initial flowability and, even when the initial flowability is increased by increasing the level of addition thereof, it causes phase separation of the cement composition with time, that the component (c), when used alone, is further poor in cement dispersing ability and that, therefore, such effects that cannot be obtained by the single use of each of the three components are produced by combinedly using them in specific proportions. Thus, it is presumed, in the cited specification, that the differences in mechanisms of action on cement among the components are due to the molecular structures of the components and the differences in initial flowability increasing effect are due to the higher rate of adsorption, on cement particles, of the (meth)acrylic acid-based functional group-containing polymer (component a) as compared with the maleic acid-based functional group-containing polymers (components b and c). It is further described that the component higher in rate of adsorption is poor in the ability to subsequently retain the flowability.

Further, Japanese Kokai Publication 2001-19514 also discloses a cement dispersant comprising two kinds of polymer, wherein the first component is a polymer (A) of a polyalkylene glycol mono(meth)acrylate monomer and a (meth)acrylic acid monomer and the second component is a polymer (B) of a polyalkylene glycol monoalkenyl ether and maleic acid. The cited patent specification describes that when the carboxyl group content and the addition number of moles of the alkylene oxide to attain the polyalkylene glycol chain length in these polymers are within respective specific ranges, the combined use of the polymers can provide such excellent initial dispersing ability and slump-retaining ability that cannot be attained with the conventional products.

Japanese Kokai Publication 2000-34151 also discloses a cement admixture comprising two species of copolymers obtained by copolymerization of two or more species of unsaturated (poly) alkylene glycol ether monomers having a specific structure and (meth) acrylic acid monomers. In Example, and unsaturated (poly) alkylene glycol ether monomer which contains a terminal alkyl group containing 1 to 3 carbon atoms and a short (poly) alkylene glycol chain, is used. When the unsaturated (poly) alkylene glycol ether monomer contains an alkyl group as a terminal group and a short (poly) alkylene glycol chain for increasing shrinkage decreasing effects of concrete, its hydrophobicity increases to thereby reduce the dispersing ability of copolymers. In particular, there are no disperants available for providing cement with sufficient dispersing ability in a high water reducing ratio range.

Thus, the technique is known in the art which comprises incorporating a polyalkylene glycol mono(meth)acrylate/ (meth)acrylic acid copolymer and a polyalkylene glycol monoalkenyl ether/maleic acid copolymer combinedly in cement admixtures. At present, however, it is impossible to secure both sufficient initial dispersing ability and dispersion retaining ability with each other; for the manifestation of sufficient initial dispersing ability, it is necessary to add the dispersants in large amounts. In particular, there are no dispersants available for providing cement with sufficient dispersing ability and dispersion retaining ability in a high water reducing ratio range.

In view of the above-mentioned state of the art, it is an object of the present invention to provide a cement admixture capable of exhibiting high cement dispersing ability at low addition levels, in particular capable of displaying excellent initial dispersing ability and dispersion retaining ability even in a high water reducing ratio range, and a cement composition in which this admixture is used.

SUMMARY OF THE INVENTION

As a result of intensive investigations, the present inventors found that a mixture comprising a combination of a specific (poly)alkylene glycol alkenyl ether compound obtained by using an unsaturated monocarboxylic acid monomer as an essential comonomer constituent in lieu of maleic acid that has so far been used, and a (poly)oxyalkylene group- and carboxyl group-containing compound can show excellent initial dispersing ability and dispersion retaining ability even in a high water reducing ratio range. They further found that a mixture comprising a combination of a (poly)oxyalkylene group- and carboxyl group-containing compound and a specific (poly)alkylene glycol alkenyl ether compound obtained by using an unsaturated monocarboxylic acid ester monomer as an essential comonomer constituent can exhibit excellent dispersion retaining ability with time even in a high water reducing ratio range. These and other findings have now led to completion of the present invention. In the following, the invention is described in detail.

The present invention includes the following 1) to 14) aspects:

1) A cement admixture comprising two polymers, namely a polymer (A1) and a polymer (B1), as essential constituents in a ratio of polymer (A1) to polymer (B1) between 1 to 99/99 to 1% by mass, wherein the polymer (A1) is a polymer comprising, as essential constituent units, a constituent unit (I) derived from an unsaturated (poly)alkylene glycol ether monomer (a1) represented by the general formula (1):

$$YO(R^1O)_mH \qquad (1)$$

wherein Y represents an alkenyl group containing 2 to 8 carbon atoms, the m $R^1O$ groups are the same or different and each $R^1O$ represents an oxyalkylene group containing 2 to 18 carbon atoms and m is a mean addition number of moles of the oxyalkylene group and represents a number of 1 to 500, and a constituent unit (II) derived from an unsaturated monocarboxylic acid monomer (b) and wherein the constituent units (I) and (II) each accounts for not less than 1% by mass relative to all constituent units but the constituent unit (I) accounts for not more than 50 mole percent relative to all constituent units and, wherein the polymer (B1) is an oxyalkylene group- or polyoxyalkylene group- and carboxyl group-containing polymer.

2) A cement admixture comprising two polymers, namely a polymer (A2) and a polymer (B2), as essential constituents in a ratio of polymer (A2) to polymer (B2) between 1 to 99/99 to 1% by mass, wherein the polymer (A2) is a polymer comprising, as essential constituent units, a constituent unit (I') derived from an unsaturated (poly)alkylene glycol ether monomer (a2) represented by the general formula (2):

$$YO(R^1O)_nR^2 \qquad (2)$$

wherein Y represents an alkenyl group containing 2 to 8 carbon atoms, the n $R^1O$ groups are the same or different and each $R^1O$ represents an oxyalkylene group containing 2 to 18 carbon atoms, $R^2$ represents a hydrogen atom or a hydrocarbon group containing 1 to 30 carbon atoms and n is a mean addition number of moles of the oxyalkylene group and represents a number of 1 to 500, a constituent unit (II) derived from an unsaturated monocarboxylic acid monomer (b) and a constituent unit (III) derived from an unsaturated monocarboxylic ester monomer (c), wherein the constituent units (I'), (II) and (III) each accounts for not less than 1% by mass relative to all constituent units but the constituent unit (I') accounts for not more than 50 mole percent relative to all constituent units and the sum of the proportions of the constituent units (II) and (III) is greater than the proportion of the constituent unit (I') on the mole ratio basis, wherein the polymer (B2) is an oxyalkylene group- or polyoxyalkylene group- and carboxyl group-containing polymer.

3) The cement admixture according to (2), wherein the constituent unit (III) derived from an unsaturated monocarboxylic acid ester monomer (c) is a constituent unit (IV) derived from a (poly)alkylene glycol mono (meth)acrylic acid ester monomer (d) represented by the general formula (3):

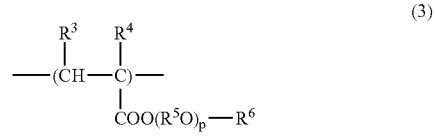

(3)

wherein $R^3$ and $R^4$ are the same or different and each represents a hydrogen atom or a methyl group, the p $R^5O$ groups are the same or different and each $R^5O$ represent an oxyalkylene group containing 2 to 18 carbon atoms, p is a mean addition number of moles of the oxyalkylene group and represents a number of 1 to 500, and $R^6$ represents a hydrogen atom or a hydrocarbon group containing 1 to 30 carbon atoms, or a constituent unit (VI) derived from a hydrophobic unsaturated monocarboxylic acid ester monomer (f) represented by the general formula (4):

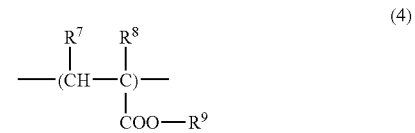

(4)

wherein $R^7$ and $R^8$ are the same or different and each represents a hydrogen atom or a methyl group and $R^9$ represents a hydrocarbon group containing 1 to 30 carbon atoms.

4) A cement admixture comprising two polymers, namely a polymer (A3) and a polymer (B3), as essential constituents in a ratio of polymer (A3) to polymer (B3) between 1 to 99/99 to 1% by mass, wherein the polymer (A3) is a polymer comprising, as essential constituent units, a constituent unit (I') derived from an unsaturated (poly)alkylene glycol ether monomer (a2) represented by the general formula (2):

$$YO(R^1O)_nR^2 \qquad (2)$$

wherein Y represents an alkenyl group containing 2 to 8 carbon atoms, the n $R^1O$ groups are the same or different and each $R^1O$ represents an oxyalkylene group containing 2 to 18 carbon atoms, $R^2$ represents a hydrogen atom or a hydrocarbon group containing 1 to 30 carbon atoms and n is a mean addition number of moles of the oxyalkylene group and represents a number of 1 to 500, and a constituent unit (II) derived from an unsaturated monocarboxylic acid monomer (b) and wherein the constituent units (I') and (II) each accounts for not less than 1% by mass relative to all constituent units but the constituent unit (I') accounts for not more than 50 mole percent relative to all constituent units and wherein the polymer (B3) is a polymer comprising a constituent unit (IV) derived from a (poly)alkylene glycol mono(meth)acrylic acid ester monomer (d) represented by the general formula (3):

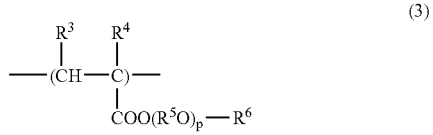

(3)

wherein $R^3$ and $R^4$ are the same or different and each represents a hydrogen atom or a methyl group, the p $R^5O$ groups are the same or different and each $R^5O$ represent an oxyalkylene group containing 2 to 18 carbon atoms, p is a mean addition number of moles of the oxyalkylene group and represents a number of 1 to 500, and $R^6$ represents a hydrogen atom or a hydrocarbon group containing 1 to 30 carbon atoms, and a constituent unit (II) derived from an unsaturated monocarboxylic acid monomer (b).

5) A cement admixture comprising two polymers, namely a polymer (A3) and a polymer (B4), as essential constituents in a ratio of polymer (A3) to polymer (B4) between 1 to 99/99 to 1% by mass, wherein the polymer (A3) is a polymer comprising, as essential constituent units, a constituent unit (I') derived from an unsaturated (poly)alkylene glycol ether monomer (a2) represented by the general formula (2):

$$YO(R^1O)_nR^2 \qquad (2)$$

wherein Y represents an alkenyl group containing 2 to 8 carbon atoms, the n $R^1O$ groups are the same or different and each $R^1O$ represents an oxyalkylene group containing 2 to 18 carbon atoms, $R^2$ represents a hydrogen atom or a hydrocarbon group containing 1 to 30 carbon atoms and n is a mean addition number of moles of the oxyalkylene group and represents a number of 1 to 500, and a constituent unit (II) derived from an unsaturated monocarboxylic acid monomer (b), wherein the constituent units (I') and (II) each accounts for not less than 1% by mass relative to all constituent units but the constituent unit (I') accounts for not more than 50 mole percent relative to all constituent units, wherein the polymer (B4) is a polymer comprising a constituent unit (I') derived from an unsaturated (poly)alkylene glycol ether monomer (a2) represented by the general formula (2) and a constituent unit (V) derived from an unsaturated dicarboxylic acid monomer (e).

6) A cement admixture comprising two polymers, namely a polymer (G) and a polymer (B5), as essential constituents in a ratio of polymer (G) to polymer (B5) between 1 to 99/99 to 1% by mass, wherein the polymer (B5) is an oxyalkylene or polyoxyalkylene group- and carboxyl group-containing polymer and the polymer (G) is a polymer comprising, as essential constituent units, a constituent unit (I') derived from an unsaturated (poly)alkylene glycol ether monomer (a2) represented by the general formula (2):

$$YO(R^1O)_nR^2 \qquad (2)$$

wherein Y represents an alkenyl group containing 2 to 8 carbon atoms, the n $R^1O$ groups are the same or different and each $R^1O$ represents an oxyalkylene group containing 2 to 18 carbon atoms, $R^2$ represents a hydrogen atom or a hydrocarbon group containing 1 to 30 carbon atoms and n is the mean addition number of moles of the oxyalkylene group and represents a number of 1 to 500, and a constituent unit (III) derived from an unsaturated monocarboxylic acid ester monomer (c), wherein the constituent units (I') and (III) each accounts for not less than 1% by mass relative to all constituent units but the constituent unit (I') accounts for not more than 50 mole percent relative to all constituent units.

7) The cement admixture according to 6), wherein the number of milliequivalents of carboxyl groups contained in each gram of the polymer (G) as determined on the unneutralized basis is 0 to 0.8 meq/g.

8) The cement admixture according to 6) or 7), wherein the polymer (B5) is a polymer comprising, as essential constituent units, a constituent unit (IV) derived from a (poly)alkylene glycol mono(meth)acrylic acid ester monomer (d) represented by the general formula (3):

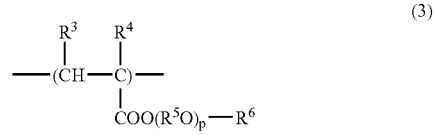

(3)

wherein $R^3$ and $R^4$ are the same or different and each represents a hydrogen atom or a methyl group, the p $R^5O$ groups are the same or different and each $R^5O$ represent an oxyalkylene group containing 2 to 18 carbon atoms, p is a mean addition number of moles of the oxyalkylene group and represents a number of 1 to 500 and $R^6$ represents a hydrogen atom or a hydrocarbon group containing 1 to 30 carbon atoms, and a constituent unit (II)derived from an unsaturated monocarboxylic acid monomer (b).

9) The cement admixture according to 6) or 7), wherein the polymer (B5) is a polymer comprising, as essential constituent units, the constituent unit (I') derived from an unsaturated (poly)alkylene glycol ether monomer (a2) represented by the general formula (2) and a constituent unit (V) derived from an unsaturated dicarboxylic acid monomer (e).

10) The cement admixture according to any of 6) to 9), wherein the constituent unit (III) derived from an unsaturated monocarboxylic acid ester monomer (c) is a constituent unit (IV) derived from a (poly)alkylene glycol mono (meth)acrylic acid ester monomer (d) or a constituent unit (VI) derived from a hydrophobic unsaturated monocarboxylic acid ester monomer (f) represented by the general formula (4):

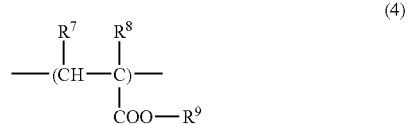

(4)

wherein $R^7$ and $R^8$ are the same or different and each represents a hydrogen atom or a methyl group and $R^9$ represents a hydrocarbon group containing 1 to 30 carbon atoms.

11) The cement admixture according to any 1) to 10) comprising a non-polymerizable (poly)alkylene glycol (P) not containing an alkenyl group.

12) The cement admixture according to 1) comprising the unsaturated (poly)alkylene glycol ether monomer (a1).

13) The cement admixture according to any of 2) to 11) comprising the unsaturated (poly)alkylene glycol ether monomer (a2).

14) A cement composition comprising, as essential constituents, the cement admixture according to any of 1) to 13), cement and water.

DETAILED DESCRIPTION OF THE PREFERRED EMBODIMENTS

The cement admixtures according to the present invention comprise respectively, as essential constituents, the two kinds of polymer, (1) polymer (A1) and polymer (B1), (2) polymer (A2) and polymer (B2), (3) polymer (A3) and polymer (B3), (4) polymer (A3) and polymer (B4), or (5) polymer (G) and polymer (B5). In this description, these cement admixtures are represented by the following words, namely cement admixture (1), cement admixture (2), cement admixture (3), cement admixture (4) and cement admixture (5), respectively. The cement admixture (1) can be obtained by mixing together the two polymers (A1) and (B1) separately synthesized. The cement admixture (2) can be obtained by mixing together the two polymers (A2) and (B2) separately synthesized. The cement admixture (3) can be obtained by mixing together the two polymers (A3) and (B3) separately synthesized. The cement admixture (4) can be obtained by mixing together the two polymers (A3) and (B4) separately synthesized. The cement admixture (5) can be obtained by mixing together the two polymers (G) and (B5) separately synthesized.

These polymers are respectively described below.

The polymer (A1), (A2), and (A3) of the present invention, are polymers comprising, as essential constituent units, an unsaturated (poly)alkylene glycol ether monomer-derived constituent unit and an unsaturated monocarboxylic acid monomer-derived constituent unit. Further, in this description, polymer (A) means all of the polymer (A1), (A2), and (A3).

The polymer (A1) is a polymer comprising, as essential constituent units, the constituent unit (I) derived from an unsaturated (poly)alkylene glycol ether monomer (a1) represented by the above general formula (1) and the constituent unit (II) derived from an unsaturated monocarboxylic acid monomer (b). Although the polymer (A1) is a polymer comprising the constituent units (I) and (II) as essential constituents, it may further contain another or other copolymerizable monomer-derived constituent units. These constituent units in polymer (A1) each may comprise one single species or two or more species.

It is necessary that, in the above the polymer (A1), the constituent units (I) and (II) each account for at least 1% by mass relative to all constituent units and the proportion of the constituent unit (I) be not more than 50 mole percent relative to all constituent units. When the proportion of constituent unit (I) is less than 1% by mass, the content of the unsaturated (poly)alkylene glycol ether monomer (a)-derived oxyalkylene group in the polymer (A1) is too low and, when the proportion of constituent unit (II) is less than 1% by mass, the content of the unsaturated monocarboxylic acid monomer (b)-derived carboxyl group in the polymer (A1) is too low, so that, in either case, no sufficient dispersing ability can be exhibited. On the other hand, for obtaining the polymer (A1) with high dispersing ability in high yields, it is important that the proportion of the constituent unit (I) should be not more than 50 mole percent relative to all constituent units, since the polymerizability of the unsaturated (poly)alkylene glycol ether monomer (a1) is low. While it is necessary that the proportion of the constituent unit (I) be at least 1% by mass relative to 100% by mass of all constituent units, the proportion is preferably not less than 5% by mass, more preferably not less than 10% by mass, still more preferably not less than 20% by mass, most preferably not less than 40% by mass. The total content (% by mass) of the constituent units (I) and (II) in the polymer (A1) is preferably 50 to 100% by mass, more preferably 70 to 100% by mass, relative to the whole polymer (A1).

While it is necessary that, in the above polymer (A1), the carboxyl group-containing constituent unit (II) derived from an unsaturated monocarboxylic acid monomer (b) accounts for at least 1% by mass relative to all constituent units, it is preferred that the number of milliequivalents of carboxyl groups contained in each gram of polymer (A1) as determined on the unneutralized basis be 0.2 to 5.0 meq/g. It is thus preferred that the proportion of each constituent unit constituting the polymer (A1) be selected so that the number of milliequivalents of carboxyl groups in the polymer (A1) amount to a value within the above range. The number of milliequivalents of carboxyl groups is more preferably 0.3 to 4.5 meq/g, still more preferably 0.3 to 4.0 meq/g, in particular 0.4 to 3.5 meq/g, most preferably 0.4 to 3.0 meq/g. The upper limit to the content of constituent unit (II) can be selected in a manner such that the number of milliequivalents of carboxyl groups contained in the polymer (A1) as determined on the unneutralized basis may be within the above range.

The term "number of milliequivalents of carboxyl groups contained in each gram of polymer (A1) (meq/g) as determined on the unneutralized basis" is used herein to include the case where the polymer (A1) is in a salt form. The methods of calculation are shown below for the case where it occurs as an acid and for the case where it occurs as a salt. While, in the following calculations, the constituent unit (II)-derived carboxyl groups alone are exemplified, another carboxyl group-containing constituent unit, for example the constituent unit (V) derived from an unsaturated dicarboxylic acid monomer (e), which is to be mentioned later herein, if contained in the polymer, this must be taken into consideration in calculating the number of milliequivalents of carboxyl groups.

Calculation Example 1

When a copolymer with a monomer (a1)/monomer (b) content ratio of 90/10 (% by mass) is obtained by using acrylic acid as monomer (b), the number of milliequivalents of monomer (b)-derived carboxyl groups per gram of the above polymer as determined on the unneutralized basis is $(0.1/72) \times 1{,}000 = 1.39$ (meq/g), since the molecular weight of acrylic acid is 72.

Calculation Example 2

When a copolymer with a monomer (a1)/monomer (b) content ratio of 80/20 (% by mass) is obtained by using sodium acrylate as monomer (b), the number of milliequivalents of monomer (b)-derived carboxyl groups per gram of the above polymer as determined on the unneutralized basis is $(0.2 \times 72/94)/(0.8+0.2 \times 72/94)/72 \times 1{,}000 = 2.23$ (meq/g), since the molecular weight of sodium acrylate is 94 and that of acrylic acid is 72. When acrylic acid is used in carrying out polymerization and, after polymerization, the acrylic acid-derived carboxylic groups are completely neutralized with sodium hydroxide, the same result as in this calculation example is obtained.

In addition to the monomer-based method of calculating the number of milliequivalents of carboxyl groups contained in each gram of polymer (A1) (meq/g) as determined on the unneutralized basis, as mentioned above, the number can also be calculated by measuring the acid value of the above polymer while taking into consideration the counter ion species relative to the carboxyl groups in the polymer.

As the above polymer (A1), the polymer (C) may also be used, which comprises, as essential constituent units, the constituent unit (I) derived from an unsaturated (poly) alkylene glycol ether monomer (a1) represented by the above general formula (1), the constituent unit (II) derived from an unsaturated monocarboxylic acid monomer (b) and the constituent unit (III) derived from an unsaturated monocarboxylic acid ester monomer (c). The cement admixture in which the above polymer (A1) is such polymer (C) is one of the preferred embodiments of the present invention. While the polymer (C) is a polymer comprising the constituent units (I), (II) and (III) as essential constituent units, it may further comprise another or other copolymerizable monomers-derived other constituent units. These constituent units of the polymer (C) each may comprise one single species or two or more species.

Referring to the above polymer (C), it is necessary that the constituent units (I), (II) and (III) each accounts for not less than 1% by mass relative to all constituent units and that the sum of the proportions of the constituent units (II) and (III) is greater than the proportion of the constituent unit (I) on the mole ratio basis. When the proportion of constituent unit (I) is less than 1% by mass, the content of an unsaturated (poly)alkylene glycol ether monomer (a1)-derived oxyalkylene groups in the polymer (C) is too low. When the proportion of constituent unit (II) is less than 1% by mass, the content of an unsaturated monocarboxylic acid monomer (b)-derived carboxyl groups in the polymer (C) is too low and, when the proportion of constituent unit (III) is less than 1% by mass, the content of the unsaturated monocarboxylic acid ester monomer (c)-derived substituents in the polymer (C) is too low. In each case, any satisfactory level of dispersing ability cannot be attained. As for the mutual proportions of the constituent units, it is necessary, for obtaining the polymer (C) with high dispersing ability in high yields, that the sum of the proportions of the constituent units (II) and (III) is greater than the proportion of the constituent unit (I) on the mole ratio basis, since the unsaturated (poly)alkylene glycol ether monomer (a1) is low in polymerizability. The proportion of constituent unit (I) relative to 100% by mass of all constituent units is required to be not less than 1% by mass and is preferably not less than 5% by mass, more preferably not less than 10% by mass, still more preferably not less than 20% by mass, most preferably not less than 40% by mass. The proportion of constituent (III) relative to 100% by mass of all constituent units is required to be not less than 1% by mass and is preferably not less than 2% by mass, more preferably not less than 3% by mass, still more preferably not less than 4% by mass, most preferably not less than 5% by mass. The total content (% by mass) of the constituents (I), (II) and (III) in the polymer (C) is preferably 50 to 100% by mass, more preferably 70 to 100% by mass, relative to the polymer (C) as a whole.

In the above polymer (C), like in the polymer (A1), it is necessary that the constituent unit (II) containing the unsaturated monocarboxylic acid monomer (b)-derived carboxyl group account for at least 1% by mass relative to all constituent units and, further, it is preferred that the number of milliequivalents of carboxyl groups contained in each gram of polymer (C) as determined on the unneutralized basis be 0.2 to 5.0 meq/g, hence it is preferred that the content ratios of the polymer (C)-constituting constituent units be selected so that the number of milliequivalents of carboxyl groups in the polymer (C) may fall within the above range. For attaining a high level of dispersion-retaining ability, in particular, it is more preferable that the above-mentioned number of milliequivalents of carboxyl groups be 0.2 to 2.0 meq/g, still more preferably 0.2 to 1.5 meq/g, in particular 0.2 to 1.0 meq/g, most preferably 0.2 to 0.8 meq/g. The upper limit to the content of constituent unit (II) can be selected so that the number of milliequivalents of carboxyl groups contained in the polymer (C) as determined on the unneutralized basis may be within the above range. The number of milliequivalents of carboxyl groups per gram of polymer (C) can be calculated in the same manner as mentioned above referring to the polymer (A1).

Since the polymer (A1) and polymer (C) may contain another carboxyl-containing constituent unit, for example the above-mentioned constituent unit (V) derived from an unsaturated dicarboxylic acid monomer (e), in addition to the carboxyl-containing constituent unit (II) derived from an unsaturated monocarboxylic acid monomer (b), the number of milliequivalents of carboxyl groups (meq/g) contained in the polymer (A1) and polymer (C) is not limited to the case where it originates in the constituent unit (II) alone.

The above polymer (A1) can be produced by copolymerizing a monomer component comprising, as essential constituents, an unsaturated (poly)alkylene glycol ether monomer (a1), which provides the constituent unit (I), and an unsaturated monocarboxylic acid monomer (b), which provides the constituent unit (II). The method of production thereof is not limited to this method but may comprise, for example, using a monomer before alkylene oxide addition, namely methallyl alcohol or a like unsaturated alcohol, in lieu of monomer (a1), copolymerizing the same with a monomer (b) in the presence of a polymerization initiator (where necessary, copolymerizing these monomers with a further monomer(s) copolymerizable therewith) and, thereafter, causing 1 to 500 moles, on average, of an alkylene oxide to add to the resulting copolymer. In the same manner, the polymer (C) can be produced by copolymerizing a monomer component comprising, as essential constituents, an unsaturated (poly)alkylene glycol ether monomer (a1), which provides the constituent unit (I), an unsaturated monocarboxylic acid monomer (b), which provides the constituent unit (II), and an unsaturated monocarboxylic acid ester monomer (c), which provides the constituent unit (III). The method of production is not limited to this but may comprise copolymerizing a monomer component prior to, or without, alkylene oxide addition and, thereafter, causing an alkylene oxide to add to the resulting copolymer.

The above-mentioned polymer (A2) is a polymer comprising, as essential constituent units, the constituent unit (I') derived from an unsaturated (poly)alkylene glycol ether monomer (a2) represented by the above general formula (2), the constituent unit (II) derived from an unsaturated monocarboxylic acid monomer (b) and the constituent unit (III) derived from an unsaturated monocarboxylic ester monomer (c), wherein the constituent units (I'), (II) and (III) each accounts for not less than 1% by mass relative to all constituent units but the constituent unit (I') accounts for not more than 50 mole percent relative to all constituent units and the sum of the proportions of the constituent units (II) and (III) is greater than the proportion of the constituent unit (I') on the mole ratio basis. This polymer (A2) is the above polymer (C), wherein the constituent unit (I) derived from an unsaturated (poly)alkylene glycol ether monomer (a1) in the polymer (C) is the constituent unit (I') derived from an unsaturated (poly)alkylene glycol ether monomer (a2).

The number of milliequivalents of carboxyl groups contained in each gram of polymer (A2) (meq/g) as determined on the unneutralized basis and the preferred range thereof are the same as described for the polymer (C). Further, in the preferred embodiment of the polymer (A2), the $R^2$ of the unsaturated (poly)alkylene glycol ether monomer (a2) is a hydrogen atom. Namely, the polymer (A2) is preferably the polymer (C).

The above-mentioned polymer (A3) is a polymer comprising, as essential constituent units, the constituent unit (I') derived from an unsaturated (poly)alkylene glycol ether monomer (a2) represented by the above general formula (2) and the constituent unit (II) derived from an unsaturated monocarboxylic acid monomer (b), wherein the constituent units (I') and (II) each accounts for not less than 1% by mass relative to all constituent units but the constituent unit (I') accounts for not more than 50 mole percent relative to all constituent units. This polymer (A3) is the above polymer (A1), wherein the constituent unit (I) derived from an unsaturated (poly)alkylene glycol ether monomer (a1) in the polymer (A1) is the constituent unit (I') derived from an unsaturated (poly)alkylene glycol ether monomer (a2).

The number of milliequivalents of carboxyl groups contained in each gram of polymer (A3) (meq/g) as determined on the unneutralized basis and the preferred range thereof are the same as described for the polymer (A1). Further, in the preferred embodiment of the polymer (A3), the polymer (A3) is preferably the polymer (A2), and more preferably the polymer (C), wherein the $R^2$ of the unsaturated (poly) alkylene glycol ether monomer (a2) is a hydrogen atom.

The above-mentioned polymer (G) is a polymer comprising, as essential constituent units, the constituent unit (I') derived from an unsaturated (poly)alkylene glycol ether monomer (a2) represented by the above general formula (2) and the constituent unit (III) derived from an unsaturated monocarboxylic acid ester monomer (c).

In the above polymer (G), it is necessary that the constituent units (I') and (III) each account for at least 1% by mass relative to all constituent units and that the constituent unit (I') account for not more than 50 mole percent relative to all constituent units. When the proportion of the constituent unit (I') is less than 1% by mass, the unsaturated (poly)alkylene glycol ether monomer (a2)-derived oxyalkylene group content in the polymer (G) is too low and, when the proportion of the constituent unit (III) is less than 1% by mass, the unsaturated monocarboxylic acid ester monomer (c)-derived carboxylic acid ester content in the polymer (G) is too low, so that the polymer cannot produce any sufficient dispersion retaining ability. On the other hand, since the unsaturated (poly)alkylene glycol ether monomer (a2) is low in polymerizability, it is important, for obtaining the polymer (G) with high dispersion retaining ability in high yields, that the proportion of constituent unit (I') be not more than 50 mole percent relative to all constituent units. While the proportion of constituent unit (I') is required to be not less than 1% by mass relative to all constituent units, the proportion is preferably not less than 5% by mass, more preferably not less than 10% by mass, still more preferably not less than 20% by mass, in particular not less than 40% by mass. The proportion of constituent unit (III) is required to be not less than 1% by mass relative to all constituent units but is preferably not less than 2% by mass, more preferably not less than 5% by mass, still more preferably not less than 10% by mass, in particular not less than 20% by mass. The total content (% by mass) of the constituent units (I') and (III) in the polymer (G) is preferably 50 to 100% by mass, more preferably 70 to 100% by mass, of the polymer (G) as a whole.

The above polymer (G) is a polymer comprising the constituent units (I') and (III) as essential constituent units, and may comprise a further copolymerizable monomer-derived constituent unit or units. These constituent units in the polymer (G) each may comprise one single species or two or more species. Therefore, the polymer (G) may comprise a carboxyl group-containing constituent unit in addition to the constituent units (I') and (III). The carboxyl group-containing constituent unit may be the constituent unit (II) derived from an unsaturated monocarboxylic acid monomer (b), the constituent unit (V) derived from an unsaturated dicarboxylic acid monomer (e) or another carboxyl group-containing constituent unit.

In the practice of the present invention, it is preferred that the number of milliequivalents of carboxyl groups contained in each gram of the above polymer (G) as determined on the unneutralized basis be 0 to 0.8 meq/g, hence it is preferred that the content ratios of the polymer (G)-constituting constituent units be selected so that the number of milliequivalents of carboxyl groups in the polymer (G) may fall within such range. For attaining a high level of dispersion retaining ability, in particular, it is more preferable that the above-mentioned number of milliequivalents of carboxyl groups be 0 to 0.7 meq/g, still more preferably 0 to 0.6 meq/g, further more preferably 0 to 0.5 meq/g, in particular 0 to 0.4 meq/g, most preferably 0 to 0.2 meq/g.

The above-mentioned "number of milliequivalents of carboxyl groups contained in each gram of polymer (G) (meq/g) as determined on the unneutralized basis" is intended to include the case where the polymer (G) is in a salt form, like in the case of polymer (A1), and the methods of calculation for the acid form and salt form are the same as mentioned above for the polymer (A1). The polymer (G) may comprise, as the carboxyl group-containing constituent unit, any of the constituent unit (II) derived from an unsaturated monocarboxylic acid monomer (b), the constituent unit (V) derived from an unsaturated dicarboxylic cid monomer (e) and other carboxyl group-containing constituent units, and all carboxyl groups are to be taken into consideration in calculating the number of milliequivalents of carboxyl groups. The number of milliequivalents of carboxyl groups per gram of the above polymer (meq/g) as determined on the unneutralized basis can be determined not only by the above-mentioned monomer-based methods of calculation but also by measuring the acid value of the polymer while taking into consideration the kind of counter ion to the carboxyl groups in the polymer.

The above polymer (G) can be produced by copolymerizing a monomer composition comprising, as essential constituents, an unsaturated (poly)alkylene glycol ether monomer (a2), which provides the constituent unit (I'), and an unsaturated monocarboxylic acid ester monomer (c), which provides the constituent unit (III). The method of production thereof is not limited to such method but may comprise, for example, using a monomer before alkylene oxide addition, namely methallyl alcohol or a like unsaturated alcohol, in lieu of the monomer (a2), copolymerizing the same with a monomer (c) in the presence of a polymerization initiator (where necessary, copolymerizing these monomers with a further monomer(s) copolymerizable therewith) and, thereafter, causing 1 to 500 moles, on average, of an alkylene oxide to add to the resulting copolymer.

Referring to the general formulas (1) and (2) given hereinabove, the number of carbon atoms in $R^1$ in the oxyalkylene group $R^1O$ is suitably 2 to 18 but preferably 2 to 8, more preferably 2 to 4. In the case of alkylene oxide adducts derived from two or more species optionally selected from among ethylene oxide, propylene oxide, butylene oxide, styrene oxide and the like, the mode of addition may be of the random, block and/or alternating type, for instance. For securing a balance between the hydrophilicity and hydrophobicity, it is preferred that the oxyalkylene group comprises the oxyethylene group as an essential constituent, with the oxyethylene group preferably accounting for at least 50 mole percent, more preferably at least 90 mole percent.

In the above general formulas (1) and (2), the mean addition numbers m and n of moles of oxyalkylene group(s) are appropriately 1 to 500. When these mean addition numbers of moles decrease, the hydrophilicity of the polymer obtained tends to decrease, hence the dispersing ability tends to decrease. When they exceed 500, the copolymerizability tends to decrease. Preferably, they are not less than 2, more preferably not less than 5, still more preferably not less than 10, in particular not less than 15, most preferably not less than 20. Preferably, they are not more than 300. The preferred range may be, for example, 2 to 500, 5 to 500, 10 to 500, 15 to 500, or 20 to 300.

In the above general formula (2), $R^2$ may be either a hydrogen atom or a hydrocarbon group containing 1 to 30 carbon atoms. The hydrocarbon group containing 1 to 30 carbon atoms is preferably a hydrocarbon group not having a radical-polymerizable unsaturated bond and is suitably an alkyl group (aliphatic alkyl group or alicyclic alkyl group) containing 1 to 30 carbon atoms or a benzene ring-containing aromatic group containing 6 to 30 carbon atoms such as a phenyl group, an alkylphenyl group, a phenylalkyl group, an (alkyl)phenyl-substituted phenyl group or a naphthyl group. With the increase in the number of carbon atoms in the hydrocarbon group, the hydrophobicity increases and the dispersing ability decreases. Therefore, the number of carbon atoms in $R^2$ when this is a hydrocarbon group is preferably 1 to 22, more preferably 1 to 18, still more preferably 1 to 12, in particular 1 to 4. The case where $R^2$ is a hydrogen atom is most preferred.

In the above general formulas (1) and (2), the number of carbon atoms in the alkenyl group represented by Y is appropriately 2 to 8, preferably not less than 3 but not more than 5. Suitable as the alkenyl group containing 2 to 8 carbon atoms are vinyl, allyl, methallyl, 3-butenyl, 3-methyl-3-butenyl, 3-methyl-2-butenyl, 2-methyl-3-butenyl, 2-methyl-2-butenyl and 1,1-dimethyl-2-propenyl. Among them, allyl, methallyl and 3-methyl-3-butenyl are preferred.

The unsaturated (poly)alkylene glycol ether monomer (a1) represented by the above general formula (1) and the unsaturated (poly)alkylene glycol ether monomer (a2) represented by the above general formula (2), can be produced by various methods but the typical methods are described in the following.

1) When the unsaturated (poly)alkylene glycol ether monomer (a1), and $R^2$ is a hydrogen atom in the general formula (2), the monomers (a1) and (a2) can be produced by causing 1 to 500 moles of at least one alkylene oxide containing 2 to 18 carbon atoms to add to an unsaturated alcohol having an alkenyl group containing 3 to 8 carbon atoms such as allyl alcohol, methallyl alcohol, 3-methyl-3-buten-1-ol, 3-methyl-2-buten-1-ol or 2-methyl-2-buten-1-ol, in the presence of an alkaline catalyst such as potassium hydroxide or sodium hydroxide, or acid catalyst such as boron trifluoride or tin tetrachloride.

2) When $R^2$ is a hydrocarbon group containing 1 to 30 carbon atoms in the above general formula (2), the monomers can be obtained by reacting a halogenated hydrocarbon containing 1 to 30 carbon atoms such as methyl chloride with the resulting compound obtained by adding 1 to 500 moles of at least one alkylene oxide containing 2 to 18 carbon atoms to an unsaturated alcohol in the above method, in the presence of an alkaline catalyst such as sodium hydroxide.

3) When $R^2$ is a hydrocarbon group containing 1 to 30 carbon atoms in the above general formula (2), the monomers can be obtained by reacting a halogenated alkenyl containing 3 to 8 carbon atoms such as allyl chloride or methallyl chloride with the resulting compound obtained by adding 1 to 500 moles of at least one alkylene oxide containing 2 to 18 carbon atoms to an alcohol or phenol containing 1 to 30 carbon atoms such as methanol or phenol, in the presence of an alkaline catalyst such as sodium hydroxide, in the different method from the method mentioned in the above 2).

In the production methods 1) and 2), when a compound containing an active hydrogen such as a saturated alcohol other than the above-mentioned unsaturated alcohol (for example, methanol or ethanol) or water exists in the reaction system on the occasion of adding an alkylene oxide to the unsaturated alcohol, a composition which contains a (poly)alkylene glycol not containing a radical-polymerizable substituent, namely a non-polymerizable (poly)alkylene glycol (P) not containing an alkenyl group as a byproduct, can be obtained by using the above active hydrogen as a starting material, in addition to the main products unsaturated (poly)alkylene glycol ether monomer (a1) and (a2). On the other hand, in the production method 3), since an unreacted alkylene oxide adducts with a halogenated alkenyl corresponds to a non-polymerizable (poly)alkylene glycol (P) not containing an alkenyl group, a composition which contains (poly)alkylene glycol (P) as a byproduct can be obtained. A cement admixture comprising a polymer obtained by copolymerization of a monomer composition containing the unsaturated (poly)alkylene glycol ether monomer (a1) or (a2) produced by the above-mentioned production method 1), 2), or 3), is one preferred mode in the practice of the present invention. Although the (poly)alkylene glycol (P) obtained as a byproduct contains at least one terminal hydrogen atom, when the (poly)alkylene glycol (P) is a (poly)alkylene glycol containing hydrogen atoms at both terminals, for example, (poly)ethylene glycol or (poly)ethylene(poly)propylene glycol, the molecular weight of the (poly)alkylene glycol (P) obtained by using water containing two active hydrogen as a starting material is higher than that of unsaturated (poly)alkylene glycol ether monomer (a1) or (a2) obtained by using an unsaturated alcohol containing one active hydrogen as a starting material. In this case, the molecular weight of the (poly)alkylene glycol (P) is same or twice level of that of unsaturated (poly)alkylene glycol ether monomer (a1) or (a2).

Suited for use as the above unsaturated (poly)alkylene glycol ether monomer (a1) are (poly)ethylene glycol allyl ether, (poly)ethylene glycol methallyl ether, (poly)ethylene glycol 3-methyl-3-butenyl ether, (poly)ethylene(poly)propylene glycol allyl ether, (poly)ethylene(poly)propylene glycol methallyl ether, (poly)ethylene(poly)propylene glycol 3-methyl-3-butenyl ether, (poly)ethylene(poly)butylene glycol allyl ether, (poly)ethylene(poly)butylene glycol methallyl ether and (poly)ethylene(poly)butylene glycol 3-methyl-3-butenyl ether. In the practice of the present invention, one or more of these can be used as monomer(s) (a1) for providing the constituent unit (I).

Suited for use as the above unsaturated (poly)alkylene glycol ether monomer (a2) are methoxy(poly)ethylene glycol allyl ether, methoxy(poly)ethylene glycol methallyl ether, methoxy(poly)ethylene glycol 3-methyl-3-butenyl ether, methoxy(poly)ethylene(poly)propylene glycol allyl ether, methoxy(poly)ethylene(poly)propylene glycol methallyl ether, methoxy(poly)ethylene(poly)propylene glycol 3-methyl-3-butenyl ether, methoxy(poly)ethylene(poly)butylene glycol allyl ether, methoxy(poly)ethylene(poly)butylene glycol methallyl ether and methoxy(poly)ethylene(poly)butylene glycol 3-methyl-3-butenyl ether, in addition to the compounds mentioned above for the unsaturated (poly)alkylene glycol ether monomer (a1) represented by the general formula (1). In the practice of the present invention, one or more of these can be used as monomer(s) (a2) for providing the constituent unit (I').

In the case of the cement admixture (1) comprising the polymer (A1) and polymer (B1) as essential constituents of the invention, two or more monomers (a1) differing in the mean addition number m of moles of an oxyalkylene group can be used in combination as the unsaturated (poly)alkylene glycol ether monomer (a1) represented by the general formula (1). Suitable are combinations of two monomers (a1) differing in m by not less than 10 (preferably differing in m by not less than 20) and combinations of three or more monomers (a1) differing in the mean addition number m of moles by not less than 10 (preferably differing in m by not less than 20) from one another. As regards the ranges of m's to be combined, the combination of a monomer (a1) whose mean addition number m of moles is 40 to 500 and a monomer (a1) whose m is 1 to 40 (with the difference in m being not less than 10, preferably not less than 20) and the combination of a monomer (a1) whose mean addition number m of moles is 20 to 500 and a monomer (a1) whose m is 1 o 20 (with the difference in m being not less than 10, preferably not less than 20) are appropriate. It is possible to use a combination of two or more monomers (a1) differing in the mean addition number m of moles of an oxyalkylene group(s) in each of the polymers (A1) and (C) or to use the above monomers differing in the mean addition number m of moles of an oxyalkylene group(s) from one polymer to another.

In the case of the cement admixtures (2) to (5) of the present invention comprising respectively, as essential constituents, the two kinds of polymer, (2) polymer (A2) and polymer (B2), (3) polymer (A3) and polymer (B3), (4) polymer (A3) and polymer (B4), or (5) polymer (G) and polymer (B5), two or more monomers (a2) differing in the mean addition number n of moles of an oxyalkylene group can be used in combination as the unsaturated (poly)alkylene glycol ether monomer (a2) represented by the general formula (2). Suitable are combinations of two monomers (a2) differing in n by not less than 10 (preferably differing in n by not less than 20) and combinations of three or more monomers (a2) differing in the mean addition number n of by not less than 10 (preferably differing in n by not less than 20) from one another. As regards the ranges of n's to be combined, the same ranges as mentioned above for m in the case of the cement admixture (1) are appropriate. It is possible to use a combination of two or more monomers (a2) differing in the mean addition number n of moles of an oxyalkylene group(s) in each of the polymers (A2), (A3) and (G) or to use the above monomers differing in the mean addition number n of moles of an oxyalkylene group(s) from one polymer to another.

Preferred as the unsaturated monocarboxylic acid monomer (b), which provides the constituent unit (II), are (meth) acrylic acid monomers. Thus preferred are acrylic acid, methacrylic acid and crotonic acid, and monovalent metal salts, divalent metal salts, ammonium salts and organic amine salts of these. From the copolymerizability viewpoint, however, (meth)acrylic acid and salts thereof are more preferred. Two or more of these monomers (b) may be used in combination. In the polymers (A1), (C), (A2), (A3), and (G), however, it is preferred that the monomer (b) used to provide the constituent unit (II) comprise acrylic acid or a salt thereof as an essential constituent.

The unsaturated monocarboxylic acid ester monomer (c) used to provide the constituent unit (III) is an esterification product derived from an unsaturated monocarboxylic acid and a monohydric alcohol, preferably an esterification product derived from a (meth)acrylic acid monomer, namely acrylic acid, methacrylic acid or crotonic acid, used as the unsaturated monocarboxylic acid, and a monohydric alcohol. More specifically, the (poly)alkylene glycol mono (meth)acrylic acid ester monomer (d) capable of providing the constituent unit (IV) represented by the above general formula (3) or a hydrophobic unsaturated monocarboxylic acid ester monomer (f) capable of providing the constituent unit (VI) represented by the general formula (4) is preferred as the unsaturated monocarboxylic acid ester monomer (c). The monomer (c) providing the constituent unit (III) may comprise one single species or two or more of such species as mentioned above.

In the polymer (G), in particular, the constituent unit (III) derived from an unsaturated monocarboxylic acid ester monomer (c) preferably comprises an acrylic acid ester monomer-derived constituent unit as an essential constituent unit. Thus, the unsaturated monocarboxylic acid ester monomer (c), which provides the constituent unit (III), preferably comprises, as an essential constituent, an esterification product derived from acrylic acid and a monohydric alcohol. More specifically, it is preferred that the constituent unit (IV) represented by the above general formula (3) comprise, as an essential constituent unit, a (poly)alkylene glycol monoacrylic acid ester monomer-derived constituent unit (corresponding to the case where, in the above general formula (3), $R^3$ and $R^4$ each is a hydrogen atom) or the constituent unit (VI) represented by the above general formula (4) comprise a hydrophobic acrylic acid ester monomer-derived constituent unit (corresponding to the case where, in the above general formula (4), $R^7$ and $R^8$ each is a hydrogen atom) as an essential constituent unit.

When the (poly)alkylene glycol mono(meth)acrylic acid ester monomer (d), which provides the constituent unit (IV) represented by the above general formula (3), is used as the unsaturated monocarboxylic acid ester monomer (c), which provides the constituent unit (III), the number of carbon atoms contained in the oxyalkylene group $R^5O$ in the above general formula (3) is appropriately 2 to 18 but preferably 2 to 8, more preferably 2 to 4. In the case of adducts of two or more alkylene oxides arbitrarily selected from among ethylene oxide, propylene oxide, butylene oxide, styrene oxide and the like, the mode of addition may be any of the random, block, alternating or other addition types. In the above general formula (3), the mean addition number n of moles of an oxyalkylene group(s) is appropriately 1 to 500 but is preferably 1 to 300, more preferably 1 to 200, still more preferably 1 to 100, in particular 1 to 50. As this mean addition number of moles increases, the copolymerizability with the unsaturated (poly)alkylene glycol ether monomer (a1) which provides the constituent unit (I) or the unsaturated (poly)alkylene glycol ether monomer (a2) which provides the constituent unit (I'), tends to decrease. Furthermore, in the above general formula (3), $R^6$ may be a hydrogen atom or a hydrocarbon group containing 1 to 30 carbon atoms. Appropriate as the hydrocarbon group containing 1 to 30 carbon atoms are those specifically mentioned hereinabove referring to $R^2$. Since, however, the hydrophobicity increases and the dispersing ability decreases as the increase in the number of carbon atoms in the hydrocarbon group, the number of carbon atoms in the hydrocarbon group represented by $R^6$ is preferably 1 to 22, more preferably 1 to 18, still more preferably 1 to 12, in particular 1 to 5.

When the (poly)alkylene glycol mono(meth)acrylic acid ester monomer (d), which provides the constituent unit (IV) represented by the above general formula (3), is used as the unsaturated monocarboxylic acid ester monomer (c) to provide the constituent unit (III), the following are suited for use as the monomer (d): hydroxyalkyl (meth)acrylates (corresponding to the case where, in the above general formula (3), p is 1 and $R^6$ is a hydrogen atom) such as hydroxyethyl (meth)acrylate, hydroxypropyl (meth)acrylate and hydroxybutyl (meth)acrylate; various polyalkylene glycol mono (meth)acrylates (corresponding to the case where, in the above general formula (3), p is not less than 2 and $R^6$ is a hydrogen atom) such as polyethylene glycol mono(meth) acrylate, polypropylene glycol mono(meth)acrylate and polybutylene glycol mono(meth)acrylate; various alkoxy (poly)alkylene glycol mono(meth)acrylates such as methoxy (poly)ethylene glycol mono(meth)acrylate and methoxy (poly)ethylene(poly)propylene glycol mono(meth)acrylate; and the like.

When the (poly)alkylene glycol mono(meth)acrylic acid ester monomer (d) is used, the polymer (G), in particular, preferably comprises a (poly)alkylene glycol monoacrylic acid ester monomer-derived constituent unit as an essential constituent unit. Suitable as the monomer which provides such constituent unit are hydroxyalkyl acrylates (corresponding to the case where, in the above general formula (3), p is 1 and $R^3$, $R^4$ and $R^6$ each is a hydrogen atom) such as 2-hydroxyethyl acrylate, 2-hydroxypropyl acrylate and 2-hydroxybutyl acrylate; various polyalkylene glycol monoacrylates (corresponding to the case where, in the above general formula (3), p is not less than 2 and $R^3$, $R^4$ and $R^6$ each is a hydrogen atom) such as polyethylene glycol monoacrylate, polypropylene glycol monoacrylate and polybutylene glycol monoacrylate; and various alkoxy(poly) alkylene glycol monoacrylates (corresponding to the case where, in the above general formula (3), $R^3$ and $R^4$ each is a hydrogen atom and $R^6$ is a hydrocarbon group containing 1 to 30 carbon atoms) such as methoxy(poly)ethylene glycol monoacrylate and methoxy(poly)ethylene(poly)propylene glycol monoacrylate.

When the hydrophobic unsaturated monocarboxylic acid ester monomer (f), which provides the constituent unit (VI) represented by the above general formula (4), is used as the unsaturated monocarboxylic acid ester monomer (c) to provide the constituent unit (III), $R^9$ in the general formula (4) may be a hydrocarbon group containing 1 to 30 carbon atoms. Suitable as the hydrocarbon group containing 1 to 30 carbon atoms are those specifically mentioned above referring to $R^2$. Since, however, the hydrophobicity increases and the dispersing ability decreases as the increase in the number of carbon atoms in the hydrocarbon group, the number of carbon atoms in the hydrocarbon group represented by $R^9$ is preferably 1 to 22, more preferably 1 to 18, still more preferably 1 to 12, most preferably 1 to 4.

When the hydrophobic unsaturated monocarboxylic acid ester monomer (f), which provides the constituent unit (VI) represented by the above general formula (4), is used as the unsaturated monocarboxylic acid ester monomer (c) to provide the constituent unit (III)), the followings are suited for use as the monomer (f): alkyl (meth)acrylates such as methyl (meth)acrylate, ethyl (meth)acrylate, propyl (meth)acrylate, butyl (meth)acrylate, octyl (meth)acrylate and cyclohexyl (meth)acrylate; and aromatic (meth)acrylates such as phenoxy (meth)acrylate and benzyl (meth)acrylate.

Referring to the polymer (G), in particular, when the hydrophobic unsaturated monocarboxylic acid ester monomer (f) is used, it is preferred that a constituent unit derived from a hydrophobic acrylic acid ester monomer as an essential constituent unit is comprised. Referring to a monomer, which provides the above constituent unit, alkyl acrylates corresponding to the case where $R^7$ and $R^8$ in the general formula (4) are hydrogen atoms and $R^9$ is an alkyl group containing 1 to 30 carbon atoms, more preferably 1 to 22 carbon atoms, still more preferably 1 to 18 carbon atoms, in particular 1 to 12 carbon atoms, most preferably 1 to 4 carbon atoms, are preferred. Suited for use as the above alkyl acrylates are methyl acrylate, ethyl acrylate, propyl acrylate and butyl acrylate.

In producing the above polymers (A1), (C), (A2), (A3), and (G), an unsaturated dicarboxylic acid monomer (e) which provides the constituent unit (V) and/or a monomer (g) which provides the constituent unit (VII) can be used in addition to the monomers providing the essential constituent units.

Suitable as the unsaturated dicarboxylic acid monomer (e), which provides the constituent unit (V) are maleic acid, citraconic acid, fumaric acid, and metal salts, ammonium salts and amine salts of these and, further, maleic anhydride and citraconic anhydride as the anhydrides thereof. Among them, maleic acid or a salt thereof and maleic anhydride are preferred. These monomers (e) may be used singly or two or more may be used in combination.

The monomer (g), which provides the above-mentioned constituent unit (VII), is a monomer other than the monomers (a1) to (f) but copolymerizable with the other monomers. Suitable as such monomer (g) are half esters and diesters derived from unsaturated dicarboxylic acid monomers, such as maleic acid, maleic anhydride, fumaric acid, itaconic acid and citraconic acid, and alcohols containing 1 to 30 carbon atoms; half amides and diamides derived from the above-mentioned unsaturated dicarboxylic acid monomers and amines containing 1 to 30 carbon atoms; half esters and diesters derived from the above-mentioned unsaturated dicarboxylic acid monomers and alkyl(poly)alkylene glycols, which are adducts of 1 to 500 moles of an alkylene oxide(s) containing 2 to 18 carbon atoms with the above-mentioned alcohols or amines; half esters and diesters derived from the above-mentioned unsaturated dicarboxylic acid monomers and glycols containing 2 to 18 carbon atoms or polyalkylene glycols, which are adducts of 2 to 500 moles of an alkylene oxide(s) with such glycols; half amides derived from maleamidic acid and glycols containing 2 to 18 carbon atoms or polyalkylene glycols, which are adducts of 2 to 500 moles of an alkylene oxide(s) with such glycols; (poly)alkylene glycol di(meth)acrylates such as triethylene glycol di(meth)acrylate, (poly)ethylene glycol di(meth)acrylate, polypropylene glycol di(meth)acrylate and (poly)ethylene glycol-(poly)propylene glycol di(meth)acrylate; multifunctional (meth)acrylates such as hexanediol di(meth)acrylate, trimethylolpropane tri(meth)acrylate and trimethylolpropane di(meth)acrylate; (poly)alkylene glycol dimaleates such as triethylene glycol dimaleate and polyethylene glycol dimaleate; unsaturated sulfonic acids and monovalent metal salts, divalent metal salts, ammonium salts and organic amine salts thereof, for example vinylsulfonates, (meth)allylsulfonates, 2-(meth)acryloxyethylsulfonates, 3-(meth)acryloxypropylsulfonates, 3-(meth)acryloxy-2-hydroxypropylsulfonates, 3-(meth)acryloxy-2-hydroxypropyl sulfophenyl ether, 3-(meth)acryloxy-2-hydroxypropyloxysulfobenzoates, 4-(meth)acryloxybutylsufonates, (meth)acrylamidomethylsulfonates, (meth)acrylamidoethylsulfonates, 2-methylpropanesulfonic acid (meth)acrylamide, and styrenesulfonic acid; amides derived from unsaturated monocarboxylic acids and amines containing 1 to 30 carbon atoms, for example methyl(meth)acrylamide; vinyl aromatics such as styrene, α-methylstyrene, vinyltoluene and p-methylstyrene; alkanediol mono(meth)acrylates such as 1,4-butanediolmono(meth)acrylate, 1,5-pentanediol mono(meth)acrylate and 1,6-hexanediol mono(meth)acrylate; dienes such as butadiene, isoprene, 2-methyl-1,3-butadiene and 2-chloro-1,3-butadiene; unsaturated amides such as (meth)acrylamide, (meth)acrylalkylamides, N-methylol(meth)acrylamide and N,N-dimethyl(meth)acrylamide; unsaturated cyano compounds such as (meth)acrylonitrile and α-chloroacrylonitrile; unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate and vinylpyridine; divinyl aromatics such as divinylbenzene; cyanurates such as triallyl cyanurate; and siloxane derivatives such as polydimethylsiloxanepropylaminomaleamidic acid, polydimethylsiloxaneaminopropyleneaminomaleamidic acid, polydimethylsiloxane-bis (propylaminomaleamidic acid), polydimethylsiloxane-bis (dipropyleneaminomaleamidic acid), polydimethylsiloxane-(1-propyl-3-acrylate), polydimethylsiloxane-(1-propyl-3-methacrylate), polydimethylsiloxane-bis(1-propyl-3-acrylate) and polydimethylsiloxane-bis (1-propyl-3-methacrylate). These may be used singly or two or more of them may be used combinedly.

The above polymers (B1), (B2), (B3), (B4) and (B5) are oxyalkylene group- or polyoxyalkylene group- and carboxyl group-containing polymers. These may be used singly or two or more of them may be used combinedly. Further, in this description, polymer (B) means all of the polymer (B1), (B2), (B3), (B4) and (B5).

The above polymer (B) is a polymer other than the corresponding polymer (A) and polymer (G) in the cement admixture. Namely, the polymer (B1) is a polymer other than the polymer (A1) in the cement admixture (1), the polymer (B2) is a polymer other than the polymer (A2) in the cement admixture (2), the polymer (B3) is a polymer other than the polymer (A3) in the cement admixture (3), the polymer (B4) is a polymer other than the polymer (A3) in the cement admixture (4), and the polymer (B5) is a polymer other than the polymer (G) in the cement admixture (5).

Suitable as the oxyalkylene or polyoxyalkylene group, which is an essential structural element of the polymer (B), are oxyalkylene groups containing 2 to 18 carbon atoms, or polyoxyalkylene groups, which are adducts of one or more of such oxyalkylene groups with a mean addition number of moles thereof exceeding 1, preferably not less than 2, more preferably not less than 5, still more preferably not less than 10. Referring to the above (poly)oxyalkylene groups, the number of carbon atoms in the oxyalkylene group is suitably 2 to 18, preferably 2 to 8, more preferably 2 to 4. As for the alkylene oxide adducts derived from two or more alkylene oxides arbitrarily selected from among ethylene oxide, propylene oxide, butylene oxide and styrene oxide, among others, the mode of addition may be of any type, random, block or alternating, for instance. Preferably, however, the oxyalkylene groups comprise an oxyethylene group(s) as essential constituent(s) and, more preferably, oxyethylene groups account for not less than 50 mole percent thereof.

Suitable as the polymers (B1), (B2) and (B5) in the above polymer (B) are polymers (A) (polymers (A1), (A2) and (A3) such as the above-mentioned polymer (C)) or (G) other than the polymer (A) or (G) to be combined, a polymer (polymer (B3)) comprising, as essential constituent units, the constituent unit (IV) derived from (poly)alkylene glycol mono(meth)acrylic acid ester monomer (d) represented by the above general formula (3) and the constituent unit (II) derived from an unsaturated monocarboxylic acid monomer (b), a polymer (polymer (B4)) comprising, as essential constituent units, the constituent unit (I') derived from an unsaturated (poly)alkylene glycol ether monomer (a2) represented by the above general formula (2) and the constituent unit (V) derived from an unsaturated dicarboxylic acid monomer (e), and hydrophilic graft polymers derived from polyether compounds and unsaturated carboxylic acid monomers by graft polymerization, as described in Japanese Kokai Publication Hei-07-53645, Japanese Kokai Publication Hei-08-208769 and Japanese Kokai Publication H0ei-8-208770. Among them, the polymer (B3) or (B4) is preferably used. Thus, in preferred embodiments, the polymer (B) is one of the above-mentioned polymers (B3) and (B4). The polymers (B3) and polymers (B4) may be used singly or two or more of them may be used in combination.

The cement admixtures (1) to (4) according to the present invention comprise at least one polymer (A) and at least one polymer (B), respectively. The combination of polymer (A) and polymer (B) includes the case (1) in which the polymer (A) is combined with the polymer (B) which is other than the polymer (A) and/or the case (2) in which the polymer (A) is combined with the polymer (B) which is another polymer (A) (polymer (A')). In case (1), such cement admixture comprises, as polymer (B), a polymer other than the polymer (A), namely such a polymer (B3) or polymer (B4) as mentioned above and, in case (2), it comprises two or more polymers (A), at least one of which serves as polymer (A) and in which at least one polymer (polymer (A')) other than the polymer (A) serves as polymer (B). The two or more polymers in case (2) are preferably two or more polymers (A) differing in acid value, molecular weight, constituent unit structure and/or constituent unit composition, for instance. In the cement admixture (1), suitable as the combination of two or more polymers differing in constituent unit structure is the combination of polymers differing in the mean addition number m of moles of an oxyalkylene group(s) of the unsaturated (poly)alkylene glycol ether monomer (a1) represented by the general formula (1). In the cement admixtures (2), (3), and (4), suitable as the combination of two or more polymers differing in constituent unit structure is the combination of polymers differing in the mean addition number n of moles of an oxyalkylene group(s) of the unsaturated (poly)alkylene glycol ether monomer (a2) represented by the general formula (2).

In another preferred specific combination of polymer (A1) and polymer (B1) in the cement admixture (1) according to the present invention, the above-mentioned polymer (C) is used as polymer (A1) and a polymer (A) (polymer (A1), (A2) or (A3)), other than the polymer (C), is used as polymer (B1). Further preferred combinations are as follows: combination of polymer (A1) and, as polymer (B1), a polymer (A) (polymer (A1), (A2) or (A3)) differing in constituent unit(s) from the polymer (A1); combination of polymer (A1) and, as polymer (B1), a polymer (A) identical in constituent units to but differing in constituent unit content ratio from the polymer (A1); combination of the above-mentioned polymer(C) as polymer (A1) and, as polymer (B1), a polymer (A) (polymer (A1), (A2) or (A3)) differing in constituent unit(s) from the polymer (C); combination of the above-mentioned polymer (C) as polymer (A1) and, as polymer (B1), a polymer (A1) identical in constituent units to but differing in constituent unit content ratio from the polymer (C); and so forth. Preferred among others, however, is the combined use of two or more polymers differing in the mean addition number m of moles of the oxyalkylene group(s) in the unsaturated (poly)alkylene glycol ether monomer (a1) presented by the above general formula (1), which provides an essential constituent unit in the polymer (A1) or (C).

In another preferred specific combination of polymer (A2) and (B2) in the cement admixture (2) according to the present invention, the above-mentioned polymer (C) is used as polymer (A2) and a polymer (A) (polymer (A1), (A2) or (A3)), other than the polymer (C), is used as polymer (B2). Further preferred combinations are as follows: combination of polymer (A2) and, as polymer (B2), a polymer (A) (polymer (A1), (A2) or (A3)) differing in constituent unit(s) from the polymer (A2); combination of polymer (A2) and, as polymer (B2), a polymer (A) identical in constituent units to but differing in constituent unit content ratio from the polymer (A2); combination of the above-mentioned polymer(C) as polymer (A2) and, as polymer (B2), a polymer (A) (polymer (A1), (A2) or (A3)) differing in constituent unit(s) from the polymer (C); combination of the above-mentioned polymer (C) as polymer (A2) and, as polymer (B2), a polymer (A2) identical in constituent units to but differing in constituent unit content ratio from the polymer (C); and so forth. Preferred among others, however, is the combined use of two or more polymers differing in the addition number n of moles of the oxyalkylene group(s) in the unsaturated (poly)alkylene glycol ether monomer (a2) presented by the above general formula (2), which provides an essential constituent unit in the polymer (A2) or polymer (C).

In the cement admixture (5) according to the present invention, preferred combinations of the polymer (G) and (B5) are as follows: combination of the polymer (G) and, as polymer (B5), a polymer (G) differing in constituent unit(s) from the polymer (G); combination of polymer (G) and, as polymer (B5), a polymer (G) identical in constituent units to but differing in constituent unit content ratio from the polymer (G); combination of polymer (G) and, as polymer (B5), a polymer (A) (a polymer (A1), (A2) or (A3)) other than the polymer (G)

The above polymer (B3) is a polymer comprising, as essential constituent units, the constituent unit (IV) derived from (poly)alkylene glycol mono(meth)acrylic acid ester monomer (d) represented by the above general formula (3) and the constituent unit (II) derived from an unsaturated monocarboxylic acid monomer (b). It may further comprise another or other copolymerizable monomer-derived constituent unit or units. Each of these constituent units in the polymer (B3) may comprise one single species or two or more species.

The ratio between the constituent unit (IV) and constituent unit (II) (constituent unit (IV)/constituent unit (II); % by mass) in the above polymer (B3) is preferably 1 to 99/99 to 1. The total content (% by mass) of the constituent unit (IV) and constituent unit (II) in the polymer (B3) is preferably 50 to 100% by mass, more preferably 70 to 100% by mass, based on the whole polymer (B3). The upper limit to the content of the constituent unit (II) can be placed at a level such that the number of milliequivalents of carboxyl groups contained in the polymer (B3) as determined on the unneutralized basis falls within the range to be mentioned later herein.

Further, for attaining a high level of dispersing ability, the number of milliequivalents of carboxyl groups contained in each gram of polymer (B3) as determined on the unneutralized basis is preferably 0.3 to 3.5 meq/g, and the proportions of the constituent units constituting the polymer (B3) are preferably selected so that the number of milliequivalents of carboxyl groups in the polymer (B3) may fall within such range. The number of milliequivalents of carboxyl groups is more preferably 0.3 to 3.0 meq/g, still more preferably 0.4 to 2.5 meq/g. The polymer (B3) may contain, in addition to the carboxyl group-containing constituent unit (II) derived from an unsaturated monocarboxylic acid monomer (b), a further carboxyl group-containing constituent unit such as the above-mentioned constituent unit (V) derived from an unsaturated dicarboxylic acid monomer (e), hence the number of milliequivalents of carboxyl groups contained in the polymer (B3) is not always limited to that owing to the constituent unit (II).

The above-mentioned "number of milliequivalents of carboxyl groups contained in each gram of polymer (B3) (meq/g) as determined on the unneutralized basis" is intended to include the case where the polymer (B3) is in a salt form, and the methods of calculation for the acid form and salt form are the same as mentioned above for the polymer (A1). When the polymer (B3) comprises a further carboxyl-containing constituent unit (e.g. the constituent unit (V) derived from an unsaturated dicarboxylic acid monomer (e)) other than the constituent unit (II), the number of milliequivalents of carboxyl groups as resulting from such further unit should be included in the calculation. The number of milliequivalents of carboxyl groups per gram of the polymer (B3) (meq/g) as determined on the unneutralized basis can be determined not only by the above-mentioned monomer-based methods of calculation but also by measuring the acid value of the polymer while taking into consideration the kind of counter ion to the carboxyl groups in the polymer.

The above polymer (B3) can be produced, for example, by copolymerizing a monomer component comprising, as essential constituents, a (poly)alkylene glycol mono(meth)acrylic acid ester monomer (d), which provides the constituent unit (IV), and an unsaturated monocarboxylic acid monomer (b), which provides the constituent unit (II). The method of production thereof is not limited to such method but may comprise, for example, directly esterifying at least part of the carboxyl groups of a polymer obtained by polymerizing a monomer component containing a (meth)acrylic acid monomer, namely acrylic acid, methacrylic acid or crotonic acid, as an essential constituent, with an alkoxypolyalkylene glycol having a hydrocarbon group containing 1 to 30 carbon atoms at one terminal.

When, in producing the above polymer (B3), a (poly) alkylene glycol mono(meth)acrylic acid ester monomer (d), which provides the constituent unit (IV), represented by the above general formula (3) is used, the number of carbon atoms in the oxyalkylene group $R^5O$ is suitably 2 to 18 but preferably 2 to 8, more preferably 2 to 4, in the above general formula (3). In the case of alkylene oxide adducts derived from two or more species optionally selected from among ethylene oxide, propylene oxide, butylene oxide, styrene oxide and the like, the mode of addition may be of the random, block and/or alternating type, for instance. For securing a balance between the hydrophilicity and hydrophobicity, it is preferred that the oxyalkylene group comprises the oxyethylene group as an essential constituent, with the oxyethylene group preferably accounting for at least 50 mole percent, more preferably at least 90 mole percent. In the above general formula (3), the mean addition number n of moles of oxyalkylene group(s) is appropriately 1 to 500 but preferably is 2 to 500, more preferably 5 to 500, still more preferably 10 to 500, in particular 15 to 500, most preferably 20 to 300. When this mean addition number of moles decreases, the hydrophilicity of the polymer obtained tends to decrease, hence the dispersing ability tends to decrease. When it exceeds 500, the copolymerizability tends to decrease. Further, in the above general formula (3), $R^6$ may be either a hydrogen atom or a hydrocarbon group containing 1 to 30 carbon atoms but preferably is a hydrocarbon group containing 1 to 30 carbon atoms. Suitable as the hydrocarbon group containing 1 to 30 carbon atoms are those specifically mentioned hereinabove referring to $R^2$. With the increase in the number of carbon atoms in the hydrocarbon group, the hydrophobicity increases and the dispersing ability decreases. Therefore, the number of carbon atoms in $R^6$ when this is a hydrocarbon group is preferably 1 to 22, more preferably 1 to 18, still more preferably 1 to 12, in particular 1 to 5.

When a (poly)alkylene glycol mono(meth)acrylic acid ester monomer (d), which provides the constituent unit (IV) represented by the above general formula (3), is used in producing the above polymer (B3), the monomer (d) includes, among others, (meth)acrylic acid- or crotonic acid-$C_{2-18}$ alkylene oxide adducts; esterification products derived from (meth)acrylic acid or crotonic acid on one hand and, on the other, alkoxypolyalkylene glycols obtained by addition of an alkylene oxide(s) containing 2 to 18 carbons atoms to any of saturated aliphatic alcohols containing 1 to 30 carbon atoms, such as methanol, ethanol, 2-propanol, 1-butanol, 1-pentanol, 1-hexanol, octanol, 2-ethyl-1-hexanol, nonyl alcohol, lauryl alcohol, cetyl alcohol and stearyl alcohol, unsaturated aliphatic alcohols containing 3 to 30 carbon atoms, such as crotyl alcohol and oleyl alcohol, alicyclic alcohols containing 3 to 30 carbon atoms, such as cyclohexanol, and aromatic alcohols containing 6 to 30 carbon atoms, such as phenol, phenylmethanol (benzyl alcohol), methylphenol (cresol), dimethylphenol (xylenol) and nonylphenol. As specific examples of the monomer (d), there may be mentioned the same monomers as mentioned above referring to the case where the monomer (d), which provides the constituent unit (IV), represented by the above general formula (3) is used as the unsaturated monocarboxylic acid ester monomer (c) to provide the constituent unit (III) in the polymer (C). The monomer (d), which provides the constituent unit (IV), to be used in producing the polymer (B3) may comprise one single species or a combination of two or more species.

The unsaturated monocarboxylic acid monomer (b), which provides the constituent unit (II), to be used in producing the polymer (B3) is preferably a (meth)acrylic acid monomer. Preferred species are acrylic acid, methacrylic acid, crotonic acid, and monovalent metal salt, divalent metal salts, ammonium salts, and organic amine salts thereof. From the copolymerizability viewpoint, however, (meth)acrylic acid and salts thereof are more preferred. The monomer (b) may comprise one single species or a combination of two or more species.

In addition to the monomer constituents providing the essential constituent units, any of an unsaturated dicarboxylic acid monomer (e), which provides the constituent unit (V), a hydrophobic unsaturated monocarboxylic acid ester monomer (f), which provides the constituent unit (VI), and a monomer (g), which provides the constituent unit (VII), may be used as another copolymerizable monomer in producing the polymer (B3). Preferred species of such monomers are those already mentioned hereinabove.

The above-mentioned polymer (B4) is a polymer comprising, as essential constituent units, the constituent unit (I') derived from an unsaturated (poly)alkylene glycol ether monomer (a2) represented by the above general formula (2) and the constituent unit (V) derived from an unsaturated dicarboxylic acid monomer (e). It may further comprise another or other copolymerizable monomer-derived constituent unit or units. These constituent units in the polymer (B4) each may comprise one single species or two or more species.

In the above polymer (B4), the constituent unit (I') and constituent unit (V) each accounts for at least 1% by mass of all constituent units, and the proportion of the constituent unit (I') is preferably not more than 50 mole percent of all constituent units. When the proportion of the constituent unit (I') is less than 1% by mass, the content, in the polymer (B4), of the unsaturated (poly)alkylene glycol ether monomer (a2)-derived oxyalkylene group(s) is too low. When the proportion of the constituent unit (V) is less than 1% by mass, the content, in the polymer (B4), of the unsaturated dicarboxylic acid monomer (e)-derived carboxyl groups is too low. In either case, the dispersing ability tends to decrease. Further, since the unsaturated (poly)alkylene glycol ether monomer (a2) is low in polymerizability, it is preferred that the proportion of the constituent unit (I') be not more than 50 mole percent of all constituent units so that the polymer (B4) can be obtained with high dispersing ability and in high yields. The total content (% by mass), in the polymer (B4), of the constituent units (I') and (V) is preferably 50 to 100% by mass, more preferably 70 to 100% by mass, on the whole polymer (B4) basis.

Further, for attaining a high level of dispersing ability, the number of milliequivalents of carboxyl groups contained in each gram of the polymer (B4) as determined on the unneutralized basis is preferably 0.3 to 3.5 meq/g, and the proportions of the constituent units constituting the polymer (B4) are preferably selected so that the number of milliequivalents of carboxyl groups in the polymer (B4) may fall within such range. The number of milliequivalents of carboxyl groups is more preferably 0.3 to 3.0 meq/g, still more preferably 0.4 to 2.5 meq/g. The upper limit to the content of the constituent unit (V) can be placed at a level such that the number of milliequivalents of carboxyl groups contained in the polymer (B4) as determined on the unneutralized basis is within the above range.

The above-mentioned "number of milliequivalents of carboxyl groups contained in each gram of polymer (B4) (meq/g) as determined on the unneutralized basis" is intended to include the case where the polymer (B4) is in a salt form, and the methods of calculation for the acid form and salt form are the same as mentioned above for the polymer (A1). The polymer (B4) may contain, in addition to the constituent unit (V) derived from an unsaturated dicarboxylic acid monomer (e), a further carboxyl-containing constituent unit such as the above-mentioned constituent unit (II) derived from an unsaturated monocarboxylic acid monomer (b), hence the number of milliequivalents of carboxyl groups contained in the polymer (B4) is not always limited to that owing to the constituent unit (V). The number of milliequivalents of carboxyl groups per gram of the polymer (B4) (meq/g) as determined on the unneutralized basis can be determined not only by the above-mentioned monomer-based methods of calculation but also by measuring the acid value of the polymer while taking into consideration the kind of counter ion to the carboxyl groups in the polymer.

The above polymer (B4) can be produced, for example, by copolymerizing a monomer component comprising, as essential constituents, an unsaturated (poly)alkylene glycol ether monomer (a2), which provides the constituent unit (I'), and an unsaturated dicarboxylic acid monomer (e), which provides the constituent unit (V). The method of production thereof is not limited to such method but may comprise, for example, using a monomer before alkylene oxide addition, namely methallyl alcohol or a like unsaturated alcohol, in lieu of the monomer (a2), copolymerizing the same with a monomer (e) in the presence of a polymerization initiator (where necessary copolymerizing these monomers with a further monomer(s) copolymerizable therewith) and, thereafter, causing 1 to 500 moles, on average, of an alkylene oxide to add to the resulting copolymer.

As for the details and specific examples of the polymer (B4)-constituting constituent units and the monomers which provide the constituent units, the corresponding descriptions given hereinabove referring to the polymer (A1) or (A2) are to be referred to.

The above polymers (A), (B) and (G), can be produced by polymerizing monomer compositions comprising the monomers mentioned above, using a polymerization initiator. The polymerization can be carried out in the manner of solution polymerization or bulk polymerization, for instance.

The solution polymerization can be carried out either batchwise or continuously. Suited for use as the solvent on that occasion are water; lower alcohols such as methyl alcohol, ethyl alcohol and isopropyl alcohol; aromatic or aliphatic hydrocarbons such as benzene, toluene, xylene, cyclohexane and n-hexane; ester compounds such as ethyl acetate; and ketone compounds such as acetone and methyl ethyl ketone. These may be used singly or two or more of them may be used in combination. In view of the solubilities of the starting monomers and the polymers (A), (B) and (G) and the convenience in using the polymers, at least one solvent selected from the group consisting of water and lower alcohols containing 1 to 4 carbon atoms is preferably used. In that case, methyl alcohol, ethyl alcohol and isopropyl alcohol are particularly effective among lower alcohols containing 1 to 4 carbon atoms.

In carrying out the polymerization in aqueous solution, use is made, as a radical polymerization initiator, a water-soluble polymerization initiator, for example, a persulfate salt such as ammonium persulfate, sodium persulfate or potassium persulfate; hydrogen peroxide; or a water-soluble azo initiator, for example an azoamidine compound such as 2,2'-azobis-2-methylpropionamidine hydrochloride, a cyclic azoamidine compound such as 2,2'-azobis-2-(2-imidazolin-2-yl)propane hydrochloride, or an azonitrile compound such as 2-carbamoylazoisobutyronitrile and, on that occasion, an accelerator may be used combinedly, for example an alkali metal sulfite such as sodium hydrogen sulfite, a metabisulfite, sodium hypophosphate, an Fe(II) salt such as Mohr's salt, sodium hydroxymethanesulfinate dihydrate, hydroxylamine hydrochloride, thiourea, L-ascorbic acid (salt) or erythorbic acid (salt). When hydrogen peroxide is used as the water-soluble polymerization initiator, such an accelerator as L-ascorbic acid (salt) is preferably used in combination.

In carrying out the polymerization using a lower alcohol, aromatic hydrocarbon, aliphatic hydrocarbon, ester compound or ketone compound as the solvent, a peroxide such as benzoyl peroxide or lauroyl peroxide; a hydroperoxide such as cumene hydroperoxide; or such an azo compound as azobisisobutyronitrile, for instance, is used as the polymerization initiator. On that occasion, an accelerator such as an amine compound may be used in combination. Further, when a mixed solvent composed of water and a lower alcohol is used, an appropriate polymerization initiators or polymerization initiator-accelerator combination can be selected from among the above-mentioned various initiators or initiator-accelerator combinations. The polymerization temperature may appropriately be selected depending on the solvent and polymerization initiator employed. Generally, the polymerization is carried out at 0 to 120° C.

The above-mentioned bulk polymerization is carried out at a temperature of 50 to 200° C. using, as the polymerization initiator, peroxide such as benzoyl peroxide or lauroyl peroxide; a hydroperoxide such as cumene hydroperoxide; or an azo compound such as azobisisobutyronitrile, for instance.

An injection method of each monomer to a reaction vessel is not particularly restricted but includes a method comprising injecting the whole monomers to a reaction vessel collectively at the initial stage, a method comprising injecting the whole monomers to a reaction vessel divisionally or continuously, and a method comprising injecting part of monomers to a reaction vessel at the initial stage and then injecting the remnant to a reaction vessel divisionally or continuously. Specifically, there may be mentioned the following methods (1) to (4).

(1) A method comprising injecting the whole monomers to a reaction vessel continuously.
(2) A method comprising injecting the whole monomer (a1) or (a2) to a reaction vessel collectively at the initial stage, and then injecting the other monomers to a reaction vessel continuously.
(3) A method comprising injecting part of monomer (a1) or (a2) to a reaction vessel at the initial stage and then injecting the remnant of monomer (a1) or (a2) and the other monomers to a reaction vessel continuously.
(4) A method comprising injecting part of monomer (a1) or (a2) and part of the other monomers to a reaction vessel at the initial stage, and then injecting the remnant of monomer (a1) or (a2) and the remnant of the other monomers to a reaction vessel in several portions, respectively by turns.

Further, by varying the injection speed of each monomer to a reaction vessel continuously or gradationally and changing the mass ratio of each injected monomer per time continuously or gradationally, a copolymer mixture containing each constituent unit differing in the content in the copolymer may be synthesized in the polymerization reaction system. In addition, a radical polymerization initiator may be placed in a reaction vessel at the initial stage, or may be added dropwise to a reaction vessel, and these methods may be used combinedly according to need.

For controlling the molecular weight of the product polymer (A), (B) or (G), a chain transfer agent may be used. Suitable as the chain transfer agent are conventional hydrophilic chain transfer agents, for example, thiol type chain transfer agents such as mercaptoethanol, thioglycerol, thioglycolic acid, 3-mercaptopropionic acid, thiomalic acid and 2-mercaptoethane sulfonic acid: secondary alcohol such as isopropyl alcohol: lower oxides such as phosphorous acid, hypophosphorous acid and salts thereof (for example, sodium hypophosphorate and potassium hypophosphorate), sulfurous acid, hydrogen sulfite, dithionic acid, (meth)bisulfurous acid and salts thereof(for example, sodium sulfite, sodium hydrogen sulfite, sodium dithionite and sodium (meth)bisulfite), and salts thereof. Further, the use of hydrophobic chain transfer agent is effective for improvement in cement composition viscosity. Suitable as the hydrophobic chain transfer agent are thiol type chain transfer agents having a hydrocarbon group containing 3 or more carbon atoms such as butanethiol, octanethiol, decanethiol, dodecanethiol, hexadecanethiol, octadecanethiol, cyclohexyl mercaptan, thiophenol, thioglycolic octyl, and 3-mercaptopropionic octyl. It is also possible to use two or more chain transfer agents combinedly and to use a hydrophilic chain transfer agent and hydrophobic chain transfer agent combinedly. Further, the molecular weight of the polymer can also be controlled effectively by using, as the monomer (g), a monomer highly active in chain transfer, for example (meth)allylsulfonic acid (or a salt thereof).

For obtaining the polymer (A), (B) or (G) with a predetermined molecular weight with good reproducibility in the above polymerization, it is necessary that the polymerization reaction proceed in a stable manner. Therefore, in the case of solution polymerization, the dissolved oxygen concentration in the solvent employed at 25° C. is preferably not more than 5 ppm, more preferably 0.01 to 4 ppm, still more preferably 0.01 to 2 ppm, most preferably 0.01 to 1 ppm. When the addition of the monomers to the solvent is followed by purging with nitrogen or the like, it is preferable that the dissolved oxygen concentration in the system, including the monomers, be within the above range.

The adjustment of the dissolved oxygen concentration in the above solvent may be carried out in the polymerization vessel or by using the solvent adjusted in advance with respect to the dissolved oxygen content. Suitable as the method of eliminating oxygen in solvents are the following methods (1) to (5):
(1) A closed vessel containing the solvent is charged with an inert gas, such as nitrogen, under pressure, and the pressure within the closed vessel is then reduced to thereby reduce the partial pressure of oxygen in the solvent. The pressure within the closed vessel may be reduced in a nitrogen stream.
(2) The gaseous phase in a vessel containing the solvent is replaced with an inert gas, such as nitrogen, and the liquid phase is stirred vigorously for a sufficiently long period of time.
(3) The solvent placed in a vessel is bubbled with an inert gas, such as nitrogen, for a sufficiently long period of time.
(4) The solvent is once boiled and then cooled in an inert gas (e.g. nitrogen) atmosphere.
(5) The relevant piping is provided with a static mixer, and the solvent is admixed with an inert gas, such as nitrogen, in the course of transfer to the polymerization vessel through the piping.

Each polymer obtained in the above manner, as such, can be used as a main component of the cement admixture. If necessary, the polymer may be used after neutralization with an alkaline substance. Suitable as the alkaline substance are inorganic salts such as the hydroxides or carbonates of monovalent metals or divalent metals; ammonia; and organic amines. If necessary, the polymer concentration may be adjusted after completion of the reaction. In cases where the constituent unit (III) derived from an unsaturated monocarboxylic acid ester monomer (c), which is one of the essential constituent units in the polymer (A2), (C) or (G), includes an acrylic acid ester monomer-derived constituent unit, it is preferred that the polymerization be carried out in a weakly acidic to neutral pH range (pH 4 to 7) and, after completion of the polymerization reaction, too, the pH be adjusted to 4 to 7 so that the ester bond moiety can be prevented from being hydrolyzed. On the other hand, it is also possible to use an unsaturated monocarboxylic acid ester monomer (c), which provides the constituent unit (III), in lieu of the unsaturated monocarboxylic acid monomer (b), which provides the constituent unit (II), in producing the polymer (A2), (C) or (G) and, after carrying out the copolymerization reaction, adjust the pH to thereby partially hydrolyze the ester bond moiety of the constituent unit (III) derived from an unsaturated monocarboxylic acid ester monomer (c)and thus introduce the constituent unit (II) derived from an unsaturated monocarboxylic acid monomer (b) into the polymer. Since the commercially available unsaturated monocarboxylic acid ester monomers (c) generally contain the corresponding unsaturated monocarboxylic acid monomers (b) in slight amounts, the acid value of the polymer, when measured, is not always equal to 0 (zero) even when the polymerization is carried out under conditions such that the ester bond moiety will not be hydrolyzed during polymerization reaction.

The above polymers (A), (B) and (G) preferably have a weight average molecular weight of 1,000 to 500,000 as determined be gel permeation chromatography (hereinafter referred to as "GPC") on the polyethylene glycol equivalent basis. By selecting such a weight average molecular weight range, it becomes possible to obtain cement admixtures capable of manifesting higher levels of dispersing ability.

More preferably, the molecular weight is not less than 5,000 but not more than 300,000, still more preferably not less than 10,000 but not more than 150,000. The range of the molecular weight is more preferably 5000 to 300000, still more preferably 10000 to 150000.

In the cement admixtures (1) to (4) according to the present invention, the ratio between the polymers (A) and (B), namely the mixing ratio (polymer (A)/polymer (B)) (% by mass), is 1 to 99/99 to 1, preferably 5 to 95/95 to 5, more preferably 10 to 90/90 to 10, although the optimal ratio may vary according to the performance characteristic balances of the polymers combinedly used.

Two or more polymer (A) species and/or two or more polymer (B) species may combinedly be used. Suitable as such combinations of polymer species of each polymer are combinations of two or more polymer species differing in constituent unit(s); combinations of two or more polymer species identical in constituent units but differing in constituent unit contents; combinations of two or more polymer species differing in the mean addition number m of moles of the oxyalkylene group(s) in the unsaturated (poly)alkylene glycol ether monomer (a1) represented by the above general formula (1), which monomer gives one of the essential constituent units in the polymer (A1) or (C); and combinations of two or more polymer species differing in the mean addition number n of moles of the oxyalkylene group(s) in the unsaturated (poly)alkylene glycol ether monomer (a2) represented by the above general formula (2), which monomer gives one of the essential constituent units in the polymer (A2) or (A3).

In the cement admixture (5) according to the present invention, the ratio between the polymers (G) and (B5), namely the mixing ratio (polymer (G)/polymer (B5)) (% by mass), is 1 to 99/99 to 1, preferably 5 to 95/95 to 5, more preferably 10 to 90/90 to 10, although the optimal ratio may vary according to the performance characteristic balances of the polymers combinedly used. Two or more polymer (G) species and/or two or more polymer (B5) species may combinedly be used. Suitable as such combinations of polymer species of each polymer are, for example, combinations of two or more polymer species differing in constituent unit(s); combinations of two or more polymer species identical in constituent units but differing in constituent unit contents; and combinations of two or more polymer species differing in the mean addition number n of moles of the oxyalkylene group(s) in the unsaturated (poly)alkylene glycol ether monomer (a2) represented by the above general formula (2), which monomer gives one of the essential constituent units in the polymer (G).

The cement admixture of this invention preferably comprises a non-polymerizable (poly)alkylene glycol (P) not containing an alkenyl group, in addition to the polymer (A) or (B) as an essential comstituent.

The following polymerization reaction can be carried out using, as a starting material, a composition which comprises a byproduct (poly)alkylene glycol (P) in addition to a main product monomer (a1) or (a2) in producing the unsaturated (poly)alkylene glycol ether monomer (a1) or (a2). As a result, a cement admixture comprising a non-polymerizable (poly)alkylene glycol (P), in addition to the polymer (A)or (G) as an essential constituent, can be obtained. Further, in a monomer composition, used for polymerization reaction, comprising a monomer (a1) or (a2), and (poly)alkylene glycol (P), the suitable proportion of the (poly)alkylene glycol (P) is not less than 0.5% by mass relative to the monomer (a1) or (a2). In order to decrease the proportion of the byproduct (poly)alkylene glycol (P), a long time is needed for conducting dehydration process to remove an impurity comprising an active hydrogen such as water existing in various materials used for addition reaction of an alkylene oxide such as an unsaturated alcohol, at the wall face of the reaction apparatus or in the gas phase, from the reaction system and further, purification process for removing (poly)alkylene glycol (P) after completion of addition reaction of an alkylene oxide is required, hence the productivity of the monomer (a1) or (a2) unfavorably decreases. On the other hand, when the proportion of the (poly)alkylene glycol (P) relative to the monomer (a1) or (a2) exceeds 100% by mass, the monomer concentration decreases during polymerization reaction, hence the molecular weight of the polymer (A) or (G) unfavorably decreases. Thus, the lower limit of the proportion is preferably not less than 1% by mass, more preferably not less than 1.5% by mass, still more preferably not less than 2% by mass, most preferably not less than 2.5% by mass. On the other hand, the upper limit of the proportion is preferably not more than 80% by mass, more preferably not more than 50% by mass, still more preferably not more than 30% by mass, most preferably not more than 20% by mass. The suitable ranges of the proportion may be 0.5 to 100% by mass, 1 to 80% by mass, 1.5 to 50% by mass, 2 to 30% by mass, and 2.5 to 20% by mass.

The proportion of (poly)alkylene glycol (P) relative to the polymer (A) or (B) varies depending on the proportion of an unsaturated (poly)alkylene glycol ether monomer (a1) or (a2) in a monomer composition used for polymerization reaction and the polymerization rate of each monomer. However, the lower limit of the proportion is preferably not less than 1% by mass, more preferably not less than 1.5% by mass, still more preferably not less than 2% by mass, most preferably not less than 2.5% by mass. On the other hand, the upper limit of the proportion is preferably not more than 50% by mass, more preferably not more than 40% by mass, still more preferably not more than 30% by mass, most preferably not more than 20% by mass. The suitable ranges of the proportion may be 1 to 50% by mass, 1.5 to 40% by mass, 2 to 30% by mass, and 2.5 to 20% by mass.

After completion of producing an unsaturated (poly)alkylene glycol ether monomer (a1) or (a2), (poly)alkylene glycol (P) separately synthesized may be added within the range of the above proportion such that the decrease in molecular weight of polymer (A) or (G) owing to the monomer concentration decrease during polymerization reaction can not be generated. Further, after completion of polymerization reaction, (poly)alkylene glycol (P) separately synthesized may be added. The structures of (poly)alkylene glycol (P) added and (poly)alkylene glycol (P) contained as a byproduct may be the same or different. Thus, the cement admixture of the present invention may comprise two or more species of (poly)alkylene glycol (P).

When (poly)alkylene glycol (P) which is a byproduct in producing an unsaturated (poly)alkylene glycol ether monomer (a1) or (a2) is used, the number of carbon atoms contained in oxyalkylene group of the (poly)alkylene glycol (P) corresponds to an alkylene oxide used for producing a monomer (a1) or (a2). On the other hand, when (poly)alkylene glycol (P) separately synthesized is added, the number is appropriately 2 to 18, preferably 2 to 8, more preferably 2 to 4. In the case of alkylene oxide adducts derived from two or more species optionally selected from among ethylene oxide, propylene oxide, butylene oxide, styrene oxide and the like, the mode of addition may be of the random, block and/or alternating type, for instance. For securing a balance between the hydrophilicity and hydrophobicity, it is preferred that the oxyalkylene group comprises the oxyethylene group as an essential constituent, with the oxyethylene group preferably accounting for at least 50 mole percent, more preferably at least 90 mole percent.

When (poly)alkylene glycol (P) which is a byproduct in producing an unsaturated (poly)alkylene glycol ether monomer (a1) or (a2) is used, the terminal group of the (poly) alkylene glycol (P) depends on the production method of a monomer (a1) or (a2) and generally corresponds to $R^2$ in the above general formula (1) or (2), namely is a hydrogen atom or a hydrocarbon group containing 1 to 30 carbon atoms. The specific examples thereof are those mentioned for $R^2$ in the above general formula (1) or (2), however, a hydrogen atom(s) generally binds at one terminal or both terminals. On the other hand, when (poly)alkylene glycol (P) separately synthesized is added, the terminal group of the (poly) alkylene glycol (P) does not depend on the production method of a monomer (a1) or (a2), however, preferably corresponds to $R^2$ in the above general formula (1) or (2), namely is preferably a hydrogen atom or a hydrocarbon group containing 1 to 30 carbon atoms. As for the (poly) alkylene glycol (P) containing hydrogen atoms at both terminals and produced from water as a starting material, specifically, there are may be mentioned (poly)ethylene glycol, (poly)propylene glycol, (poly)ethylene(poly)propylene glycol and (poly)ethylene(poly)butylene glycol. However, since a water-soluble compound is preferred, (poly) ethylene glycol or (poly)ethylene(poly)propylene glycol is more preferred and (poly)ethylene glycol is still more preferred.

When (poly)alkylene glycol (P) which is a byproduct for production of a monomer (a1) or (a2) is used, the weight average molecular weight of (poly)alkylene glycol (P) depends on the production conditions of monomer (a1) or (a2), in particular the mean addition number m or n of moles of oxyalkylene group(s) but generally is 50 to 50000. On the other hand, when (poly)alkylene glycol (P) separately synthesized is added, the range of the weight average molecular weight is preferably 100 to 200000, more preferably 500 to 100000, still more preferably 1000 to 50000.

Preferably, the cement admixture according to the present invention comprises an unsaturated (poly)alkylene glycol ether monomer (a1) or (a2), in addition to the polymer (A) or (G) as an essential constituent. In a preferred embodiment, the cement admixture (1) further comprises the above unsaturated (poly)alkylene glycol ether monomer (a1), and the cement admixtures (2) to (5) further comprise the above unsaturated (poly)alkylene glycol ether monomer (a2).

Since the unsaturated (poly)alkylene glycol ether monomer (a1) or (a2) is not polymerizable by itself, it tends to remain after completion of polymerization reaction. Thus, for decreasing the level of the monomer (a1) or (a2) under the detectable limit value, it is necessary to increase the amount of an initiator, further add an initiator at latter stage of polymerization, or prolong a polymerization reaction time. However, since it becomes difficult to control the molecular weight and/or the productivity tends to decrease, it is preferable to stop the polymerization reaction while the monomer (a1) or (a2) remains. On the other hand, in the case where the proportion of monomer (a1) or (a2) relative to the polymer (A) or (G) exceeds 100% by mass, the dispersing ability of the cement admixture for cement deteriorates unfavorably. Thus, the lower limit of the proportion of monomer (a1) or (a2) relative to the polymer (A) or (G) is suitably not less than 0.5% by mass, preferably not less than 1% by mass, more preferably not less than 2% by mass, still more preferably not less than 3% by mass, and most preferably not less than 4% by mass. On the other hand, the upper limit of the proportion is suitably not more than 100% by mass, preferably not more than 90% by mass, more preferably not more than 80% by mass, still more preferably not more than 70% by mass, and most preferably not more than 60% by mass. As for the suitable range of the proportion, there may be mentioned 0.5 to 100% by mass, 1 to 90% by mass, 2 to 80% by mass, 3 to 70% by mass, and 4 to 60% by mass. After completion of producing the polymer (A) or (G), the monomer (a1) or (a2) may be added within the range of the above proportion such that the decrease in dispersing ability for cement cannot be induced. The structures of the monomer (a1) or (a2) added and the monomer (a1) or (a2) remained as an unreacted monomer may be the same or different.

The preferred method for producing the polymer (A) or (G) comprises carrying out polymerization reaction using a composition which comprises a non-polymerizable (poly) alkylene glycol (P) not containing an alkenyl group as a starting material, in addition to a monomer composition comprising an unsaturated (poly)alkylene glycol ether monomer (a1) or (a2) as an essential constituent, and stoping the polymerization reaction while the monomer (a1) or (a2) remains. In this manner, the cement admixture of the invention comprising a monomer (a1) or (a2), and (poly)alkylene glycol (P) in addition to the polymer (A) or (G) can be obtained easily. The composition which comprises a non-polymerizable (poly)alkylene glycol (P) not containing an alkenyl group, in addition to an unsaturated (poly)alkylene glycol ether monomer (a1) or (a2) can be obtained by the above-mentioned method for producing an unsaturated (poly)alkylene glycol ether monomer (a1) or (a2).

The cement admixtures (1) to (5) according to the invention comprises two polymers, namely (1) the polymers (A1) and (B1), (2) the polymers (A2) and (B2), (3) the polymers (A3) and (B3), (4) the polymers (A3) and (B4) and (5) the polymers (G) and (B5), as essential constituents. Each polymer may be used, as a main constituent of the cement admixture, in the form of an aqueous solution, or in the form of a powder prepared by neutralizing with the hydroxide of a divalent metal such as calcium or magnesium to give a polyvalent metal salt, followed by drying, or by causing the polymer or salt to be carried on an inorganic powder such as a fine silicic powder, followed by drying.

The cement admixtures (1) to (5) according to the invention can be used in various hydraulic materials, namely in cement and other hydraulic materials then cement, for example gypsum. Preferred examples of the hydraulic composition comprising a hydraulic material, water and the cement admixture according to the invention, if necessary together with a fine aggregate (e.g. sand) or a coarse aggregate (e.g. crushed stone), are cement paste, mortar, concrete and plaster.

Among the hydraulic compositions mentioned above, cement compositions in which cement is used as the hydraulic material are in commonest use. Such cement compositions comprise the above-mentioned cement admixture, cement and water as essential constituents. Such cement compositions also constitute an aspect of the present invention.

Suited for use as the cement in the cement composition according to the invention are portland cement species (ordinary, high-early-strength, ultra high-early-strength, moderate heat, sulfate persisting, and low alkali grades thereof), various blended cement species (blast furnace slag cement, silica cement, fly ash cement), white portland cement, alumina cement, ultra rapid hardening cement (one clinker ultra rapid hardening cement, two clinker ultra rapid hardening cement, magnesium phosphate cement), grouting cement, oil-well cement, lower calorific value cement (lower calorific value blast furnace slag cement, fly ash-mixed lower calorific value blast furnace slag cement, high belite cement), ultrahigh strength cement, cement-based hardening materials, and economical cement (cement produced by using at least one of municipal refuse incineration ash and sewage sludge incineration ash as a material). Fine powders such as blast furnace slag, fly ash, cinder ash, clinker ash, husk ash, silica fume, silica powder and limestone powder, and gypsum may further be added. Usable as the aggregate are gravel, crushed stone, water granulated blast furnace slag, recycled concrete aggregate and, further, fireproof aggregates such as silica stone-based, clay-based, zircon-based, high alumina, silicon carbide-based, graphite-based, chrome-based, chrome-magnesite, and magnesia-based ones.

As for the unit water amount, the amount of cement and the water/cement ratio in each cubic meter of the cement composition according to the invention, the unit water amount of 100 to 185 kg/m$^3$, the amount of cement as used of 250 to 800 kg/m$^3$, and the water/cement ratio (mass ratio) of 0.1 to 0.7 are preferred. More preferably, the unit water amount of 120 to 175 kg/M$^3$, the amount of cement as used of 270 to 800 kg/m$^3$, and the water/cement ratio (mass ratio) of 0.2 to 0.65 are recommended for wide use in poor to rich mixtures, inclusive of high strength concrete with a high unit cement amount to poor concrete with the unit cement amount of 300 kg/m$^3$ or lower.

The level of addition of the cement admixtures (1) to (5) according to the invention in the cement composition according to the invention is preferably 0.01 to 5.0% by mass based on the mass of cement when it is used in mortar or concrete, for instance, in which hydraulic cement is used. By this addition, various favorable effects, such as reduction in unit water amount, increase in strength and improvement in durability, are realized. When the above addition level is lower than 0.01%, the performance characteristics may become insufficient. Conversely, when it exceeds 5.0%, the effects will substantially reach the peak and this may be disadvantageous from the economical viewpoint. A more preferred addition level is not lower than 0.02% but not higher than 2.0%, still more preferably not lower than 0.05% but not higher than 1.0%. Thus, recommendably, the admixture is added at such an addition level. The range of the addition level is more preferably 0.02 to 2.0%, still more preferably 0.05 to 1.0%.

The cement admixtures (1) to (5) of the present invention may be used in combination with one or plural conventional cement dispersants. When such a conventional cement dispersant(s) is (are) used, the mixing ratio between the cement admixture of the invention and the conventional cement dispersant(s) is preferably 1/99 to 99/1, more preferably 5/95 to 95/5, still more preferably 10/90 to 90/10, although it cannot be specified in a wholesale manner since it depends on the conventional cement dispersant species employed, the formulation, the test conditions and so forth.

Suited for combined use as the conventional cement dispersant is a sulfonic acid type dispersant (S) containing a sulfonic acid group in the molecule. By using a sulfonic acid type dispersant (S) containing a sulfonic acid group in the molecule in combination, a cement admixture having high dispersion retaining ability, and showing a stable dispersing ability not depending on a cement brand or lot number, can be obtained. A sulfonic acid type dispersant (S) exhibits dispersing ability for cement due to the mainly sulfonic acid group-induced electrostatic repulsion. Various conventional sulfonic acid type dispersants may be used but a compound containing an aromatic group in the molecule is preferred. Specifically, there may be mentioned (poly)alkyl aryl sulfonic acid salt type such as naphthalenesulfonic acid-formaldehyde condensates, methylnaphthalenesulfonic acid-formaldehyde condensates, and anthracenesulfonic acid-formaldehyde condensates; melamineformalin resin sulfonic acid salt type such as melaminesulfonic acid-formaldehyde condensates; aromatic aminosulfonic acid salt type such as aminoarylsulfonic acid-phenol-formaldehyde condensates; ligninsulfonic acid salt type such as ligninsulfonic acid salts and modified ligninsulfonic acid salts; polystyrenesulfonic acid salt type, and like sulfonic acid type dispersants. When the water/cement ratio in concrete is high, ligninsulfonic acid salt type dispersants are preferably used. On the other hand, when the water/cement ratio in concrete is at middle level, (poly)alkyl aryl sulfonic acid salt type, melamineformalin resin sulfonic acid salt type, aromatic aminosulfonic acid salt type or polystyrenesulfonic acid salt type dispersants are preferably used, which have the higher dispersion ability. Further, two or more sulfonic acid type dispersants (S) containing a sulfonic acid group in the molecule may be used in combination.

An aqueous solution in which each polymer component in the cement admixture of the invention (the polymer (A), (B) and (G)) and a sulfonic acid type dispersant (S) containing a sulfonic acid group in the molecule are dissolved together, prior to mixing a cement composition may be added to a cement. Further, aqueous solutions in which each component is dissolved respectively may be added respectively to a cement during mixing a cement composition, each component prepared in a powder form may be added to a cement during mixing a cement composition, and any aqueous solution and/or any component prepared in a powder form may be added to a cement during mixing a cement composition.

The ratio of the cement admixtures (1) to (5) and a sulfonic acid type dispersant (S) containing a sulfonic acid group in the molecule, namely (total content of each polymer component (polymer (A), (B), or (G)) in any of the cement admixtures (1) to (5)/sulfonic acid type dispersant (S)) (% by mass) varies depending on the performance balance between the cement admixture of the invention and sulfonic acid type dispersant (S) containing a sulfonic acid group in the molecule used in combination, however, it is preferably 1 to 99/99 to 1, more preferably 5 to 95/95 to 5, still more preferably 10 to 90/90 to 10.

The addition proportion of the cement admixture which comprises as essential constituents, the cement admixtures (1) to (5) according to the present invention and a sulfonic acid type dispersant (S) containing a sulfonic acid group in the molecule to cement, when they applied to mortar or concrete using hydraulic cement, is preferably 0.01 to 10.0% on cement mass basis. It is more preferably 0.02 to 5.0%, still more preferably 0.05 to 2.0%.

Further, when the water/cement ratio is comparatively high and especially high dispersing ability is not required, a cement admixture (hereinafter referred to as cement admixture (6)) comprising, as essential constituents, the polymer (A) or (G), and a sulfonic acid type dispersant (S) containing a sulfonic acid group in the molecule, is suitable.

The cement admixture (6) preferably comprises a non-polymerizable (poly)alkylene glycol (P) not containing an alkenyl group, in addition to the polymer (A) or (G) as an essential constituent. Detailed explanations for (poly)alkylene glycol (P), for example, the ratio of (poly)alkylene glycol (P) relative to the polymer (A) or (G) are those specifically mentioned for the above cement admixtures (1) to (5).

The cement admixture (6) preferably further comprises an unsaturated (poly)alkylene glycol ether monomer (a1) or (a2), in addition to the polymer (A) or (G) as an essential constituent. Detailed explanations for an unsaturated (poly)alkylene glycol ether monomer (a1) or (a2), for example, the ratio of an unsaturated (poly)alkylene glycol ether monomer (a1) or (a2) relative to the polymer (A) or (G) are those specifically mentioned for the above cement admixtures (1) to (5).

The cement admixture (6) preferably further comprises a monomer (a1) or (a2), and (poly)alkylene glycol (P), in addition to the polymer (A) or (G) as an essential constituent. The production method of a cement admixture comprising a monomer (a1) or (a2), and (poly)alkylene glycol (P), in addition to the polymer (A) or (G) as an essential constituent and so on, are those specifically mentioned for the above cement admixtures (1) to (5).

In the cement admixture (6), the ratio of polymer (A) or (G), and a sulfonic acid type dispersant (S) containing a sulfonic acid group in the molecule, namely the addition proportion (polymer (A) or (G)/sulfonic acid type dispersant (S)) (% by mass) varies depending on the performance characteristic balance between the polymer (A) or (G), and sulfonic acid type dispersant (S) containing a sulfonic acid group in the molecule used in combination, however, it is preferably 1 to 99/99 to 1, more preferably 5 to 95/95 to 5, still more preferably 10 to 90/90 to 10. In addition, two or more of the polymer (A), (G), and sulfonic acid type dispersant (S) containing a sulfonic acid group in the molecule respectively, may be used in combination.

The addition proportion of the cement admixture (6) to cement, when they applied to mortar or concrete using hydraulic cement, is preferably 0.01 to 10.0% on cement mass basis. It is more preferably 0.02 to 5.0%, still more preferably 0.05 to 2.0%.

Further, the cement admixture (6) may be used for various hydraulic materials. A cement composition comprising, as essential constitutes, the cement admixture (6), cement and water constitutes one aspect of the present invention, and usable cement and so on are those specifically mentioned for the above cement admixtures (1) to (5).

The cement composition according to the invention is effective in ready mixed concrete, concrete for secondary concrete products (precast concrete), centrifugal molded concrete, vibrating compacted concrete, steam cured concrete, concrete for spraying and the like and, further, it is effective also in mortar and concrete species required to have high flowability, such as medium flowing concrete (concrete showing a slump value of 22 to 25 cm), high flowing concrete (concrete showing a slump value of not less than 25 cm and a slump flow value of 50 to 70 cm), self-filling concrete and self-leveling materials.

The cement composition according to the invention may further comprise one or more of other known cement additives (ingredients) such as listed below under (1) to (20):

(1) Water-soluble polymeric substances: unsaturated carboxylic acid polymers such as polyacrylic acid (sodium salt), polymethacrylic acid (sodium salt), polymaleic acid (sodium salt), and acrylic acid-maleic acid copolymer sodium salt; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharide derivatives derived from alkylated or hydroxyalkylated derivatives of polysaccharides, such as methylcellulose, ethylcellulose, hydroxyethylcellulose and hydroxypropylcellulose, by substitution of a part or all of hydroxyl hydrogen atoms with a hydrophobic substituent comprising a hydrocarbon chain containing 8 to 40 carbon atoms as a partial structure and an ionic hydrophilic substituent containing a sulfonic acid group or a salt thereof as a partial structure; yeast glucans, xanthan gum, β-1,3-glucans (linear or branched, e.g. curdlan, paramylon, pachyman, scleroglucan, rhamnalan) and like polysaccharides produced by microbial fermentation; polyacrylamide; polyvinyl alcohol; starch; starch phosphoric acid ester; sodium alginate; gelatin; amino-containing acrylic acid copolymers and quaternization products derived therefrom.

(2) Polymer emulsions: copolymers of various vinyl monomer such as alkyl (meth)acrylates.

(3) Retarders: hydroxycarboxylic acids such as gluconic acid, glucoheptonic acid, arabonic acid, malic acid, citric acid, and inorganic or organic salts thereof such as sodium, potassium, calcium, magnesium, ammonium and triethanolamine salts; monosaccharides such as glucose, fructose, galactose, saccharose, xylose, apiose, ribose and invert sugar, oligosaccharides such as disaccharides and trisaccharides, such oligosaccharides as dextrin, polysaccharides such as dextran, and other saccharides such as molasses containing these; sugar alcohols such as sorbitol; magnesium silicofluoride; phosphoric acid and salts thereof, or borate esters; aminocarboxylic acids and salts thereof; alkali-soluble proteins; humic acid; tannic acid; phenols; polyhydric alcohols such as glycerol; phosphonic acids and derivatives thereof, such as aminotri(methylenephosphonic acid), 1-hydroxyethylidene-1,1-diphosphonic acid, ethylenediaminetetra(methylenephosphonic acid), diethylenetriaminepenta(methylenephosphonic acid), and alkali metal or alkaline earth metal salts thereof, etc.

(4) Early strengthening agents/accelerators: soluble calcium salts such as calcium chloride, calcium nitrite, calcium nitrate, calcium bromide and calcium iodide; chlorides such as iron chloride and magnesium chloride; sulfate salts; potassium hydroxide; sodium hydroxide; carbonate salts; thiosulfate salts; formic acid and formate salts such as calcium formate; alkanolamines; alumina cement; calcium aluminosilicate, etc.

(5) Mineral oil-based antifoaming agents: kerosene, liquid paraffin, etc.

(6) Fat- or oil-based antifoaming agents: animal or vegetable oils, sesame oil, castor oil, alkylene oxide adducts derived therefrom, etc.

(7) Fatty acid-based antifoaming agents: oleic acid, stearic acid, and alkylene oxide adducts derived therefrom, etc.

(8) Fatty acid ester-based antifoaming agents: glycerol monoricinolate, alkenylsuccinic acid derivatives, sorbitol monolaurate, sorbitol trioleate, natural waxes, etc.

(9) Oxyalkylene type antifoaming agents: polyoxyalkylenes such as (poly)oxyethylene(poly)oxypropylene adducts; (poly)oxyalkyl ethers such as diethylene glycol heptyl ether, polyoxyethylene oleyl ether, polyoxypropylene butyl ether, polyoxyethylenepolyoxypropylene 2-ethylhexyl ether, and higher ($C_{12}$–$C_{14}$) alcoholoxyethyleneoxypropylene adducts; (poly)oxyalkylene (alkyl)aryl ethers such as polyoxypropylene phenyl ether and polyoxyethylene nonylphenyl ether; acetylene ethers produced by addition polymerization of an alkylene oxide onto an acetylene alcohol such as 2,4, 7,9-tetramethyl-5-decyne-4,7-diol, 2,5-dimethyl-3-hexyne-2,5-diol or 3-methyl-1-butyn-3-ol; (poly)oxyalkylene fatty acid esters such as diethylene glycol oleate, diethylene glycol laurate and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl) ether sulfate ester salts such as polyoxypropylene methyl ether sulfate sodium salt and polyoxyethylene dodecylphenyl ether sulfate sodium salt; (poly)oxyalkylene alkylphosphate esters such as polyoxyethylene stearylphosphate; (poly)oxyalkylenealkylamines such as polyoxyethylenelaurylamine; polyoxyalkyleneamides, etc.

(10) Alcohol-based antifoaming agents: octyl alcohol, hexadecyl alcohol, acetylene alcohols, glycols, etc.

(11) Amide-based antifoaming agents: acrylate polyamines, etc.

(12) Phosphate ester-based antifoaming agents: tributyl phosphate, sodium octylphosphate, etc.

(13) Metal salt-based antifoaming agents: aluminum stearate, calcium oleate, etc.

(14) Silicone-based antifoaming agents: diemthylsilicone oil, silicone paste, silicone emulsions, organic group-modified polysiloxanes (organosiloxanes such as dimethylpolysiloxane), fluorosilicone oils, etc.

(15) Air-entraining (AE) agents: resin soaps, saturated or unsaturated fatty acids, sodium hydroxystearate, lauryl sulfate, ABSs (alkylbenzenesulfonates), LASs (linear alkylbenzenesulfonates), alkanesulfonates, polyoxyethylene alkyl(phenyl) ethers, polyoxyethylene alkyl(phenyl) ether sulfate esters or salts thereof, polyoxyethylene alkyl(phenyl) ether phosphate esters or salts thereof, proteinic materials, alkenylsulfosuccinates, α-olefinsulfonates, etc.

(16) Other surfactants: polyalkylene oxide derivatives derived from aliphatic monohydric alcohols containing 6 to 30 carbon atoms within the molecule, such as octadecyl alcohol and stearyl alcohol, alicyclic monohydric alcohols containing 6 to 30 carbon atoms within the molecule, such as abietyl alcohol, monofunctional mercaptans containing 6 to 30 carbon atoms within the molecule, such as dodecylmercaptan, alkylphenols containing 6 to 30 carbon atoms within the molecule, such as nonylphenol, amines containing 6 to 30 carbon atoms within the molecule, such as dodecylamine, or carboxylic acids containing 6 to 30 carbon atoms within the molecule, such as lauric acid and stearic acid, by addition of not less than 10 moles of an alkylene oxide(s) such as ethylene oxide and/or propylene oxide; alkyldiphenyl ether sulfonic acid salts in which two sulfo-containing phenyl groups, which may optionally have an alkyl group or alkoxy group as a substituent, is bonded via ether bonding; various anionic surfactants; various cationic surfactants such as alkylamine acetates and alkyltrimethylammonium chlorides; various nonionic surfactants; various amphoteric surfactants, etc.

(17) Waterproofing agents: fatty acids (salts), fatty acid esters, fats and oils, silicones, paraffins, asphalt, waxes, etc.

(18) Rust preventives: nitrite salts, phosphate salts, zinc oxide, etc.

(19) Cracking reducing agents: polyoxyalkyl ethers etc.

(20) Expansive admixtures: ettringite type, coal-derived type, etc.

As other conventional cement additives (ingredients), there may be mentioned cement wetting agents, thickening agents, separation reducing agents, flocculants, drying shrinkage reducing agents, strength increasing agents, self-leveling agents, rust preventives, colorants, antifungal agents and so on. It is also possible to combinedly use a plurality of the cement additives (constituents) mentioned above.

The following combinations 1) to 4) of constituents other than cement and water in the cement composition according to the invention may be mentioned as particularly preferred embodiments:

1) Combination of (1) a cement admixture according to the invention and (2) an oxyalkylene type antifoaming agent as two essential constituents. The proportion of the oxyalkylene type antifoaming agent (2) is preferably 0.01 to 10% by mass relative to the cement admixture (1).

2) Combination of (1) a cement admixture according to the invention and (2) a material separation reducing agent as two essential constituents. Usable as the material separation reducing agent are various thickening agents such as nonionic cellulose ethers, and compounds containing, as partial structures, a hydrophobic substituent comprising a hydrocarbon chain containing 4 to 30 carbon atoms and a polyoxyalkylene chain resulting from addition of 2 to 300 moles, on average, of an alkylene oxide(s) containing 2 to 18 carbon atoms, among others. The mixing ratio, by mass, between the cement admixture (1) and material separation reducing agent (2) is preferably 10/90 to 99.99/0.01, more preferably 50/50 to 99.9/0.1. Cement compositions containing this combination are suited for use as high flowing concrete, self-filling concrete and self-leveling compositions.

3) Combination of (1) a cement admixture according to the invention and (2) a retarder as two essential constituents. Usable as the retarder are hydroxycarboxylic acids such as gluconic acid (salts) and citric acid (salts), saccharides such as glucose, sugar alcohols such as sorbitol, and phosphonic acids such as aminotri(methylenephosphonic acid), among others. The mixing ratio, by mass, between the cement admixture (1) and retarder (2) is preferably 50/50 to 99.9/0.1, more preferably 70/30 to 99/1.

4) Combination of (1) a cement admixture according to the invention and (2) an accelerator as two essential constituents. Usable as the accelerator are soluble calcium salts such as calcium chloride, calcium nitrite and calcium nitrate, chlorides such as iron chloride and magnesium chloride, thiosulfate salts, formic acid, and formate salts such as calcium formate, among others. The mixing ratio, by mass, between the cement admixture (1) and accelerator (2) is preferably 10/90 to 99.9/0.1, more preferably 20/80 to 99/1.

The cement admixture of the present invention shows high cement dispersing ability at low addition levels, in particular capable of displaying excellent initial dispersing ability and dispersion retaining ability even in a high water reducing ratio range, and a cement composition in which this admixture is used. The cement composition comprising the cement admixture of the invention shows good flowability and can avoid troubles otherwise encountered in construction works.

BEST MODES FOR CARRYING OUT THE INVENTION EXAMPLES

The following examples illustrate the present invention more specifically. They are, however, by no means limitative of the scope of the invention. In the examples, "%" denotes "% by mass" and "part(s)" means "part(s) by weight", unless otherwise specified.

<Weight Average Molecular Weight Determination Conditions>
Apparatus: Waters LCM1 (product of Waters Corp.)
Detector: differential refractometer (RI) detector (Waters 410) (product of Waters Corp.)
Eluent: species: acetonitrile/0.05 M deionized water solution of sodium acetate (40/60% by volume), adjusted to pH 6.0 with acetic acid
flow rate: 0.6 ml/min
Column: species: product of Tosoh Corp., TSK-GEL G4000SWXL+G3000SWXL+G2000SWXL+GUARD COLUMN (each 7.8×300 mm, 6.0×40 mm)
temperature: 40° C.
Working curve: polyethylene glycol standards <Determination Conditions of Conversion of Starting Monomer>
Apparatus: Borwin (product of JASCO Corp.)
Detector: differential refractometer (RI) detector (HITACHI 3350 RI MONITOR) (product of Hitachi Corp.)
Eluent: species: acetonitrile/0.1% deionized water solution of phosphoric acid (50/50% by volume)
flow rate: 1.0 ml/min
Column: species: product of Tosoh Corp., ODS-120T+ODS-80Ts (each 4.6×250 mm)
temperature: 40° C.

<Determination Conditions of Production Amount of Non-polymerizable Polyalkylene Glycol Not Containing an Alkenyl Group>
Apparatus: LC-10 (product of Shimadzu Corp.)
Detector: differential refractometer (RI) detector (HITACHI 3350 RI MONITOR) (product of Hitachi Corp.)
Eluent: species: deionized water
flow rate: 1.5 ml/min
Column: species: product of Showa Denko Corp., Shodex GF-310 (4.6×300 mm)
temperature: 40° C.

Production Example 1

A glass-made reaction vessel equipped with a thermometer, a stirrer, a dropping funnel, a nitrogen inlet tube, and a reflux condenser was charged with 277 parts of deionized water, and 400 parts of unsaturated polyalkylene glycol ether derived from 3-methyl-3-buten-1-ol by addition of 50 moles, on average, of ethylene oxide. After raising the temperature to 65° C., an aqueous hydrogen peroxide solution composed of 0.670 part of hydrogen peroxide and 12.73 parts of deionized water was added thereto. Then, 58.4 parts of acrylic acid was added dropwise to the reaction vessel over 3 hours, and at the same time, an aqueous solution prepared by dissolving 0.868 part of L-ascorbic acid and 1.569 parts of 3-mercaptopropionic acid in 16.49 parts of deionized water was added dropwise over 3.5 hours. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 60%. The reaction mixture was then neutralized to pH 7 with an aqueous solution of sodium hydroxide at a temperature not higher than the polymerization reaction temperature to give a polymer (A-1), corresponding to the polymer (A) according to the present invention, composed of an aqueous solution of the polymer having a weight average molecular weight of 30,500. For the polymer obtained, the conversion (%) of each starting monomer, the composition ratio of copolymer (ratio of the constituent unit derived from each monomer)(% by mass), the composition ratio of copolymer (ratio of the constituent unit derived from each monomer) (mole %), and the carboxylic acid content (meq/g) calculated on the unneutralized polymer basis are shown in Table 1.

Production Example 2

A glass-made reaction vessel equipped with a thermometer, a stirrer, a dropping funnel, a nitrogen inlet tube, and a reflux condenser was charged with 277 parts of deionized water, and 400 parts of unsaturated polyalkylene glycol ether derived from methallyl alcohol by addition of 50 moles, on average, of ethylene oxide. After raising the temperature to 65° C., an aqueous hydrogen peroxide solution composed of 0.630 part of hydrogen peroxide and 11.98 parts of deionized water was added thereto. Then, 54.1 parts of acrylic acid was added dropwise to the reaction vessel over 3 hours, and at the same time, an aqueous solution prepared by dissolving 0.816 part of L-ascorbic acid and 1.968 parts of 3-mercaptopropionic acid in 15.51 parts of deionized water was added dropwise over 3.5 hours. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 60%. The reaction mixture was then neutralized to pH 7 with an aqueous solution of sodium hydroxide at a temperature not higher than the polymerization reaction temperature to give a polymer (A-2), corresponding to the polymer (A) according to the present invention, composed of an aqueous solution of the polymer having a weight average molecular weight of 28,000. For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 3

A glass-made reaction vessel equipped with a thermometer, a stirrer, a dropping funnel, a nitrogen inlet tube, and a reflux condenser was charged with 220 parts of deionized water, and 400 parts of unsaturated polyalkylene glycol ether derived from allyl alcohol by addition of 75 moles, on average, of ethylene oxide. After raising the temperature to 80° C., an aqueous hydrogen peroxide solution composed of 1.610 parts of hydrogen peroxide and 30.59 parts of deionized water was added thereto. Then, 34.0 parts of acrylic acid was added dropwise to the reaction vessel over 3 hours, and at the same time, an aqueous solution prepared by dissolving 2.085 parts of L-ascorbic acid and 0.628 part of 3-mercaptopropionic acid in 39.62 parts of deionized water was added dropwise over 3.5 hours. Thereafter, the temperature was further maintained at 80° C. for 1 hour, and thereafter the polymerization reaction was finished. The polymerizable component concentration (mass % concentration of all monomer components relative to all raw materials) at the time of finish of the polymerization reaction was 60%. The reaction mixture was then neutralized to pH 7 with an aqueous solution of sodium hydroxide at a temperature not higher than the polymerization reaction temperature to give a polymer (A-3), corresponding to the polymer (A) according to the present invention, composed of an aqueous solution of the polymer having a weight average molecular weight of 30,000. For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 4

A glass-made reaction vessel equipped with a thermometer, a stirrer, a dropping funnel, a nitrogen inlet tube, and a reflux condenser was charged with 278 parts of deionized water, and 400 parts of unsaturated polyalkylene glycol ether derived from 3-methyl-3-buten-1-ol by addition of 25 moles, on average, of ethylene oxide. After raising the temperature to 65° C., an aqueous hydrogen peroxide solution composed of 0.627 part of hydrogen peroxide and 11.91 parts of deionized water was added thereto. Then, 17.7 parts of acrylic acid and 39.3 parts of 2-hydroxyethyl acrylate were added dropwise to the reaction vessel over 3 hours, and at the same time, an aqueous solution prepared by dissolving 0.812 part of L-ascorbic acid and 1.468 parts of 3-mercaptopropionic acid in 15.43 parts of deionized water was added dropwise over 3.5 hours. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 60%. The reaction mixture was then neutralized to pH 7 with an aqueous solution of sodium hydroxide at a temperature not higher than the polymerization reaction temperature to give a polymer (C-1), corresponding to the polymer (C) according to the present invention, composed of an aqueous solution of the polymer having a weight average molecular weight of 29,000. For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 5

A glass-made reaction vessel equipped with a thermometer, a stirrer, a dropping funnel, a nitrogen inlet tube, and a reflux condenser was charged with 279 parts of deionized water, and 400 parts of unsaturated polyalkylene glycol ether derived from 3-methyl-3-buten-1-ol by addition of 25 moles, on average, of ethylene oxide. After raising the temperature to 65° C., an aqueous hydrogen peroxide solution composed of 0.605 part of hydrogen peroxide and 11.50 parts of deionized water was added thereto. Then, 17.7 parts of acrylic acid and 39.3 parts of butyl acrylate were added dropwise to the reaction vessel over 3 hours, and at the same time, an aqueous solution prepared by dissolving 0.784 part of L-ascorbic acid and 1.418 parts of 3-mercaptopropionic acid in 14.90 parts of deionized water was added dropwise over 3.5 hours. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 60%. The reaction mixture was then neutralized to pH 7 with an aqueous solution of sodium hydroxide at a temperature not higher than the polymerization reaction temperature to give a polymer (C-2), corresponding to the polymer (C) according to the present invention, composed of an aqueous solution of the polymer having a weight average molecular weight of 27,000. For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 6

A glass-made reaction vessel equipped with a thermometer, a stirrer, a dropping funnel, a nitrogen inlet tube, and a reflux condenser was charged with 283 parts of deionized water, and 400 parts of unsaturated polyalkylene glycol ether derived from 3-methyl-3-buten-1-ol by addition of 25 moles, on average, of ethylene oxide. After raising the temperature to 65° C., an aqueous hydrogen peroxide solution composed of 0.519 part of hydrogen peroxide and 9.87 parts of deionized water was added thereto. Then, 17.7 parts of acrylic acid and 39.3 parts of methoxytriethylene glycol monoacrylate were added dropwise to the reaction vessel over 3 hours, and at the same time, an aqueous solution prepared by dissolving 0.672 part of L-ascorbic acid and 1.216 parts of 3-mercaptopropionic acid in 12.78 parts of deionized water was added dropwise over 3.5 hours. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 60%. The reaction mixture was then neutralized to pH 7 with an aqueous solution of sodium hydroxide at a temperature not higher than the polymerization reaction temperature to give a polymer (C-3), corresponding to the polymer (C) according to the present invention, composed of an aqueous solution of the polymer having a weight average molecular weight of 31,500. For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 7

A glass-made reaction vessel equipped with a thermometer, a stirrer, a dropping funnel, a nitrogen inlet tube, and a reflux condenser was charged with 285 parts of deionized water, and 400 parts of unsaturated polyalkylene glycol ether derived from methallyl alcohol by addition of 50 moles, on average, of ethylene oxide. After raising the temperature to 65° C., an aqueous hydrogen peroxide solution composed of 0.530 part of hydrogen peroxide and 10.07 parts of deionized water was added thereto. Then, 16.0 parts of acrylic acid and 44.2 parts of 2-hydroxyethyl acrylate were added dropwise to the reaction vessel over 3 hours, and at the same time, an aqueous solution prepared by dissolving 0.687 part of L-ascorbic acid and 1.655 parts of 3-mercaptopropionic acid in 13.05 parts of deionized water was added dropwise over 3.5 hours. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 60%. The reaction mixture was then neutralized to pH 7 with an aqueous solution of sodium hydroxide at a temperature not higher than the polymerization reaction temperature to give a polymer (C-4), corresponding to the polymer (C) according to the present invention, composed of an aqueous solution of the polymer having a weight average molecular weight of 31,000. For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 8

A glass-made reaction vessel equipped with a thermometer, a stirrer, a dropping funnel, a nitrogen inlet tube, and a reflux condenser was charged with 218 parts of deionized water, and 400 parts of unsaturated polyalkylene glycol ether derived from allyl alcohol by addition of 75 moles, on average, of ethylene oxide. After raising the temperature to 80° C., an aqueous hydrogen peroxide solution composed of 2.215 parts of hydrogen peroxide and 42.09 parts of deionized water was added thereto. Then, 14.6 parts of acrylic acid and 57.1 parts of 2-hydroxyethyl acrylate were added dropwise to the reaction vessel over 3 hours, and at the same time, an aqueous solution prepared by dissolving 2.869 parts of L-ascorbic acid and 0.864 part of 3-mercaptopropionic acid in 54.51 parts of deionized water was added dropwise over 3.5 hours. Thereafter, the temperature was further maintained at 80° C. for 1 hour, and thereafter the polymerization reaction was finished. The polymerizable component concentration (mass % concentration of all monomer components relative to all raw materials) at the time of finish of the polymerization reaction was 60%. The reaction mixture was then neutralized to pH 7 with an aqueous solution of sodium hydroxide at a temperature not higher than the polymerization reaction temperature to give a polymer (C-5), corresponding to the polymer (C) according to the present invention, composed of an aqueous solution of the polymer having a weight average molecular weight of 32,000. For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 9

A glass-made reaction vessel equipped with a thermometer, a stirrer, a dropping funnel, a nitrogen inlet tube, and a reflux condenser was charged with 1,698 parts of deionized water, and reaction vessel inside was purged with nitrogen with stirring, and then heated to 80° C. in a nitrogen atmosphere. An aqueous solution of a monomer mixture was prepared by mixing 1,848 parts of methoxypolyethylene glycol monomethacrylate (mean number of moles of ethylene oxide added=25), 152 parts of methacrylic acid, 500 parts of deionized water and further uniformly admixing therewith 11.9 parts of 3-mercaptopropionic acid as a chain transfer agent. This aqueous monomer mixture solution and 184 parts of a 10% aqueous solution of ammonium persulfate were respectively added dropwise over 4 hours. After completion of the dropping, 46 parts of a 10% aqueous solution of ammonium persulfate was further added dropwise over 1 hour. Thereafter, the temperature was further maintained at 80° C. for 1 hour to drive the polymerization reaction to completion. The reaction mixture was then neutralized to pH 7 with an aqueous solution of sodium hydroxide at a temperature not higher than the polymerization reaction temperature to give a polymer (D-1), corresponding to the polymer (B3) according to the present invention, composed of an aqueous solution of the polymer having a weight average molecular weight of 31,000. For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 10

A glass-made reaction vessel equipped with a thermometer, a stirrer, a dropping funnel, a nitrogen inlet tube, and a reflux condenser was charged with 1,698 parts of deionized water, and reaction vessel inside was purged with nitrogen with stirring and then heated to 80° C. in a nitrogen atmosphere. An aqueous solution of a monomer mixture was prepared by mixing 1,796 parts of methoxypolyethylene glycol monomethacrylate (mean number of moles of ethylene oxide added=25), 204 parts of methacrylic acid, 500 parts of deionized water and further uniformly admixing therewith 17.6 parts of 3-mercaptopropionic acid as a chain transfer agent. This aqueous monomer mixture solution and 184 parts of a 10% aqueous solution of ammonium persulfate were respectively added dropwise over 4 hours. After completion of the dropping, 46 parts of a 10% aqueous solution of ammonium persulfate was further added dropwise over 1 hour. Thereafter, the temperature was further maintained at 80° C. for 1 hour to drive the polymerization reaction to completion. The reaction mixture was then neutralized to pH 7 with an aqueous solution of sodium hydroxide at a temperature not higher than the polymerization reaction temperature to give a polymer (D-2), corresponding to the polymer (B3) according to the present invention, composed of an aqueous solution of the polymer having a weight average molecular weight of 28,000. For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 11

A glass-made reaction vessel equipped with a thermometer, a stirrer, a dropping funnel, a nitrogen inlet tube, and a reflux condenser was charged with 1,698 parts of deionized water, and reaction vessel inside was purged with nitrogen with stirring and then heated to 80° C. in a nitrogen atmosphere. An aqueous solution of a monomer mixture was prepared by mixing 1,668 parts of methoxypolyethylene glycol monomethacrylate (mean number of moles of ethylene oxide added=25), 332 parts of methacrylic acid, 500 parts of deionized water and further uniformly admixing therewith 16.7 parts of 3-mercaptopropionic acid as a chain transfer agent. This aqueous monomer mixture solution and 184 parts of a 10% aqueous solution of ammonium persulfate were respectively added dropwise over 4 hours. After completion of the dropping, 46 parts of a 10% aqueous solution of ammonium persulfate was further added dropwise over 1 hour. Thereafter, the temperature was further maintained at 80° C. for 1 hour to drive the polymerization reaction to completion. The reaction mixture was then neutralized to pH 7 with an aqueous solution of sodium hydroxide at a temperature not higher than the polymerization reaction temperature to give a polymer (D-3), corresponding to the polymer (B3) according to the present invention, composed of an aqueous solution of the polymer having a weight average molecular weight of 24,000. For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 12

A glass-made reaction vessel equipped with a thermometer, a stirrer, a dropping funnel, a nitrogen inlet tube, and a reflux condenser was charged with 1,291 parts of deionized water, 1,812 parts of unsaturated polyalkylene glycol ether derived from 3-methyl-3-buten-1-ol by addition of 50 moles, on average, of ethylene oxide, and 188 parts of maleic acid. Reaction vessel inside was purged with nitrogen with stirring and then heated to 60° C. in a nitrogen atmosphere. Then, 50 parts of a 15% aqueous solution of NC-32W (product of Nippo Kagaku Corp., 2,2'-azobis-2-methylpropionamidine hydrochloride, purity 87%) was added. The temperature was maintained at 60° C. for 7 hours and then raised to 80° C. and stirring was then continued for 1 hour, and thereafter the polymerization reaction was finished. The reaction mixture was then neutralized to pH 7 with an aqueous solution of sodium hydroxide at a temperature not higher than the polymerization reaction temperature to give a polymer (E-1), corresponding to the polymer (B4) according to the present invention, composed of an aqueous solution of the polymer having a weight average molecular weight of 27,000. For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 13

A glass-made reaction vessel equipped with a thermometer, a stirrer, a dropping funnel, a nitrogen inlet tube, and a reflux condenser was charged with 210 parts of deionized water and 386 parts of unsaturated polyalkylene glycol ether derived from 3-methyl-3-buten-1-ol by addition of 50 moles, on average, of ethylene oxide. After raising the temperature to 65° C., an aqueous hydrogen peroxide solution composed of 1.33 parts of hydrogen peroxide and 65.17 parts of deionized water was added thereto. Then, 208 parts of 2-hydroxyethyl acrylate was added dropwise to the reaction vessel over 3 hours, and at the same time, an aqueous solution prepared by dissolving 1.73 parts of L-ascorbic acid and 4.16 parts of 3-mercaptopropionic acid in 114.11 parts of deionized water was added dropwise over 3.5 hours. Thereafter, the temperature was further maintained at 65° C. for 1 hour, and thereafter the polymerization reaction was finished, to give a polymer (G-1), corresponding to the polymer (G) according to the present invention, composed of an aqueous solution of the polymer having a weight average molecular weight of 30,600. The polymerizable component concentration (mass % concentration of all monomer components relative to all raw materials) at the time of finish of the polymerization reaction was 60% and the acid value of the polymer was 0.04 (mg KOH/g). For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

Production Example 14

A glass-made reaction vessel equipped with a thermometer, a stirrer, a dropping funnel, a nitrogen inlet tube, and a reflux condenser was charged with 188 parts of deionized water and 386 parts of unsaturated polyalkylene glycol ether derived from 3-methyl-3-buten-1-ol by addition of 50 moles, on average, of ethylene oxide. After raising the temperature to 65° C., an aqueous hydrogen peroxide solution composed of 1.76 parts of hydrogen peroxide and 86.24 parts of deionized water was added thereto. Then, 208 parts of methyl acrylate was added dropwise to the reaction vessel over 3 hours, and at the same time, an aqueous solution prepared by dissolving 2.28 parts of L-ascorbic acid and 5.48 parts of 3-mercaptopropionic acid in 112.24 parts of deionized water was added dropwise over 3.5 hours. Thereafter, the temperature was further maintained at 65° C. for 1 hour, and thereafter the polymerization reaction was finished, to give a polymer (G-2), corresponding to the polymer (G) according to the present invention, composed of an aqueous solution of the polymer having a weight average molecular weight of 32,000. The polymerizable component concentration (mass % concentration of all monomer components relative to all raw materials) at the time of finish of the polymerization reaction was 60% and the acid value of the polymer was 0.04 (mg KOH/g). For the polymer obtained, the conversion (%) of each starting monomer, the composition ratio of copolymer (% by mass), the composition ratio of copolymer (mole %), and the carboxylic acid content (meq/g) calculated on the unneutralized polymer basis are shown in Table 1.

TABLE 1

| Polymer | Conversion (%) of each starting monomer AO monomer/AA/MAA/other | Composition ratio of copolymer (% by mass) AO monomer/AA/MAA/other | Composition ratio of copolymer (mole %) AO monomer/AA/MAA/other | Carboxylic acid content (meq/g) calculated on the unneutralized basis |
|---|---|---|---|---|
| A-1 | 94.0/97.8/0.0/0.0 | 83.5/16.5/0.0/0.0 | 17.2/82.8/0.0/0.0 | 1.83 |
| A-2 | 92.5/98.0/0.0/0.0 | 84.2/15.8/0.0/0.0 | 18.1/81.9/0.0/0.0 | 1.74 |
| A-3 | 52.0/97.0/0.0/0.0 | 82.8/17.2/0.0/0.0 | 11.9/88.1/0.0/0.0 | 1.90 |

TABLE 1-continued

| Polymer | Conversion (%) of each starting monomer AO monomer/AA/ MAA/other | Composition ratio of copolymer (% by mass) AO monomer/AA/ MAA/other | Composition ratio of copolymer (mole %) AO monomer/AA/ MAA/other | Carboxylic acid content (meq/g) calculated on the unneutralized basis |
|---|---|---|---|---|
| C-1 | 81.3/99.7/0.0/HEA 99.8 | 83.9/5.9/0.0/HEA 10.1 | 32.0/28.6/0.0/HEA 39.4 | 0.64 |
| C-2 | 84.0/98.5/0.0/BA 100.0 | 84.4/5.7/0.0/BA 9.9 | 34.0/29.1/0.0/BA 36.9 | 0.62 |
| C-3 | 85.5/98.8/0.0/MTA 100.0 | 84.6/5.7/0.0/MTA 9.7 | 34.4/29.0/0.0/MTA 36.6 | 0.61 |
| C-4 | 91.0/99.0/0.0/HEA 99.7 | 84.9/4.8/0.0/HEA 10.3 | 21.1/29.0/0.0/HEA 49.9 | 0.52 |
| C-5 | 72.0/99.0/0.0/HEA 99.9 | 79.1/5.2/0.0/HEA 15.7 | 11.0/25.8/0.0/HEA 63.2 | 0.56 |
| D-1 | 100.0/0.0/100.0/0.0 | 90.6/0.0/9.4/0.0 | 46.5/0.0/53.4/0.0 | 0.89 |
| D-2 | 100.0/0.0/100.0/0.0 | 87.5/0.0/12.5/0.0 | 38.7/0.0/61.3/0.0 | 1.19 |
| D-3 | 100.0/0.0/100.0/0.0 | 80.0/0.0/20.0/0.0 | 26.5/0.0/73.5/0.0 | 1.93 |
| E-1 | 90.0/0.0/0.0/MA 90.1 | 87.5/0.0/0.0/MA 12.5 | 32.7/0.0/0.0/MA 67.3 | 1.62 |
| G-1 | 90.5/0.0/0.0/HEA 100.0 | 62.7/0.0/0.0/HEA 37.3 | 7.9/0.0/0.0/HEA 92.1 | 0.0007 |
| G-2 | 90.0/0.0/0.0/MEA 99.8 | 62.6/0.0/0.0/MEA 37.4 | 5.9/0.0/0.0/MEA 94.1 | 0.0007 |

In Table 1, the following abbreviations are used.

"AO monomer" stands for the unsaturated (poly)alkylene glycol ether monomer (a) in polymers (A), (C), (E), and (G), and in polymer (D), it stands for the (poly)alkylene glycol mono(meth)acrylic acid ester monomer (d). AA stands for acrylic acid, MAA for methacrylic acid, HEA for 2-hydroxyethyl acrylate, BA for butyl acrylate, MTA for methoxytriethylene glycol monoacrylate, MA for maleic acid, and MEA for methyl acrylate.

<Mortar Test>

Mortar compositions were prepared by using various cement admixtures according to the present invention and various cement admixtures for comparison. Each of them was prepared by combing the above polymers, and subjected to mortar test. Each mortar test was carried out in an atmosphere maintained at 25° C. using samples conditioned at 25° C. The materials and mortar formulations used in testing were as follows.

(Formulation A) Ordinary portland cement produced by Taiheiyo Cement 400 g, Toyoura standard sand 800 g, and deionized water containing a cement admixture according to the present invention or for comparison 240 g (water/cement ratio (by mass)=0.60). For avoiding the possible influence of bubbles in the mortar on the flowability of the mortar, the air content was adjusted to 2.0±0.3% using a commercial oxyalkylene type antifoaming agent. The levels of addition of the cement admixtures relative to cement (the amount of solid matter component [nonvolatile component] in cement admixture relative to cement) (% by mass) are shown in Table 2 and Table 4.

(Formulation B) Ordinary portland cement produced by Taiheiyo Cement 800 g, Toyoura standard sand 400 g, and deionized water containing a cement admixture according to the present invention or for comparison 205 g (water/cement ratio (by mass)=0.256). For avoiding the possible influence of bubbles in the mortar on the flowability of the mortar, the air content was adjusted to 2.0±0.3% using a commercial oxyalkylene type antifoaming agent. The levels of addition of the cement admixtures relative to cement (the amount of solid matter component [nonvolatile component] in cement admixture relative to cement) (% by mass) are shown in Table 3.

(Mortar Flow Value Measurement) [Formulation A and Formulation B]

Each mortar composition was prepared by 30 seconds of dry mixing, at a low speed, of cement and sand alone using a HOBART-type mortar mixer (model N-50, product of HOBART Corp.), followed by addition of the above cement admixture-containing deionized water, and 3 minutes of kneading at a medium speed. The mortar obtained was filled into a hollow cylinder, 55 mm in inside diameter and in height, placed on a horizontal table, to its highest level. Five minutes after start of kneading, this cylinder was gently lifted up vertically, and the major axis and minor axis of the mortar spread over the table were measured, and the mean value thereof was reported as mortar flow value. Thereafter, the whole of the mortar was allowed to stand for a predetermined time in a tightly closed vessel, and the above procedure was repeated to thereby follow the change in mortar flow value with time. The results obtained are shown in Table 2 and Table 3.

TABLE 2

| | Formulation of mortar | W/C (%) | Formulation | Addition level (mass %)/cement Polymer (A) | Polymer (B) | Combination ratio (% by mass) Polymer (A) | Polymer (B) | Addition level Total | Flow value (mm) after 5 min | after 30 min | after 60 min | after 90 min |
|---|---|---|---|---|---|---|---|---|---|---|---|---|
| Example 1 | Formulation A | 60 | A-1 + D-1 | 0.05 | 0.25 | 16.7% | 83.3% | 0.03 | 100 | 100 | 98 | 86 |
| Example 2 | Formulation A | 60 | A-2 + D-1 | 0.05 | 0.25 | 16.7% | 83.3% | 0.03 | 99 | 101 | 98 | 88 |
| Example 3 | Formulation A | 60 | A-3 + D-1 | 0.07 | 0.25 | 21.9% | 78.1% | 0.32 | 97 | 94 | 96 | 88 |
| Example 4 | Formulation A | 60 | C-1 + A-1 | 0.35 | 0.05 | 87.5% | 12.5% | 0.40 | 97 | 99 | 96 | 86 |
| Example 5 | Formulation A | 60 | C-2 + A-1 | 0.35 | 0.05 | 87.5% | 12.5% | 0.40 | 98 | 97 | 95 | 89 |
| Example 6 | Formulation A | 60 | C-3 + A-1 | 0.35 | 0.05 | 87.5% | 12.5% | 0.40 | 100 | 102 | 99 | 91 |

TABLE 2-continued

|  | Formulation of mortar | W/C (%) | Formulation | Addition level (mass %)/cement | | Combination ratio (% by mass) | | Addition level Total | Flow value (mm) | | | |
|---|---|---|---|---|---|---|---|---|---|---|---|---|
|  |  |  |  | Polymer (A) | Polymer (B) | Polymer (A) | Polymer (B) |  | after 5 min | after 30 min | after 60 min | after 90 min |
| Example 7 | Formulation A | 60 | C-4 + A-1 | 0.35 | 0.05 | 87.5% | 12.5% | 0.40 | 98 | 100 | 98 | 88 |
| Example 8 | Formulation A | 60 | C-5 + A-1 | 0.45 | 0.05 | 90.0% | 10.0% | 0.50 | 96 | 95 | 92 | 85 |
| Example 9 | Formulation A | 60 | C-1 + D-3 | 0.35 | 0.06 | 85.4% | 14.6% | 0.41 | 104 | 101 | 95 | 87 |
| Example 10 | Formulation A | 60 | C-2 + D-3 | 0.35 | 0.06 | 85.4% | 14.6% | 0.41 | 102 | 100 | 97 | 90 |
| Example 11 | Formulation A | 60 | C-4 + D-3 | 0.35 | 0.06 | 85.4% | 14.6% | 0.41 | 106 | 103 | 98 | 89 |
| Example 12 | Formulation A | 60 | C-1 + E-1 | 0.35 | 0.08 | 81.4% | 18.6% | 0.43 | 97 | 102 | 96 | 88 |
| Example 13 | Formulation A | 60 | C-2 + E-1 | 0.35 | 0.08 | 81.4% | 18.6% | 0.43 | 97 | 95 | 92 | 87 |
| Example 14 | Formulation A | 60 | C-4 + E-1 | 0.35 | 0.08 | 81.4% | 18.6% | 0.43 | 101 | 99 | 95 | 88 |
| Compar.Ex.1 | Formulation A | 60 | A-1 | 0.11 | 0.00 | — | — | 0.11 | 110 | 100 | 76 | 68 |
| Compar.Ex.2 | Formulation A | 60 | A-2 | 0.11 | 0.00 | — | — | 0.11 | 112 | 98 | 78 | 71 |
| Compar.Ex.3 | Formulation A | 60 | A-3 | 0.14 | 0.00 | — | — | 0.14 | 109 | 93 | 82 | 67 |
| Compar.Ex.4 | Formulation A | 60 | C-1 | 0.70 | 0.00 | — | — | 0.70 | 88 | 93 | 89 | 83 |
| Compar.Ex.5 | Formulation A | 60 | C-2 | 0.70 | 0.00 | — | — | 0.70 | 86 | 86 | 85 | 82 |
| Compar.Ex.6 | Formulation A | 60 | C-3 | 0.70 | 0.00 | — | — | 0.70 | 89 | 92 | 89 | 84 |
| Compar.Ex.7 | Formulation A | 60 | C-4 | 0.70 | 0.00 | — | — | 0.70 | 87 | 90 | 88 | 83 |
| Compar.Ex.8 | Formulation A | 60 | C-5 | 0.90 | 0.00 | — | — | 0.90 | 85 | 84 | 82 | 79 |
| Compar.Ex.9 | Formulation A | 60 | D-1 | 0.00 | 0.50 | — | — | 0.50 | 87 | 83 | 83 | 81 |
| Compar.Ex.10 | Formulation A | 60 | D-3 | 0.00 | 0.12 | — | — | 0.12 | 118 | 107 | 87 | 72 |
| Compar.Ex.11 | Formulation A | 60 | E-1 | 0.00 | 0.16 | — | — | 0.16 | 105 | 106 | 90 | 70 |

TABLE 3

|  | Formuation of mortar | W/C (%) | Formulation | Addition level (mass %)/cement | | Combination ratio (% by mass) | | Addition level Total | Flow value (mm) | | | |
|---|---|---|---|---|---|---|---|---|---|---|---|---|
|  |  |  |  | Polymer (A) | Polymer (B) | Polymer (A) | Polymer (B) |  | after 5 min | after 30 min | after 60 min | after 90 min |
| Example 15 | Formulation B | 25.6 | A-1 + D-2 | 0.10 | 0.25 | 28.6% | 71.4% | 0.35 | 145 | 142 | 136 | 120 |
| Example 16 | Formulation B | 25.6 | A-2 + D-2 | 0.10 | 0.25 | 28.6% | 71.4% | 0.35 | 155 | 154 | 141 | 119 |
| Example 17 | Formulation B | 25.6 | A-3 + D-2 | 0.15 | 0.25 | 37.5% | 62.5% | 0.40 | 142 | 139 | 133 | 123 |
| Compar.Ex.12 | Formulation B | 25.6 | A-1 | 0.20 | 0.00 | — | — | 0.20 | 155 | 134 | 106 | 94 |
| Compar.Ex.13 | Formulation B | 25.6 | A-2 | 0.20 | 0.00 | — | — | 0.20 | 163 | 151 | 120 | 88 |
| Compar.Ex.14 | Formulation B | 25.6 | A-3 | 0.30 | 0.00 | — | — | 0.30 | 137 | 125 | 91 | 71 |
| Compar.Ex.15 | Formulation B | 25.6 | D-2 | 0.00 | 0.50 | — | — | 0.50 | 123 | 135 | 130 | 131 |

Comments are made on Table 2 and Table 3 in the following. W/C (%) means the water/cement ratio (ratio by mass). The addition level (mass %)/cement refers to the level of addition of each cement admixture relative to cement (the amount of solid matter component [nonvolatile component] in cement admixture relative to cement) (% by mass).

As can be seen from Table 2 and Table 3, the polymers (A-1) to (A-3), (C-1) to (C-5), (D-1) to (D-3), and (E-1) when used alone, were either insufficient in dispersion retaining ability although the addition level was low, or required markedly high addition levels for manifesting satisfactory levels of initial dispersing ability, However, in all of Examples 1 to 17 where these were used in combination, satisfactory levels of initial dispersing ability and of dispersion retaining ability were simultaneously attained at low addition levels.

(Formulation C)
Cement: Ordinary portland cement produced by Taiheiyo Cement 1000 g
Fine aggregate: Mixed sand composed of Oi River system land sand and Kisarazu pit sand (specific gravity 2.62, FM 2.70)
Water: Deionized water containing a cement admixture according to the present invention or for comparison (Water/cement ratio (by mass)=0.45, fine aggregate/cement ratio=2.5)

For avoiding the possible influence of bubbles in the mortar on the flowability of the mortar, the air content was adjusted to 2.0±0.3% using a commercial oxyalkylene type antifoaming agent. The levels of addition of the cement admixtures relative to cement (the amount of solid matter component [nonvolatile component] in cement admixture relative to cement) (% by mass) are shown in Table 5.

The solid matter component [nonvolatile component] in each cement admixture was measured by drying an appropriate amount of the cement admixture solution by heating at 130° C. to remove the volatile matter, and an amount of the aqueous admixture solution was weighed and incorporated in cement so that a predetermined amount of the solid matter component [nonvolatile component] might be contained in the formulation.

(Mortar Flow Value Measurement) [Formulation C]
Each mortar composition was prepared using a HOBART-type mortar mixer (model N-50, product of HOBART Corp.). Cement and the cement admixture-containing deionized water were added to the mixer, and after 15 seconds of kneading at a low speed, the fine aggregate was added and the mixture was kneaded for 60 seconds. That portion of mortar adhering to the mortar mixer vessel was scarped off and the whole mortar was further kneaded for 4 minutes. The thus-prepared mortar was filled into a flow cone (JIS R 5201) having an upper end inside diameter of 70 mm, a lower end inside diameter of 100 mm and a height of 60 mm and placed on a horizontal flow table (JIS R 5201), to its highest level. Eight minutes after start of kneading, this flow cone was gently lifted up vertically. Then, after 15 times up and down movements caused by revolving the handle once per second, the maximum diameter and the length perpendicular thereto of the mortar spread over the table were measured, and the mean value thereof was reported as mortar flow value. Thereafter, the whole of the mortar was allowed to stand for a predetermined time in a tightly closed vessel, and the above procedure was repeated to thereby follow the change in mortar flow value with time. The results obtained are shown in Table 5. In the tables, the symbol "–" given for flow value means that the initial mortal flow value was low and almost no flowing was observed, so that the change in mortal flow value with time was not checked.

inside was purged with nitrogen with stirring and then heated to 150° C. in a nitrogen atmosphere. Then, under safe pressure, maintaining the temperature at 150° C., 6,279 parts of ethylene oxide was introduced to the reaction vessel. The temperature was maintained at 150° C. until the alkylene oxide addition reaction was completed to drive the reaction to completion. The obtained reaction product (hereinafter referred to as M-1) includes a non-polymerizable polyalkylene glycol not containing an alkenyl group (polyethylene glycol) as a by-product, and an unsaturated polyalkylene glycol ether monomer (hereinafter referred to as MAL-10) derived from methallyl alcohol by addition of 10 moles, on average, of ethylene oxide. The production amount of polyethylene glycol was 4.0% relative to the unsaturated polyalkylene glycol ether monomer.

TABLE 4

| | Formulation of mortar | W/C (%) | Formulation | Addition level (mass %)/cement Polymer (A) | Polymer (B) | Combination ratio (% by mass) Polymer (A) | Polymer (B) | Addition level Total | Flow value (mm) after 5 min | after 30 min | after 60 min | after 90 min |
|---|---|---|---|---|---|---|---|---|---|---|---|---|
| Example 18 | Formulation A | 60 | G-1 + D-3 | 0.05 | 0.12 | 29.4% | 70.6% | 0.17 | 122 | 125 | 120 | 115 |
| Example 19 | Formulation A | 60 | G-2 + D-3 | 0.05 | 0.12 | 29.4% | 70.6% | 0.17 | 117 | 121 | 114 | 109 |
| Compar.Ex.16 | Formulation A | 60 | G-1 | 1.00 | 0.00 | 100% | 0.0% | 1.00 | 60 | — | — | — |
| Compar.Ex.17 | Formulation A | 60 | G-2 | 1.00 | 0.00 | 100% | 0.0% | 1.00 | 60 | — | — | — |
| Compar.Ex.10 | Formulation A | 60 | D-3 | 0.00 | 0.12 | — | — | 0.12 | 118 | 107 | 87 | 72 |

TABLE 5

| | Formulation of mortar | W/C (%) | Formulation | Addition level (mass %)/cement Polymer (A) | Polymer (B) | Combination ratio (% by mass) Polymer (A) | Polymer (B) | Addition level Total | Flow value (mm) after 8 min | after 30 min | after 60 min | after 90 min |
|---|---|---|---|---|---|---|---|---|---|---|---|---|
| Example 20 | Formulation C | 45 | G-1 + D-3 | 0.05 | 0.12 | 29.4% | 70.6% | 0.17 | 242 | 248 | 239 | 229 |
| Example 21 | Formulation C | 45 | G-2 + D-3 | 0.05 | 0.12 | 29.4% | 70.6% | 0.17 | 232 | 239 | 230 | 217 |
| Compar.Ex.18 | Formulation C | 45 | G-1 | 1.00 | 0.00 | 100% | 0.0% | 1.00 | 150 | — | — | — |
| Compar.Ex.19 | Formulation C | 45 | G-2 | 1.00 | 0.00 | 100% | 0.0% | 1.00 | 150 | — | — | — |
| Compar.Ex.20 | Formulation C | 45 | D-3 | 0.00 | 0.14 | — | — | 0.14 | 241 | 207 | 196 | 182 |

As can be seen from Table 4 and Table 5, the polymers (G-1), (G-2), and (D-3), when used alone, were either insufficient in dispersion retaining ability although the addition level was low, or no satisfactory levels of initial dispersing ability was obtained even at high addition levels. On the other hand, in all of Examples 20 and 21 where these were used in combination, satisfactory levels of initial dispersing ability and of dispersion retaining ability were simultaneously attained at low addition levels.

Production Example 15

A stainless-made high pressure reaction vessel equipped with a thermometer, a stirrer, and a nitrogen and alkylene oxide inlet tube was charged with 982 parts of methallyl alcohol as an unsaturated alcohol and 3.5 parts of sodium hydroxide as a catalyst for addition reaction. Reaction vessel Production Example 16 to 21

The same procedure as in Production Example 15 was followed except that the species and used level of unsaturated alcohol and alkylene oxide, the used level of sodium hydroxide as the catalyst for addition reaction, and the addition reaction temperature were changed as shown in Table 6, to perform alkylene oxide addition reaction to the unsaturated alcohol, to give reaction products (M-2) to (M-7) which included an unsaturated polyalkylene glycol ether monomer and a non-polymerizable polyalkylene glycol not containing an alkenyl group. Furthermore, when two species of alkylene oxide, ethylene oxide and propylene oxide were used, whole ethylene-oxide addition to unsaturated alcohol was performed, then propylene oxide addition was performed to obtain block type adduct. The production amount of the polyalkylene glycol as a by-product relative to the unsaturated polyalkylene glycol ether monomer in obtained reaction product is shown in Table 6.

TABLE 6

| Reaction Product No. | Abbreviation of unsaturated polyalkylene glycol ether monomer | Unsaturated alcohol Species | Used level (parts) | Ethylene oxide Used level (parts) | Ethylene oxide Mean number of moles added | Propylene oxide Used level (parts) | Propylene oxide Mean number of moles added | Alkylene oxide addition temp. (°C.) | Sodium hydroxide Used level (parts) | By-product polyalkylene glycol Species | By-product polyalkylene glycol Production amount (%) |
|---|---|---|---|---|---|---|---|---|---|---|---|
| Production Ex.15 | M-1 | MAL-10 | Methallyl alcohol | 982 | 6279 | 10 | — | — | 150 | 3.5 | Polyethylene glycol | 4.0 |
| Production Ex.16 | M-2 | MAL-100 | Methallyl alcohol | 98 | 6390 | 100 | — | — | 150 | 3.1 | Polyethylene glycol | 6.4 |
| Production Ex.17 | M-3 | IPN-25 | 3-methyl-3-buten-1-ol | 469 | 6336 | 25 | — | — | 120 | 3.2 | Polyethylene glycol | 5.2 |
| Production Ex.18 | M-4 | IPN-50 | 3-methyl-3-buten-1-ol | 234 | 6418 | 50 | — | — | 120 | 3.1 | Polyethylene glycol | 6.7 |
| Production Ex.19 | M-5 | IPN-100 | 3-methyl-3-buten-1-ol | 117 | 6575 | 100 | — | — | 120 | 3.1 | Polyethylene glycol | 9.4 |
| Production Ex.20 | M-6 | IPN-50EO3PO | 3-methyl-3-buten-1-ol | 117 | 3228 | 50 | 250 | 3 | 120 | 1.7 | Polyethylene polypropylene glycol | 7.2 |
| Production Ex.21 | M-7 | AL-75 | allyl alcohol | 105 | 6195 | 75 | — | — | 150 | 3.1 | Polyethylene glycol | 3.2 |

Production Example 22

A glass-made reaction vessel equipped with a thermometer, a stirrer, a dropping funnel, a nitrogen inlet tube, and a reflux condenser was charged with 270 parts of deionized water and 416.0 parts of the reaction product (M-1) obtained by Production Example 15 (containing 400 parts of MAL-10 corresponding to unsaturated polyalkylene glycol ether monomer and 16.0 parts of polyethylene glycol). Reaction vessel inside was purged with nitrogen with stirring and then heated to 65° C. in a nitrogen atmosphere. Then an aqueous hydrogen peroxide solution composed of 1.445 parts of hydrogen peroxide and 27.46 parts of deionized water was added thereto. Then, 96.8 parts of acrylic acid was added dropwise to the reaction vessel over 3 hours, and at the same time, an aqueous solution prepared by dissolving 1.871 parts of L-ascorbic acid and 3.384 parts of 3-mercaptopropionic acid in 35.56 parts of deionized water was added dropwise over 3.5 hours. Thereafter, the temperature was further maintained at 65° C. for 1 hour, and thereafter the polymerization reaction was finished. The polymerizable component concentration (mass % concentration of all monomer components relative to all raw materials) at the time of finish of the polymerization reaction was 60%. The reaction solution was then neutralized to pH 7 with an aqueous solution of sodium hydroxide at a temperature not higher than the polymerization reaction temperature to give a polymer (A-4), corresponding to the polymer (A) according to the present invention. For the polymer obtained, the conversion (%) of each starting monomer, and the analyzed results [the composition ratio of copolymer (% by mass), the composition ratio of copolymer (mole %), the carboxylic acid content (meq/g) calculated on the unneutralized polymer basis, the weight average molecular weight, the content (%) of unsaturated polyalkylene glycol ether monomer (AO monomer) relative to the neutralized polymer, and the content (%) of non-polymerizable polyalkylene glycol not containing an alkenyl group relative to the neutralized polymer] of the polymer comprised in obtained polymer solution are shown in Table 8.

Production Example 23 to 26, Production Example 28 to 33

The same procedure as in Production Example 22 was followed except that the initial addition level of deionized water, the species and level of an unsaturated polyalkylene glycol ether monomer (including the by-product polyalkylene glycol), the level of hydrogen peroxide and deionized water in hydrogen peroxide solution, the species and level of unsaturated monocarboxylic acid monomer, the species and level of unsaturated monocarboxylic acid ester monomer, the level of L-ascorbic acid, 3-mercaptopropionic acid, the level of deionized water used to dissolve these, the component concentration of copolymer (mass % concentration of all monomer components relative to all raw materials), and the polymerization reaction temperature (the temperature of each stage from after the addition of the initial addition component to the end of the polymerization reaction) were changed as shown in Table7. Polymers (A-5) to (A-8), (A-10), (A-11), corresponding to the polymer (A) according to the present invention, polymers (C-6) to (C-8), corresponding to the polymer (C) according to the present invention, and a polymer (G-3), corresponding to the polymer (G) according to the present invention were obtained. Further, the unsaturated monocarboxylic acid ester monomer was added dropwise over 3 hours with the unsaturated monocarboxylic acid monomer. For the polymer obtained, the conversion (%) of each starting monomer and the analyzed results of the polymer comprised in obtained polymer solution are shown in Table 8. The abbreviations in Table 7 and Table 8 are same as shown in above Table 1.

Production Example 27

A glass-made reaction vessel equipped with a thermometer, a stirrer, a dropping funnel, a nitrogen inlet tube, and a reflux condenser was charged with 174 parts of deionized water. Reaction vessel inside was purged with nitrogen with stirring and then heated to 65° C. in a nitrogen atmosphere, an aqueous hydrogen peroxide solution composed of 0.630 part of hydrogen peroxide and 1.470 parts of deionized water was added thereto. An aqueous solution prepared by dissolving 426.8 parts of the reaction product (M-4) obtained by Production Example 18 (containing 400 parts of IPN-50 corresponding to unsaturated polyalkylene glycol ether monomer and 26.8 parts of polyethylene glycol), 0.815 part of L-ascorbic acid, and 2.709 parts of 1-octane thiol in 100 parts of deionized water, and an aqueous solution prepared by dissolving 54.1 parts of acrylic acid in 29 parts of deionized water were respectively added dropwise over 3 hours thereto. Thereafter, the temperature was further maintained at 65° C. for 1.5 hour, and thereafter the polymerization reaction was finished. The component concentration of copolymer (mass % concentration of all monomer components relative to all raw materials) at the time of finish of the polymerization reaction was 60%. The reaction mixture was then neutralized to pH 7 with an aqueous solution of sodium hydroxide at a temperature not higher than the polymerization reaction temperature to give a polymer (A-9), corresponding to the polymer (A) according to the present invention. For the polymer obtained, the conversion (%) of each starting monomer and the analyzed results of the polymer comprised in obtained polymer solution are shown in Table 8.

Production Example 34

A glass-made reaction vessel equipped with a thermometer, a stirrer, a dropping funnel, a nitrogen inlet tube, and a reflux condenser was charged with 279 parts of deionized water, 426.8 parts of the reaction product (M-4) obtained by Production Example 18 (containing 400 parts of IPN-50 and 26.8 parts of polyethylene glycol), and 41.4 parts of maleic acid. Reaction vessel inside was purged with nitrogen with stirring and then heated to 65° C. in a nitrogen atmosphere. An aqueous hydrogen peroxide solution composed of 0.362 part of hydrogen peroxide and 6.88 parts of deionized water was added thereto. Then, an aqueous solution prepared by dissolving 0.469 part of L-ascorbic acid in 8.90 parts of deionized water was added dropwise over 1.5 hours. Thereafter, the temperature was further maintained at 65° C. for 1 hour, and thereafter the polymerization reaction was finished. The component concentration of copolymer (mass % concentration of all monomer components relative to all raw materials) at the time of finish of the polymerization reaction was 60%. The reaction mixture was then neutralized to pH 7 with an aqueous solution of sodium hydroxide at a temperature not higher than the polymerization reaction temperature to give a polymer (E-2), corresponding to the polymer (B4) according to the present invention. For the polymer obtained, the conversion (%) of each starting monomer and the analyzed results of the polymer comprised in obtained polymer solution are shown in Table 8.

TABLE 7

| | Polymer No. | Reaction Product No. | Unsaturated polyalkylene glycol ether monomer (including by-product polyalkylene glycol) Abbreviation of monomer | Parts | Initial addition level of deionized water Parts | Unsaturated monocarboxylic acid monomer Species | Parts | Unsaturated monocarboxylic acid ester monomer Species | Parts |
|---|---|---|---|---|---|---|---|---|---|
| Production Ex.22 | A-4 | M-1 | MAL-10 | 416.0 | 270 | AA | 96.8 | — | 0.0 |
| Production Ex.23 | A-5 | M-2 | MAL-100 | 425.6 | 276 | AA | 43.8 | — | 0.0 |
| Production Ex.24 | A-6 | M-3 | IPN-25 | 420.8 | 268 | AA | 37.9 | — | 0.0 |
| Production Ex.25 | A-7 | M-5 | IPN-100 | 437.6 | 270 | AA | 23.1 | — | 0.0 |
| Production Ex.26 | A-8 | M-2 | MAL-100 | 425.6 | 269 | AA | 16.1 | — | 0.0 |
| Production Ex.28 | A-10 | M-4 | IPN-50 | 426.8 | 269 | AA | 24.8 | — | 0.0 |
| Production Ex.29 | A-11 | M-7 | AL-75 | 412.8 | 168 | AA | 43.8 | — | 0.0 |
| Production Ex.30 | C-6 | M-4 | IPN-50 | 426.8 | 275 | AA | 8.4 | HEA | 27.6 |
| Production Ex.31 | C-7 | M-4 | IPN-50 | 426.8 | 291 | AA | 12.5 | MTA | 48.8 |
| Production Ex.32 | C-8 | M-6 | IPN-50EO3PO | 428.8 | 275 | AA | 8.4 | HEA | 27.6 |
| Production Ex.33 | G-3 | M-4 | IPN-50 | 426.8 | 353 | AA | 0.0 | HEA | 215.4 |

TABLE 7-continued

| | Hydrogen peroxide Parts | Deionized water for dissolving Parts | L-ascorbic acid Parts | 3-mercapto propionic acid Parts | Deionized water for dissolving Parts | Polymerizable component conc. Mass % | polymerization reaction temp. ° C. |
|---|---|---|---|---|---|---|---|
| Production Ex.22 | 1.445 | 27.46 | 1.871 | 3.384 | 35.56 | 60 | 65 |
| Production Ex.23 | 0.474 | 9.01 | 0.614 | 1.851 | 11.67 | 60 | 65 |
| Production Ex.24 | 0.587 | 11.51 | 0.760 | 1.833 | 14.44 | 60 | 65 |
| Production Ex.25 | 0.278 | 5.29 | 0.361 | 0.869 | 6.85 | 60 | 65 |
| Production Ex.26 | 0.213 | 4.05 | 0.276 | 0.665 | 5.24 | 60 | 65 |
| Production Ex.28 | 0.354 | 6.72 | 0.458 | 1.104 | 8.70 | 60 | 65 |
| Production Ex.29 | 1.977 | 7.91 | 2.561 | 0.772 | 14.51 | 70 | 80 |
| Production Ex.30 | 0.360 | 6.85 | 0.467 | 0.112 | 8.87 | 60 | 65 |
| Production Ex.31 | 0.389 | 7.39 | 0.504 | 0.304 | 9.57 | 60 | 65 |
| Production Ex.32 | 0.352 | 6.69 | 0.456 | 0.110 | 8.66 | 60 | 65 |
| Production Ex.33 | 1.382 | 26.25 | 1.789 | 4.313 | 34.00 | 60 | 65 |

TABLE 8

| Polymer | Conversion (%) of each starting monomer AO monomer/AA/MAA/other | Composition ratio of copolymer (% by mass) AO monomer/AA/MAA/other | Composition ratio of copolymer (mole %) AO monomer/AA/MAA/other | Carboxylic acid content (meq/g) calculated on the unneutralized basis | Weight average molecular weight | AO monomer content (%) | Polyalkylene glycol content (%) |
|---|---|---|---|---|---|---|---|
| A-4 | 98.0/99.0/0.0/0.0 | 80.4/19.6/0.0/0.0 | 36.5/63.5/0.0/0.0 | 2.73 | 18500 | 1.6 | 3.1 |
| A-5 | 94.3/96.8/0.0/0.0 | 89.9/10.1/0.0/0.0 | 12.5/87.5/0.0/0.0 | 1.40 | 54000 | 5.3 | 5.9 |
| A-6 | 90.2/97.5/0.0/0.0 | 90.7/9.3/0.0/0.0 | 37.2/62.8/0.0/0.0 | 1.29 | 22500 | 9.6 | 5.1 |
| A-7 | 82.0/94.6/0.0/0.0 | 93.8/6.2/0.0/0.0 | 19.4/80.6/0.0/0.0 | 0.87 | 49500 | 20.2 | 10.6 |
| A-8 | 80.2/94.0/0.0/0.0 | 95.5/4.5/0.0/0.0 | 25.4/74.6/0.0/0.0 | 0.63 | 48000 | 23.3 | 7.5 |
| A-9 | 93.8/98.4/0.0/0.0 | 87.6/12.4/0.0/0.0 | 18.2/81.8/0.0/0.0 | 1.72 | 26000 | 5.6 | 6.0 |
| A-10 | 84.0/97.2/0.0/0.0 | 93.3/6.7/0.0/0.0 | 30.5/69.5/0.0/0.0 | 0.93 | 27500 | 17.4 | 7.3 |
| A-11 | 63.3/97.0/0.0/0.0 | 85.6/14.4/0.0/0.0 | 11.3/88.7/0.0/0.0 | 1.99 | 36500 | 47.6 | 4.2 |
| C-6 | 86.0/98.0/0.0/HEA 99.8 | 90.6/2.2/0.0/HEA 7.2 | 29.9/22.8/0.0/HEA 47.3 | 0.30 | 101000 | 14.7 | 7.0 |
| C-7 | 91.7/99.0/0.0/MTA 100.0 | 85.7/2.9/0.0/MTA 11.4 | 28.9/30.8/0.0/MTA 40.3 | 0.40 | 98500 | 7.7 | 6.2 |
| C-8 | 70.4/96.7/0.0/HEA 99.6 | 88.7/2.6/0.0/HEA 8.7 | 24.6/24.3/0.0/HEA 51.1 | 0.36 | 99000 | 37.0 | 9.0 |
| G-3 | 90.0/0.0/0.0/HEA 100.0 | 62.6/0.0/0.0/HEA 37.4 | 7.8/0.0/0.0/HEA 92.2 | 0.0007 | 32000 | 7.0 | 4.7 |
| E-2 | 88.5/0.0/0.0/MA 87.0 | 90.8/0.0/0.0/MA 9.2 | 33.3/0.0/0.0/MA 66.7 | 1.59 | 26300 | 11.4 | 6.6 |

In Table 8, AO monomer content (%) means the content (% by mass) of the unsaturated polyalkylene glycol ether monomer relative to the neutralized polymer, and polyalkylene glycol content (%) means the content (% by mass) of non-polymerizable polyalkylene glycol not containing an alkenyl group relative to the neutralized polymer.

<Mortar Test>

Mortar compositions were prepared by using various cement admixtures according to the present invention and various cement admixtures for comparison. Each of them was prepared by combing the above polymers, and subjected to mortar test following the same conditions described in above Formulation B. The levels of addition of solid matter component the cement admixtures relative to the cement (the amount of solid matter component [nonvolatile component] in each aqueous solution of the polymer relative to the cement) (% by mass), the levels of addition of each polymer (net amount) relative to the cement (% by mass), the total levels of addition of each polymer (net amount) relative to the cement (% by mass), the total levels of addition of AO monomer relative to the total levels of addition of the polymer (net amount) (% by mass), the total levels of addition of the by-product polyalkylene glycol relative to the total levels of addition of the polymer (net amount) (% by mass), and the combination ratio of each polymer (net amount) (% by mass) are shown in Table 9 and Table 10. Further, above-mentioned [polymer (net amount)] corresponds to the amount of solid matter component [non-volatile component] only of the polymer.

TABLE 9

|  | Formulation of mortar | W/C (%) | Formulation | Addition level of solid matter component (mass %)/cement | | Addition level of polymer (net amount) (% by mass) | | Total addition level of polymer (net amount) (mass %)/ cement |
|---|---|---|---|---|---|---|---|---|
|  |  |  |  | Polymer (A) (solid matter component) | Polymer (B) (solid matter component) | Polymer (A) (net amount) | Polymer (B) (net amount) |  |
| Example 22 | Formulation B | 25.6 | A-4 + A-5 | 0.20 | 0.12 | 0.191 | 0.108 | 0.299 |
| Example 23 | Formulation B | 25.6 | A-6 + A-7 | 0.23 | 0.15 | 0.201 | 0.115 | 0.315 |
| Example 24 | Formulation B | 25.6 | A-5 + A-8 | 0.12 | 0.24 | 0.108 | 0.184 | 0.291 |
| Example 25 | Formulation B | 25.6 | A-9 + A-10 | 0.13 | 0.24 | 0.116 | 0.192 | 0.309 |
| Example 26 | Formulation B | 25.6 | C-6 + A-9 | 0.20 | 0.18 | 0.164 | 0.161 | 0.326 |
| Example 27 | Formulation B | 25.6 | C-7 + A-9 | 0.15 | 0.15 | 0.132 | 0.134 | 0.266 |
| Example 28 | Formulation B | 25.6 | C-8 + A-9 | 0.22 | 0.18 | 0.151 | 0.161 | 0.312 |
| Example 29 | Formulation B | 25.6 | G-3 + A-9 | 0.06 | 0.20 | 0.054 | 0.179 | 0.233 |
| Example 30 | Formulation B | 25.6 | C-6 + A-11 | 0.20 | 0.28 | 0.164 | 0.185 | 0.349 |
| Example 31 | Formulation B | 25.6 | C-7 + A-11 | 0.15 | 0.25 | 0.132 | 0.165 | 0.297 |
| Example 32 | Formulation B | 25.6 | C-8 + A-11 | 0.22 | 0.28 | 0.151 | 0.185 | 0.336 |
| Example 33 | Formulation B | 25.6 | G-3 + A-11 | 0.08 | 0.30 | 0.072 | 0.198 | 0.269 |
| Example 34 | Formulation B | 25.6 | C-6 + D-3 | 0.20 | 0.16 | 0.164 | 0.160 | 0.324 |
| Example 35 | Formulation B | 25.6 | C-7 + D-3 | 0.15 | 0.14 | 0.132 | 0.140 | 0.272 |
| Example 36 | Formulation B | 25.6 | C-8 + D-3 | 0.22 | 0.16 | 0.151 | 0.160 | 0.311 |
| Example 37 | Formulation B | 25.6 | G-3 + D-3 | 0.06 | 0.18 | 0.054 | 0.180 | 0.234 |
| Example 38 | Formulation B | 25.6 | C-6 + E-2 | 0.15 | 0.23 | 0.123 | 0.195 | 0.318 |
| Example 39 | Formulation B | 25.6 | C-7 + E-2 | 0.13 | 0.20 | 0.114 | 0.169 | 0.283 |
| Example 40 | Formulation B | 25.6 | C-8 + E-2 | 0.15 | 0.23 | 0.103 | 0.195 | 0.298 |
| Example 41 | Formulation B | 25.6 | G-3 + E-2 | 0.04 | 0.24 | 0.036 | 0.203 | 0.239 |

|  | Total addition level of AO monomer (relative to polymer % by mass) | Total addition level of polyalkylene glycol (relative to polymer % by mass) | Combination ratio of polymer (%) | | Flow value (mm) | | | |
|---|---|---|---|---|---|---|---|---|
|  |  |  | Polymer (A) | Polymer (B) | after 5 min | after 30 min | after 60 min | after 90 min |
| Example 22 | 2.89 | 4.11 | 63.9 | 36.1 | 152 | 147 | 134 | 116 |
| Example 23 | 13.45 | 7.07 | 63.6 | 36.4 | 150 | 148 | 142 | 128 |
| Example 24 | 16.60 | 6.92 | 37.0 | 63.0 | 148 | 144 | 134 | 115 |
| Example 25 | 12.95 | 6.47 | 37.7 | 62.3 | 146 | 145 | 135 | 116 |
| Example 26 | 10.16 | 6.52 | 50.5 | 49.5 | 141 | 160 | 155 | 146 |
| Example 27 | 6.62 | 6.12 | 49.5 | 50.5 | 148 | 157 | 155 | 146 |
| Example 28 | 20.77 | 7.47 | 46.3 | 51.7 | 138 | 157 | 152 | 142 |
| Example 29 | 5.89 | 5.71 | 23.1 | 76.9 | 143 | 158 | 156 | 150 |
| Example 30 | 32.06 | 5.50 | 47.1 | 52.9 | 138 | 159 | 152 | 137 |
| Example 31 | 29.85 | 5.06 | 46.0 | 54.0 | 145 | 152 | 148 | 140 |
| Example 32 | 42.83 | 6.33 | 47.1 | 52.9 | 135 | 156 | 148 | 134 |
| Example 33 | 36.76 | 4.28 | 26.6 | 73.4 | 140 | 156 | 152 | 144 |
| Example 34 | 7.42 | 3.55 | 50.7 | 49.3 | 152 | 166 | 159 | 150 |
| Example 35 | 3.73 | 3.01 | 48.5 | 51.5 | 157 | 188 | 163 | 154 |
| Example 36 | 17.96 | 4.37 | 48.5 | 51.5 | 148 | 162 | 156 | 145 |
| Example 37 | 1.60 | 1.07 | 23.0 | 77.0 | 150 | 161 | 160 | 155 |
| Example 38 | 12.65 | 6.78 | 38.8 | 61.2 | 138 | 157 | 153 | 148 |
| Example 39 | 9.90 | 6.46 | 40.2 | 59.8 | 142 | 155 | 152 | 150 |
| Example 40 | 20.24 | 7.46 | 34.5 | 65.5 | 135 | 155 | 150 | 146 |
| Example 41 | 10.73 | 6.34 | 15.0 | 85.0 | 140 | 156 | 153 | 152 |

TABLE 10

| | Formulation of mortar | W/C (%) | Formulation | Addition level of solid matter component (mass %)/cement Polymer (A) (solid matter component) | Addition level of solid matter component (mass %)/cement Polymer (B) (solid matter component) | Addition level of polymer (net amount) (% by mass) Polymer (A) (net amount) | Addition level of polymer (net amount) (% by mass) Polymer (B) (net amount) | Total addition level of polymer (net amount) (mass %)/cement | Total addition level of AO monomer (relative to polymer % by mass) | Total addition level of polyalkylene glycol (relative to polymer % by mass) | Combination ratio of polymer (%) Polymer (A) | Combination ratio of polymer (%) Polymer (B) | Flow value (mm) after 5 min | Flow value (mm) after 30 min | Flow value (mm) after 60 min | Flow value (mm) after 90 min |
|---|---|---|---|---|---|---|---|---|---|---|---|---|---|---|---|---|
| Compar. Ex.21 | Formulation B | 25.6 | A-4 | 0.60 | — | 0.573 | — | 0.573 | 1.55 | 3.09 | 100.0 | — | 158 | 162 | 155 | 147 |
| Compar. Ex.22 | Formulation B | 25.6 | A-5 | 0.20 | — | 0.180 | — | 0.180 | 5.27 | 5.92 | 100.0 | — | 166 | 148 | 120 | 88 |
| Compar. Ex.23 | Formulation B | 25.6 | A-6 | 0.60 | — | 0.523 | — | 0.523 | 9.58 | 5.09 | 100.0 | — | 157 | 168 | 160 | 148 |
| Compar. Ex.24 | Formulation B | 25.6 | A-7 | 0.26 | — | 0.199 | — | 0.199 | 20.20 | 10.55 | 100.0 | — | 163 | 152 | 135 | 110 |
| Compar. Ex.25 | Formulation B | 25.6 | A-8 | 0.80 | — | 0.612 | — | 0.612 | 23.25 | 7.52 | 100.0 | — | 153 | 162 | 156 | 140 |
| Compar. Ex.26 | Formulation B | 25.6 | A-9 | 0.22 | — | 0.197 | — | 0.197 | 5.58 | 6.03 | 100.0 | — | 160 | 150 | 128 | 98 |
| Compar. Ex.27 | Formulation B | 25.6 | A-10 | 0.80 | — | 0.642 | — | 0.642 | 17.41 | 6.73 | 100.0 | — | 155 | 166 | 159 | 143 |
| Compar. Ex.28 | Formulation B | 25.6 | A-11 | 0.32 | — | 0.211 | — | 0.211 | 47.57 | 4.15 | 100.0 | — | 155 | 140 | 110 | 72 |
| Compar. Ex.29 | Formulation B | 25.6 | C-6 | 0.60 | — | 0.493 | — | 0.493 | 14.65 | 7.01 | 100.0 | — | 85 | 177 | 174 | 165 |
| Compar. Ex.30 | Formulation B | 25.6 | C-7 | 0.50 | — | 0.439 | — | 0.439 | 7.69 | 6.21 | 100.0 | — | 103 | 178 | 175 | 163 |
| Compar. Ex.31 | Formulation B | 25.6 | C-8 | 0.60 | — | 0.411 | — | 0.411 | 37.03 | 9.01 | 100.0 | — | 80 | 167 | 163 | 154 |
| Compar. Ex.32 | Formulation B | 25.6 | G-3 | 2.00 | — | 1.792 | — | 1.792 | 6.95 | 4.66 | 100.0 | — | 60 | — | — | — |
| Compar. Ex.33 | Formulation B | 25.6 | D-3 | — | 0.20 | — | 0.200 | 0.200 | 0.00 | 0.00 | — | 100.0 | 168 | 154 | 133 | 102 |
| Compar. Ex.34 | Formulation B | 25.6 | E-2 | — | 0.25 | — | 0.212 | 0.212 | 11.39 | 6.64 | — | 100.0 | 152 | 148 | 132 | 105 |

As can be seen from Table 9 and Table 10, the polymers (A-4) to (A-11), (C-6) to (C-8), (G-3), (D-3), and (E-2) when used alone, were either insufficient in dispersion retaining ability although the addition level was low, or required markedly high addition levels for manifesting satisfactory levels of initial dispersing ability, or insufficient in initial dispersing ability although the addition level was high. However, in all of Examples 22 to 41 where these were used in combination, satisfactory levels of initial dispersing ability and of dispersion retaining ability were simultaneously attained at low addition levels.

<Sulfonic Acid Type Dispersant (S)>

As a sulfonic acid type dispersant (S) containing a sulfonic acid group in the molecule, commercial items described below were used.

(S-1) Naphthalenesulfonic acid-formaldehyde condensates: Mighty 150 (product of Kao Corp.)

(S-2) Ligninsulfonic acid salt: Pozzolith No. 8 (product of Pozzolith Bussan Corp.)

<Concrete Test>

(Preparation of Concrete Composition)

Concrete compositions were prepared by adding various cement admixtures according to the present invention and various cement admixtures for comparison. Each of them was prepared by using each polymer obtained by above Production Examples, and above sulfonic acid type dispersants, and was subjected to concrete test. Two species of concrete compositions, composed of below-mentioned Formulation D and Formulation E, were prepared by using 3 types, which differed Lot number (X, Y, and Z), of Ordinary portland cement produced by Taiheiyo Cement as cement; Oi River system land sand as a fine aggregate; pit sand yielded Oume as a coarse aggregate; and tap water as mixing water. Further, in order temperature of the concrete composition to test temperature, 20° C., the temperature of raw materials, the revolving-puddle mixer and the measurement equipments used for the test was controlled under test temperature atmosphere, and mixing and each measurement were performed under above-mentioned test temperature atmosphere. Further, for avoiding the possible influence of bubbles in the concrete composition on the flowability of the concrete composition, when necessary, the air content was adjusted to 1.0±0.3% using a commercial oxyalkylene type antifoaming agent.

(Formulation D) The cement: 320 kg/m$^3$, water: 176 kg/m$^3$, the fine aggregate: 822 kg/m$^3$, the coarse aggregate: 892 kg/m$^3$, the proportion of the fine aggregate (the fine aggregate/(the fine aggregate+the coarse aggregate)) (by volume): 48%, the ratio of water/cement (by mass)=0.55

(Formulation E) The cement: 473 kg/m$^3$, water: 189 kg/m$^3$, the fine aggregate: 722 kg/m$^3$, the coarse aggregate: 884 kg/m$^3$, the proportion of the fine aggregate (the fine aggregate/(the fine aggregate+the coarse aggregate)) (by volume): 45%, the ratio of water/cement (by mass)=0.40

The concrete was produced by 2 minutes mixing using the revolving-puddle mixer under above-mentioned condition, and the slump value, the flow value, and the air content of the concrete were measured. The measurements of the slump value, the flow value, the change in the slump value and the flow value by time, and the air content were performed following to Japanese Industrial Standards (JIS-A-1101 and 1128). When the comparison dispersing test with the cements of 3 types which differed Lot number (X, Y, and Z) was performed, in Formulation D, it compared at the addition level of the cement admixture where the slump value became 18.0 to 19.0 cm when cement X was used, and in Formulation E, it compared the addition level of the cement admixture where the flow value became 600 to 650 mm when cement X was used. The solid matter component [nonvolatile component] in each aqueous solution of the polymer obtained by above-mentioned Production Examples and aqueous solution of above-mentioned sulfonic acid type dispersants was measured by weighing an appropriate amount of each solution, and drying by heating at 130° C. to remove the volatile matter, and an amount of the aqueous cement admixture solution was weighed and incorporated in cement so that a predetermined amount of the solid matter component [nonvolatile component] might be contained in the formulation. The results of the test and the addition level of the cement admixture relative to the cement are shown in Table 11 to Table 14.

In Table 11 to 14, [polymer (A) or (G) (solid matter component)] and [polymer (B) (solid matter component)] correspond to the amount of solid matter component [nonvolatile component] in each aqueous solution of the polymer which includes the polymer, which includes the nonvolatile component not only the polymer but also other than the polymer, e.g. the nonvolatile unreacted monomer and the non-polymerizable polyalkylene glycol not containing an alkenyl group.

[polymer (A) or (G) (net amount)] and [polymer (B) (net amount)] corresponds to the amount of solid matter component [nonvolatile component] only of the polymer, [total] means the total of above [polymer (A) of (G) (solid matter component)], [polymer (B) (solid matter component)], and the amount of solid matter component in the aqueous solution of the sulfonic acid type dispersant.

TABLE 11

| | Formulation of cencrete | Formulation | Addition level of solid matter component (mass %)/cement | | | | Addition level of polymer (net amount) (% by mass)/cement | |
|---|---|---|---|---|---|---|---|---|
| | | | Polymer (A) or (G) (solid matter component) | Polymer(B) (solid matter component) | Sulfonic acid type dispersant | Total | Polymer (A) or (G) (net amount) | Polymer(B) (net amount) |
| Example42 | FormulationD | A-8 + A-1 | 0.18 | — | 0.12 | 0.30 | 0.138 | — |
| Example43 | FormulationD | C-6 + S-1 | 0.12 | — | 0.24 | 0.36 | 0.099 | — |
| Example44 | FormulationD | G-3 + S-1 | 0.10 | — | 0.27 | 0.37 | 0.090 | — |

TABLE 11-continued

| | Formulation of concrete | Formulation | Addition level of solid matter component (mass %)/cement | | | | Addition level of polymer (net amount) (% by mass)/cement | |
|---|---|---|---|---|---|---|---|---|
| | | | Polymer (A) or (G) | Polymer(B) | Sulfonic acid type dispersant | Total | Polymer (A) or (G) | Polymer(B) |
| Example45 | FormulationD | C-6 + A-9 + S-1 | 0.12 | 0.06 | 0.08 | 0.26 | 0.099 | 0.054 |
| Example46 | FormulationD | C-6 + E-2 + S-1 | 0.12 | 0.08 | 0.08 | 0.28 | 0.099 | 0.068 |
| Compar.EX.35 | FormulationD | A-8 | 0.40 | — | — | 0.40 | 0.306 | — |
| Compar.EX.36 | FormulationD | C-6 | 0.60 | — | — | 0.60 | 0.493 | — |
| Compar.EX.37 | FormulationD | G-3 | 2.00 | — | — | 2.00 | 1.792 | — |
| Compar.EX.38 | FormulationD | A-9 | — | 0.10 | — | 0.10 | — | 0.090 |
| Compar.EX.39 | FormulationD | E-2 | — | 0.13 | — | 0.13 | — | 0.110 |
| Compar.EX.40 | FormulationD | S-1 | — | — | 0.30 | 0.30 | — | — |
| Compar.EX.41 | FormulationD | S-2 | — | — | 0.35 | 0.35 | — | — |

| | Combination ratio (%) | | | Slump value (cm) (cement X) | | |
|---|---|---|---|---|---|---|
| | Polymer (A) or (G) (net amount) | Polymer(B) (net amount) | Sulfonic acid type dispersant | after 5min | after 30min | after 60min |
| Example42 | 53.4 | 0.0 | 46.6 | 18.8 | 17.0 | 14.3 |
| Example43 | 29.1 | 0.0 | 70.9 | 18.5 | 20.2 | 15.5 |
| Example44 | 24.9 | 0.0 | 75.1 | 18.2 | 21.3 | 18.2 |
| Example45 | 42.5 | 23.1 | 34.4 | 18.5 | 20.4 | 17.0 |
| Example46 | 40.0 | 27.5 | 32.5 | 18.2 | 20.8 | 17.5 |
| Compar.EX.35 | 100.0 | 0.0 | 0.0 | 18.0 | 20.8 | 18.7 |
| Compar.EX.36 | 100.0 | 0.0 | 0.0 | 18.0 | -(*1) | -(*1) |
| Compar.EX.37 | 100.0 | 0.0 | 0.0 | 2.0 | -(*2) | -(*2) |
| Compar.EX.38 | 0.0 | 100.0 | 0.0 | 18.7 | 15.5 | 11.3 |
| Compar.EX.39 | 0.0 | 100.0 | 0.0 | 18.8 | 16.0 | 12.5 |
| Compar.EX.40 | 0.0 | 0.0 | 100.0 | 18.3 | 14.2 | 8.5 |
| Compar.EX.41 | 0.0 | 0.0 | 100.0 | 18.3 | 14.7 | 10.2 |

In Table 11, with the column of slump value, "–(*1)" means the measurement was impossible because the slump value exceeded 25 cm, and "–(*2)" means the change in slump value by time was not measured because it was the state that the slump value was small and the concrete composition did not flow almost.

| | Formulation of concrete | Formulation | Addition level of solid matter component (mass %)/cement | | | | Addition level of polymer (net amount) (% by mass)/cement | |
|---|---|---|---|---|---|---|---|---|
| | | | Polymer (A) or (G) (solid matter component) | Polymer(B) (solid matter component) | Sulfonic acid type dispersant | Total | Polymer (A) or (G) (net amount) | Polymer(B) (net amount) |
| Example47 | Formulation E | C-6 + A-9 + S-2 | 0.16 | 0.07 | 0.25 | 0.48 | 0.132 | 0.63 |
| Example48 | Formulation E | C-6 + E-2 + S-2 | 0.16 | 0.10 | 0.25 | 0.51 | 0.132 | 0.085 |
| Compar.EX.42 | Formulation E | C-6 | 0.80 | — | — | 0.80 | 0.658 | — |
| Compar.EX.43 | Formulation E | A-9 | — | 0.12 | — | 0.12 | — | 0.108 |
| Compar.EX.44 | Formulation E | E-2 | — | 0.16 | — | 0.16 | — | 0.136 |
| Compar.EX.45 | Formulation E | S-1 | — | — | 0.70 | 0.70 | — | — |
| Compar.EX.46 | Formulation E | S-2 | — | — | 1.00 | 1.00 | — | — |

| | Combination ratio (%) | | | Flow value(mm) (cement X) | | |
|---|---|---|---|---|---|---|
| | Polymer (A) or (G) (net amount) | Polymer(B) (net amount) | Sulfonic acid type dispersant | after 5min | after 30min | after 60min |
| Example47 | 29.6 | 14.1 | 56.3 | 628 | 602 | 530 |
| Example48 | 28.2 | 18.2 | 53.6 | 613 | 605 | 557 |
| Compar.EX.42 | 100.0 | 0.0 | 0.0 | 602 | -(*3) | -(*3) |
| Compar.EX.43 | 0.0 | 100.0 | 0.0 | 633 | 505 | 353 |
| Compar.EX.44 | 0.0 | 100.0 | 0.0 | 630 | 537 | 405 |
| Comp.arEX.45 | 0.0 | 0.0 | 100.0 | 605 | 435 | 210 |
| Compar.EX.46 | 0.0 | 0.0 | 100.0 | 415 | 340 | 248 |

In Table 12, with the column of flow value, "–(*3)" means the flowability of the concrete composition increased considerably, material separation was caused, and the measurement of flow value was impossible.

| | Formulation of concrete | Formulation | Addition level of solid matter component (mass %)/cement | | | | Addition level of polymer (net amount) (% by mass)/cement | |
|---|---|---|---|---|---|---|---|---|
| | | | Polymer | | | | | |
| | | | (A) or (G) (solid matter component) | Polymer(B) (solid matter component) | Sulfonic acid type dispersant | Total | Polymer (A) or (G) (net amount) | Polymer(B) (net amount) |
| Example49 | Formulation D | A-10 + S-1 | 0.11 | — | 0.08 | 0.19 | 0.088 | — |
| Example50 | Formulation D | A-11 + S-1 | 0.16 | — | 0.08 | 0.24 | 0.105 | — |
| Ref.Example1 | Formulation D | E-2 + S-1 | — | 0.13 | 0.08 | 0.21 | — | 0.110 |
| Example51 | Formulation D | A-10 + S-2 | 0.11 | — | 0.10 | 0.21 | 0.088 | — |
| Example52 | Formulation D | A-11 + S-2 | 0.16 | — | 0.10 | 0.26 | 0.105 | — |
| Ref.Example2 | Formulation D | E-2 + S-2 | — | 0.13 | 0.10 | 0.23 | — | 0.110 |
| Example53 | Formulation D | C-6 + A-9 + S-2 | 0.12 | 0.06 | 0.10 | 0.28 | 0.099 | 0.054 |
| Example54 | Formulation D | C-6 + E-2 + S-2 | 0.12 | 0.08 | 0.10 | 0.30 | 0.099 | 0.068 |
| Compar.Ex.47 | Formulation D | A-10 | 0.14 | — | — | 0.14 | 0.112 | — |
| Compar.Ex.48 | Formulation D | A-11 | 0.20 | — | — | 0.20 | 0.132 | — |
| Compar.Ex.49 | Formulation D | C-6 | 0.60 | — | — | 0.60 | 0.493 | — |
| Compar.Ex.50 | Formulation D | A-9 | — | 0.10 | — | 0.10 | — | 0.090 |
| Compar.Ex.51 | Formulation D | E-2 | — | 0.13 | — | 0.13 | — | 0.110 |
| Compar.Ex.52 | Formulation D | S-1 | — | — | 0.30 | 0.30 | — | — |
| Compar.Ex.53 | Formulation D | S-2 | — | — | 0.35 | 0.35 | — | — |

| | Combination ratio (%) | | | Slump value(cm) | | |
|---|---|---|---|---|---|---|
| | Polymer (A) or (G) (net amount) | Polymer(B) (net amount) | Sulfonic acid type dispersant | cement X | cement Y | cement Z |
| Example49 | 52.4 | 0.0 | 47.6 | 18.2 | 17.6 | 18.9 |
| Example50 | 56.9 | 0.0 | 43.1 | 18.6 | 17.8 | 19.2 |
| Ref.Example1 | 0.0 | 57.9 | 42.1 | 18.5 | 17.7 | 19.3 |
| Example51 | 46.9 | 0.0 | 53.1 | 18.4 | 17.8 | 19.0 |
| Example52 | 51.3 | 0.0 | 48.7 | 18.5 | 17.9 | 19.1 |
| Ref.Example2 | 0.0 | 52.4 | 47.6 | 18.7 | 18.0 | 19.5 |
| Example53 | 39.1 | 21.3 | 39.6 | 18.3 | 17.5 | 19.2 |
| Example54 | 37.0 | 25.5 | 37.5 | 18.2 | 17.4 | 19.0 |
| Compar.Ex.47 | 100.0 | 0.0 | 0.0 | 18.0 | 16.5 | 19.7 |
| Compar.Ex.48 | 100.0 | 0.0 | 0.0 | 18.5 | 18.8 | 20.4 |
| Compar.Ex.49 | 100.0 | 0.0 | 0.0 | 18.0 | 16.2 | 19.5 |
| Compar.Ex.50 | 0.0 | 100.0 | 0.0 | 18.7 | 16.8 | 20.8 |
| Compar.Ex.51 | 0.0 | 100.0 | 0.0 | 18.8 | 17.0 | 20.7 |
| Compar.Ex.52 | 0.0 | 0.0 | 100.0 | 18.3 | 18.1 | 18.5 |
| Compar.Ex.53 | 0.0 | 0.0 | 100.0 | 18.3 | 18.0 | 18.5 |

| | Formulation of concrete | Formulation | Addition level of solid matter component (mass %)/cement | | | | Addition level of polymer (net amount) (% by mass)/cement | |
|---|---|---|---|---|---|---|---|---|
| | | | Polymer | | | | | |
| | | | (A) or (G) (solid matter component) | Polymer(B) (solid matter component) | Sulfonic acid type dispersant | Total | Polymer (A) or (G) (net amount) | Polymer(B) (net amount) |
| Example55 | Formulation E | A-10 + S-1 | 0.14 | — | 0.20 | 0.34 | 0.112 | — |
| Example56 | Formulation E | A-11 + S-1 | 0.20 | — | 0.20 | 0.40 | 0.132 | — |
| Example57 | Formulation E | C-6 + A-9 + S-2 | 0.16 | 0.07 | 0.25 | 0.48 | 0.132 | 0.063 |
| Example58 | Formulation E | C-6 + E-2 + S-2 | 0.16 | 0.10 | 0.25 | 0.51 | 0.132 | 0.085 |
| Compar.Ex.54 | Formulation E | A-10 | 0.18 | — | — | 0.18 | 0.144 | — |
| Compar.Ex.55 | Formulation E | A-11 | 0.25 | — | — | 0.25 | 0.165 | — |
| Compar.Ex.56 | Formulation E | C-6 | 0.80 | — | — | 0.80 | 0.658 | — |
| Compar.Ex.57 | Formulation E | A-9 | — | 0.12 | — | 0.12 | — | 0.108 |

-continued

| | | | | | | | | |
|---|---|---|---|---|---|---|---|---|
| Compar.Ex.58 | Formulation E | E-2 | — | 0.16 | — | 0.16 | — | 0.136 |
| Compar.Ex.59 | Formulation E | S-1 | — | — | 0.70 | 0.70 | — | — |
| Compar.Ex.60 | Formulation E | S-2 | — | — | 1.00 | 1.00 | — | — |

| | Combination ratio (%) | | | Slump value(cm) | | |
|---|---|---|---|---|---|---|
| | Polymer (A) or (G) (net amount) | Polymer(B) (net amount) | Sulfonic acid type dispersant | cement X | cement Y | cement Z |
| Example55 | 36.0 | 0.0 | 64.0 | 15 | 580 | 653 |
| Example56 | 39.7 | 0.0 | 60.3 | 620 | 577 | 660 |
| Example57 | 29.6 | 14.1 | 56.3 | 628 | 582 | 676 |
| Example58 | 28.2 | 18.2 | 53.6 | 613 | 575 | 655 |
| Compar.Ex.54 | 100.0 | 0.0 | 0.0 | 617 | 520 | 715 |
| Compar.Ex.55 | 100.0 | 0.0 | 0.0 | 620 | 512 | 728 |
| Compar.Ex.56 | 100.0 | 0.0 | 0.0 | 602 | 508 | 692 |
| Compar.Ex.57 | 0.0 | 100.0 | 0.0 | 633 | 515 | 747 |
| Compar.Ex.58 | 0.0 | 100.0 | 0.0 | 630 | 563 | 728 |
| Compar.Ex.59 | 0.0 | 0.0 | 100.0 | 605 | 593 | 618 |
| Compar.Ex.60 | 0.0 | 0.0 | 100.0 | 415 | 410 | 422 |

As can be seen from Table 11 and Table 12, the polymers (A-8), (A-9), (C-6), (G-3), and (E-2) when used alone, were either insufficient in dispersion retaining ability although the addition level was low, or required markedly high addition levels for manifesting satisfactory levels of initial dispersing ability, or insufficient in initial dispersing ability although the addition level was high. On the other hand, the dispersants (S-1) or (S-2) correspond to the sulfonic acid type dispersant (S) containing a sulfonic acid group in the molecule, when used alone, the change in the slump value or the flow value by time was large, and insufficient in dispersion retaining ability. However, all of Examples 42 to 48 where above polymers and the sulfonic acid type dispersant were used in combination, satisfactory levels of initial dispersing ability and of dispersion retaining ability were simultaneously attained at low addition levels.

As can be seen from Table 13 and Table 14, for the polymers (A-10), (A-11), (C-6), (A-9), and (E-2) when used alone, either the variance of the dispersing ability caused by cement Lot No. was large although the addition level was low, or required markedly high addition levels for manifesting satisfactory levels of initial dispersing ability. On the other hand, for the dispersants (S-1) or (S-2) correspond to the sulfonic acid type dispersant (S) containing a sulfonic acid group in the molecule, when used alone, although the variance of dispersing ability caused by cement Lot No. was small, when water/cement ratio became low, the addition level necessary for dispersion suddenly increased. However, all of Examples 49 to 58 where above polymers and the sulfonic acid type dispersant were used in combination, satisfactory levels of dispersing ability were attained at low addition levels, and the variance of dispersing ability caused by cement Lot No. was small, in addition, the stabilized dispersing ability was able to be obtained.

INDUSTRIAL APPLICABILITY

The cement admixture of the present invention shows high levels of dispersing ability at low addition levels and, in particular, it can manifest excellent initial dispersing ability and dispersion retaining ability in a high water reducing ratio range. The cement composition with the cement admixture of the present invention incorporated therein shows good flowability and can avoid troubles otherwise encountered in construction works.

The invention claimed is:

1. An admixture for cement comprising
two polymers, namely a polymer (A1) and a polymer (B1), as essential constituents in a ratio of polymer (A1) to polymer (B1) between 1 to 99 to 99 to 1 by mass,
wherein the polymer (A1) is a polymer comprising, as essential constituent units, a constituent unit (I) derived from an unsaturated (poly) alkylene glycol ether monomer (a1) represented by the general formula (1):

$$YO(R^1O)_mH \qquad (1)$$

wherein Y represents an alkenyl group containing 2 to 8 carbon atoms, the m $R^1O$ groups are the same or different and each $R^1O$ represents an oxyalkylene group containing 2 to 18 carbon atoms and m is a mean addition number of moles of the oxyalkylene group and represents a number of 1 to 500,
and a constituent unit (II) derived from an unsaturated monocarboxylic acid monomer (b),
wherein the constituent units (I) and (II) each accounts for not less than 1% by mass relative to all constituent units but the constituent unit (I) accounts for not more than 50 mole percent relative to all constituent units, and,
wherein the polymer (B1) is an oxyalkylene group- or polyoxyalkylene group- and carboxyl group-containing polymer, and
wherein the number of milliequivalents of carboxyl groups contained in each gram of the polymer (A1) as determined on an unneutralized basis is 0.2 to 5.0 meq/g.

2. An admixture for cement comprising
two polymers, namely a polymer (A2) and a polymer (B2), as essential constituents in a ratio of polymer (A2) to polymer (B2) between 1 to 99 to 99 to 1 by mass,
wherein the polymer (A2) is a polymer comprising, as essential constituent units, a constituent unit (I') derived from an unsaturated (poly) alkylene glycol ether monomer (a2) represented by the general formula (2):

   (2)

wherein Y represents an alkenyl group containing 2 to 8 carbon atoms, the n R¹O groups are the same or different and each R¹O represents an oxyalkylene group containing 2 to 18 carbon atoms, R² represents a hydrogen atom or a hydrocarbon group containing 1 to 30 carbon atoms and n is a mean addition number of moles of the oxyalkylene group and represents a number of 1 to 500, a constituent unit (II) derived from an unsaturated monocarboxylic acid monomer (b) and a constituent unit (III) derived from an unsaturated monocarboxylic ester monomer (c), wherein the constituent units (I'), (II) and (III) each accounts for not less than 1% by mass relative to all constituent units but the constituent unit (I') accounts for not more than 50 mole percent relative to all constituent units and the sum of the proportions of the constituent units (II) and (III) is greater than the proportion of the constituent unit (I') on the mole ratio basis, wherein the polymer (B2) is an oxyalkylene group- or polyoxyalkylene group- and carboxyl group-containing polymer and wherein the number of milliequivalents of carboxyl groups contained in each gram of the polymer (A2) as determined on the unneutralized basis is 0.2 to 5.0 meq/g.

3. The admixture for cement according to claim 2, wherein the constituent unit (III) derived from an unsaturated monocarboxylic acid ester monomer (c) is a constituent unit (IV) derived from a (poly) alkylene glycol mono (meth) acrylic acid ester monomer (d) represented by the general formula (3):

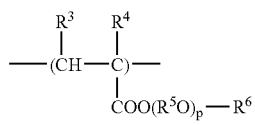   (3)

wherein R³ and R⁴ are the same or different and each represents a hydrogen atom or a methyl group, the p R⁵O groups are the same or different and each R⁵O represent an oxyalkylene group containing 2 to 18 carbon atoms, p is a mean addition number of moles of the oxyalkylene group and represents a number of 1 to 500, and R⁶ represents a hydrogen atom or a hydrocarbon group containing 1 to 30 carbon atoms, or a constituent unit (VI) derived from a hydrophobic unsaturated monocarboxylic acid ester monomer (f) represented by the general formula (4):

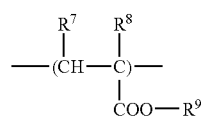   (4)

wherein R⁷ and R⁸ are the same or different and each represents a hydrogen atom or a methyl group and R⁹ represents a hydrocarbon group containing 1 to 30 carbon atoms.

4. An admixture for cement comprising two polymers, namely a polymer (A3) and a polymer (B3), as essential constituents in a ratio of polymer (A3) to polymer (B3) between 1 to 99 to 99 to 1 by mass, wherein the polymer (A3) is a polymer comprising, as essential constituent units, a constituent unit (I') derived from an unsaturated (poly) alkylene glycol ether monomer (a2) represented by the general formula (2):

   (2)

wherein Y represents an alkenyl group containing 2 to 8 carbon atoms, the n R¹O groups are the same or different and each R¹O represents an oxyalkylene group containing 2 to 18 carbon atoms, R² represents a hydrogen atom or a hydrocarbon group containing 1 to 30 carbon atoms and n is a mean addition number of moles of the oxyalkylene group and represents a number of 1 to 500, and a constituent unit (II) derived from an unsaturated monocarboxylic acid monomer (b) and wherein the constituent units (I') and (II) each accounts for not less than 1% by mass relative to all constituent units but the constituent unit (I') accounts for not more than 50 mole percent relative to all constituent units and wherein the polymer (B3) is a polymer comprising a constituent unit (IV) derived from a (poly) alkylene glycol mono (meth) acrylic acid ester monomer (d) represented by the general formula (3):

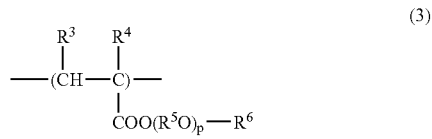   (3)

wherein R³ and R⁴ are the same or different and each represents a hydrogen atom or a methyl group, the p R⁵O groups are the same or different and each R⁵O represent an oxyalkylene group containing 2 to 18 carbon atoms, p is a mean addition number of moles of the oxyalkylene group and represents a number of 1 to 500, and R⁶ represents a hydrogen atom or a hydrocarbon group containing 1 to 30 carbon atoms, and a constituent unit (II) derived from an unsaturated monocarboxylic acid monomer (b).

5. An admixture for cement comprising two polymers, namely a polymer (A3) and a polymer (B4), as essential constituents in a ratio of polymer (A3) to polymer (B4) between 1 to 99 to 99 to 1 by mass, wherein the polymer (A3) is a polymer comprising, as essential constituent units, a constituent unit (I') derived from an unsaturated (poly) alkylene glycol ether monomer (a2) represented by the general formula (2):

   (2)

wherein Y represents an alkenyl group containing 2 to 8 carbon atoms, the n R¹O groups are the same or different and each R¹O represents an oxyalkylene group containing 2 to 18 carbon atoms, $R^2$ represents a hydrogen atom or a hydrocarbon group containing 1 to 30 carbon atoms and n is a mean addition number of moles of the oxyalkylene group and represents a number of 1 to 500, and a constituent unit (II) derived from an unsaturated monocarboxylic acid monomer (b), wherein the constituent units (I') and (II) each accounts for not less than 1% by mass relative to all constituent units but the constituent unit (I') accounts for not more than 50 mole percent relative to all constituent units, wherein the polymer (B4) is a polymer comprising a constituent unit (I') derived from an unsaturated (poly) alkylene glycol ether monomer (a2) represented by the general formula (2) and a constituent unit (V) derived from an unsaturated dicarboxylic acid monomer (e).

6. An admixture for cement comprising two polymers, namely a polymer (G) and a polymer (B5), as essential constituents in a ratio of polymer (G) to polymer (B5) between 1 to 99 to 99 to 1 by mass, wherein the polymer (B5) is an oxyalkylene or polyoxyalkylene group- and carboxyl group-containing polymer and the polymer (G) is a polymer comprising, as essential constituent units, a constituent unit (I') derived from an unsaturated (poly) alkylene glycol ether monomer (a2) represented by the general formula (2):

YO (R¹O)ₙR²     (2)

wherein Y represents an alkenyl group containing 2 to 8 carbon atoms, the n $R^1O$ groups are the same or different and each $R^1O$ represents an oxyalkylene group containing 2 to 18 carbon atoms, $R^2$ represents a hydrogen atom or a hydrocarbon group containing 1 to 30 carbon atoms and n is the mean addition number of moles of the oxyalkylene group and represents a number of 1 to 500, and a constituent unit (III) derived from an unsaturated monocarboxylic acid ester monomer (c), wherein the constituent units (I') and (III) each accounts for not less than 1% by mass relative to all constituent units but the constituent unit (I') accounts for not more than 50 mole percent relative to all constituent units.

7. The admixture for cement according to claim 6, wherein the number of milliequivalents of carboxyl groups contained in each gram of the polymer (G) as determined on the unneutralized basis is 0 to 0.8 meq/g.

8. The admixture for cement according to claim 6, wherein the polymer (B5) is a polymer comprising, as essential constituent units, a constituent unit (IV) derived from a (poly) alkylene glycol mono (meth) acrylic acid ester monomer (d) represented by the general formula (3):

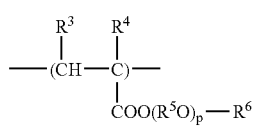

(3)

wherein $R^3$ and $R^4$ are the same or different and each represents a hydrogen atom or a methyl group, the p $R^5O$ groups are the same or different and each $R^5O$ represent an oxyalklene group containing 2 to 18 carbon atoms, p is a mean addition number of moles of the oxyalkylene group and represents a number of 1 to 500 and $R^6$ represents a hydrogen atom or a hydrocarbon group containing 1 to 30 carbon atoms, and a constituent unit (II) derived from an unsaturated monocarboxylic acid monomer (b).

9. The admixture for cement according to claim 6, wherein the polymer (B5) is a polymer comprising, as essential constituent units, the constituent unit (I') derived from an unsaturated (poly) alkyene glycol ether monomer (a2) represented by the general formula (2) and a constituent unit (V) derived from an unsaturated dicarboxylic acid monomer (e).

10. The admixture for cement according to claim 6, wherein the constituent unit (III) derived from an unsaturated monocarboxylic acid ester monomer (c) is a constituent unit (IV) derived from a (poly) alkylene glycol mono (meth) acrylic acid ester monomer (d) or a constituent unit (VI) derived from a hydrophobic unsaturated monocarboxylic acid ester monomer (f) represented by the general formula (4):

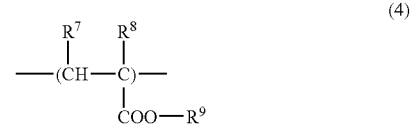

(4)

wherein $R^7$ and $R^8$ are the same or different and each represents a hydrogen atom or a methyl group and $R^9$ represents a hydrocarbon group containing 1 to 30 carbon atoms.

11. The admixture for cement according to claim 1 which further comprises a non-polymerizable (poly) alkylene glycol (P) not containing an alkenyl group.

12. The admixture for cement according to claim 1 which further comprises the unsaturated (poly) alkylene glycol ether monomer (a1).

13. The admixture for cement according to claim 2 which further comprises the unsaturated (poly) alkylene glycol ether monomer (a2).

14. The admixture for cement according to claim 7, wherein the polymer (B5) is a polymer comprising, as essential constituent units, a constituent unit (IV) derived from a (poly) alkylene glycol mono (meth) acrylic acid ester monomer (d) represented by the general formula (3):

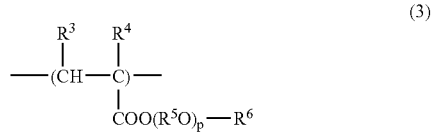

(3)

wherein $R^3$ and $R^4$ are the same or different and each represents a hydrogen atom or a methyl group, the p $R^5O$ groups are the same or different and each $R^5O$ represent an oxyalklene group containing 2 to 18 carbon atoms, p is a mean addition number of moles of the oxyalkylene group and represents a number of 1 to 500 and $R^6$ represents a hydrogen atom or a hydrocarbon group containing 1 to 30 carbon atoms, and a constituent unit (II) derived from an unsaturated monocarboxylic acid monomer (b).

15. The admixture for cement according to claim 7, wherein the polymer (B5) is a polymer comprising, as essential constituent units, the constituent unit (I') derived from an unsaturated (poly) alkyene glycol ether monomer (a2) represented by the general formula (2) and a constituent unit (V) derived from an unsaturated dicarboxylic acid monomer (e).

16. The admixture for cement according to claim 7, wherein the constituent unit (III) derived from an unsaturated monocarboxylic acid ester monomer (c) is a constituent unit (IV) derived from a (poly) alkylene glycol mono (meth) acrylic acid ester monomer (d) or a constituent unit (VI) derived from a hydrophobic unsaturated monocarboxylic acid ester monomer (f) represented by the general formula (4):

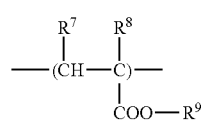
(4)

wherein $R^7$ and $R^8$ are the same or different and each represents a hydrogen atom or a methyl group and $R^9$ represents a hydrocarbon group containing 1 to 30 carbon atoms.

17. The admixture for cement according to claim 2 which further comprises a non-polymerizable (poly) alkylene glycol (P) not containing an alkenyl group.

18. The admixture for cement according to claim 3 which further comprises the unsaturated (poly) alkylene glycol ether monomer (a2).

19. The admixture for cement according to claim 4 which further comprises a non-polymerizable (poly)alkylene glycol (P) not containing an alkylene group.

20. The admixture for cement according to claim 4 which further comprises the unsaturated (poly)alkylyne glycol ether monomer (a2) and a non-polymerizable (poly)alkylene glycol (P) not containing an alkylene group.

21. The admixture for cement according to claim 4, wherein the number of milliequivalents of carboxyl groups contained in each gram of the polymer (A3) as determined on the unneutralized basis is 0.2 to 5.0 meq/g.

22. The admixture for cement according to claim 5, wherein the number of milliequivalents of carboxyl groups contained in each gram of the polymer (A3) as determined on the unneutralized basis is 0.2 to 5.0 meq/g.

* * * * *